United States Patent
Moue et al.

(10) Patent No.: US 12,348,682 B2
(45) Date of Patent: Jul. 1, 2025

(54) IMAGE CAPTURING DEVICE AND ELECTRONIC APPARATUS

(71) Applicant: Sony Semiconductor Solutions Corporation, Kanagawa (JP)

(72) Inventors: Takashi Moue, Kanagawa (JP); Yosuke Ueno, Kanagawa (JP); Tomonori Yamashita, Kanagawa (JP); Youhei Oosako, Kanagawa (JP); Kengo Umeda, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 152 days.

(21) Appl. No.: 18/249,390

(22) PCT Filed: Oct. 25, 2021

(86) PCT No.: PCT/JP2021/039352
§ 371 (c)(1),
(2) Date: Apr. 18, 2023

(87) PCT Pub. No.: WO2022/118564
PCT Pub. Date: Jun. 9, 2022

(65) Prior Publication Data
US 2023/0421927 A1    Dec. 28, 2023

(30) Foreign Application Priority Data
Dec. 1, 2020    (JP) ................ 2020-199510

(51) Int. Cl.
*H04N 25/78*    (2023.01)
*H04N 25/79*    (2023.01)

(52) U.S. Cl.
CPC ............. *H04N 25/78* (2023.01); *H04N 25/79* (2023.01)

(58) Field of Classification Search
CPC ........ H04N 25/78; H04N 25/79; H04N 25/00; H04N 25/772; H04N 25/57; H04N 25/7795
See application file for complete search history.

(56) References Cited

U.S. PATENT DOCUMENTS

| | | |
|---|---|---|
| 2015/0009379 A1 | 1/2015 | Yan |
| 2017/0118428 A1* | 4/2017 | Muto .................. H04N 25/78 |

(Continued)

FOREIGN PATENT DOCUMENTS

| | | |
|---|---|---|
| JP | 2020136935 A | 8/2020 |
| WO | 2016014860 A1 | 1/2016 |
| WO | 2020170518 A1 | 8/2020 |

OTHER PUBLICATIONS

International Search Report (PCT/ISA/210), International Application No. PCT/JP2021/039352, dated Feb. 10, 2022.

*Primary Examiner* — Gevell V Selby
(74) *Attorney, Agent, or Firm* — Michael Best & Friedrich LLP

(57) ABSTRACT

To provide an image capturing device capable of suppressing a decrease of a dynamic range of the entire image capturing device caused by an input transistor of a comparator inserted between a signal line and a load current source in an analog-digital converter.

The image capturing device of the present disclosure includes: a load current source; a comparator that includes an input transistor connected between a signal line that transmits a signal read from a pixel and the load current source; and a reference signal supply section that supplies a predetermined reference signal to a charge-voltage conversion section of the pixel.

35 Claims, 35 Drawing Sheets

(56) References Cited

U.S. PATENT DOCUMENTS

2021/0266484 A1* 8/2021 Kobayashi ............. H04N 25/78
2022/0174231 A1* 6/2022 Akebono ............. H04N 25/709
2022/0264051 A1* 8/2022 Etou .................... H04N 25/772

* cited by examiner

[Fig. 1]
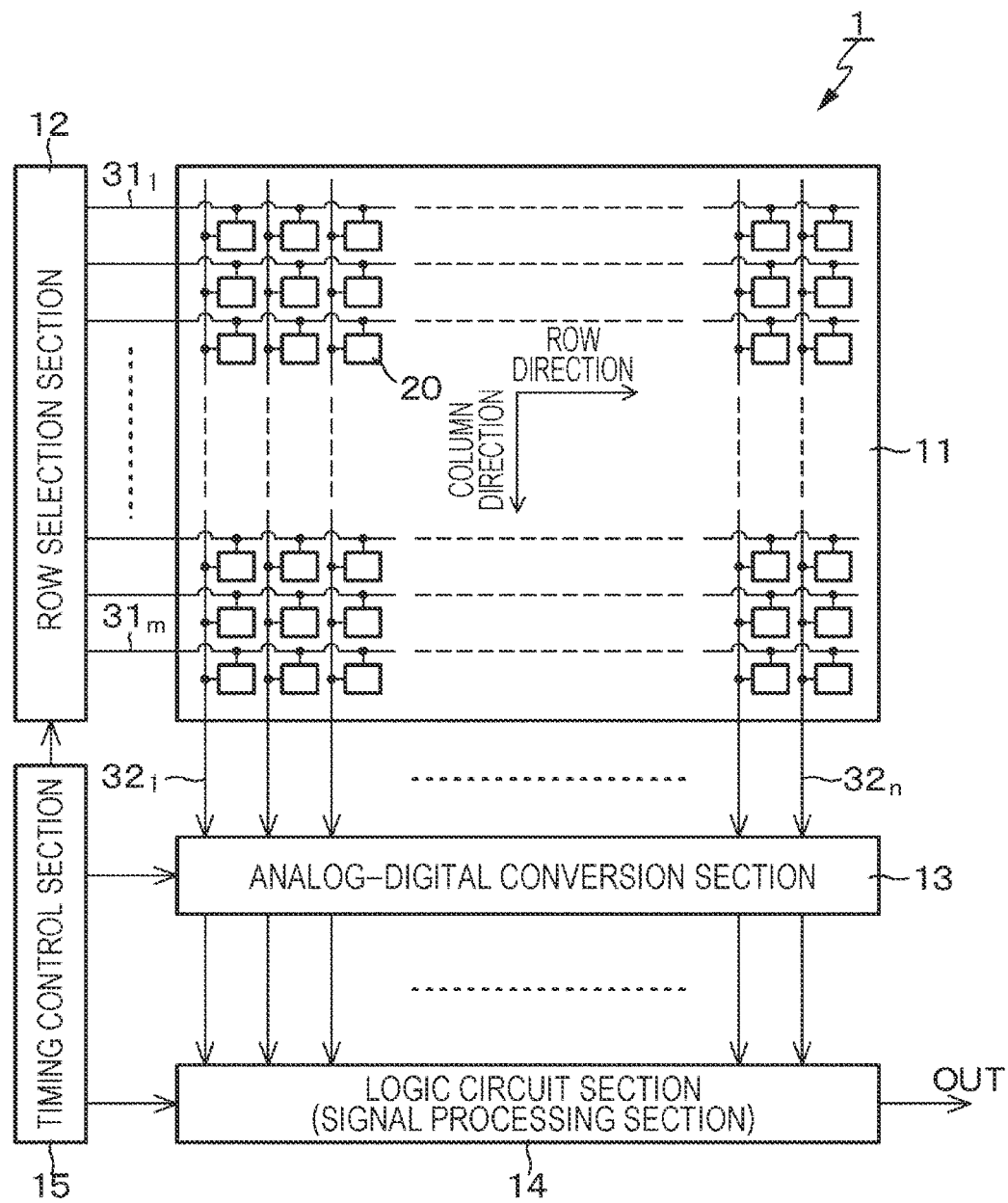

[Fig. 2]
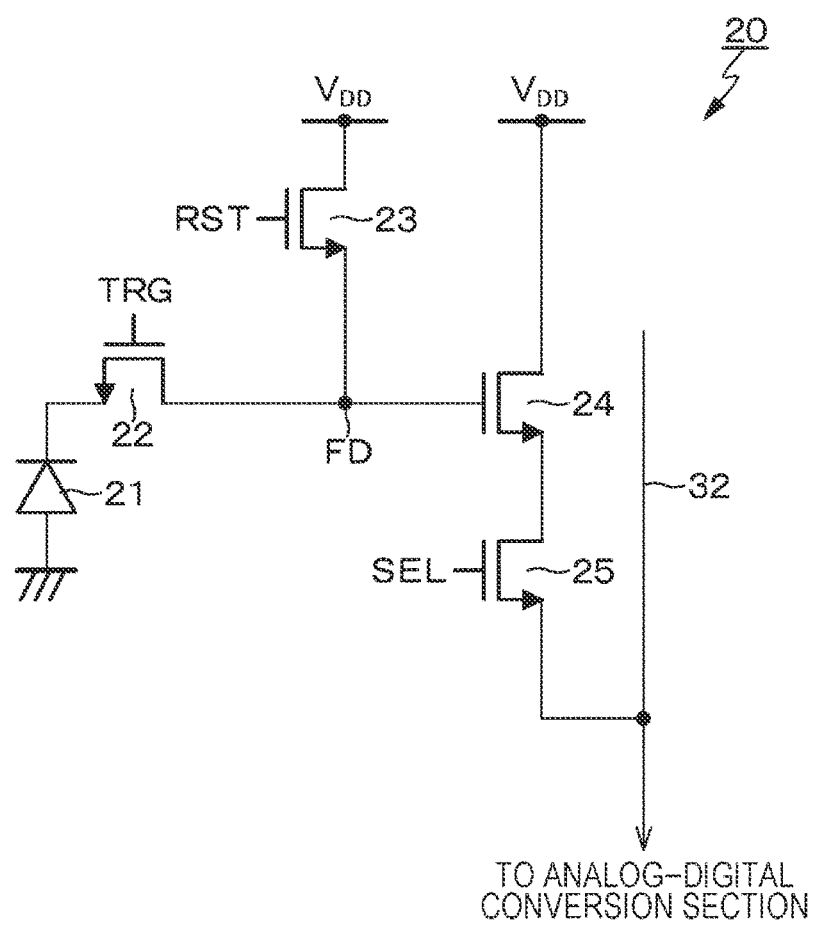

[Fig. 3A]
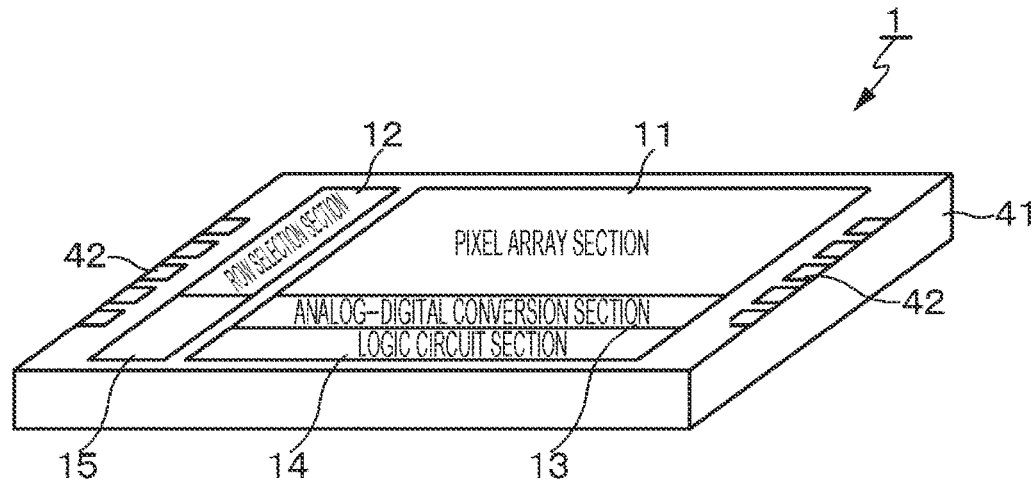
[Fig. 3B]
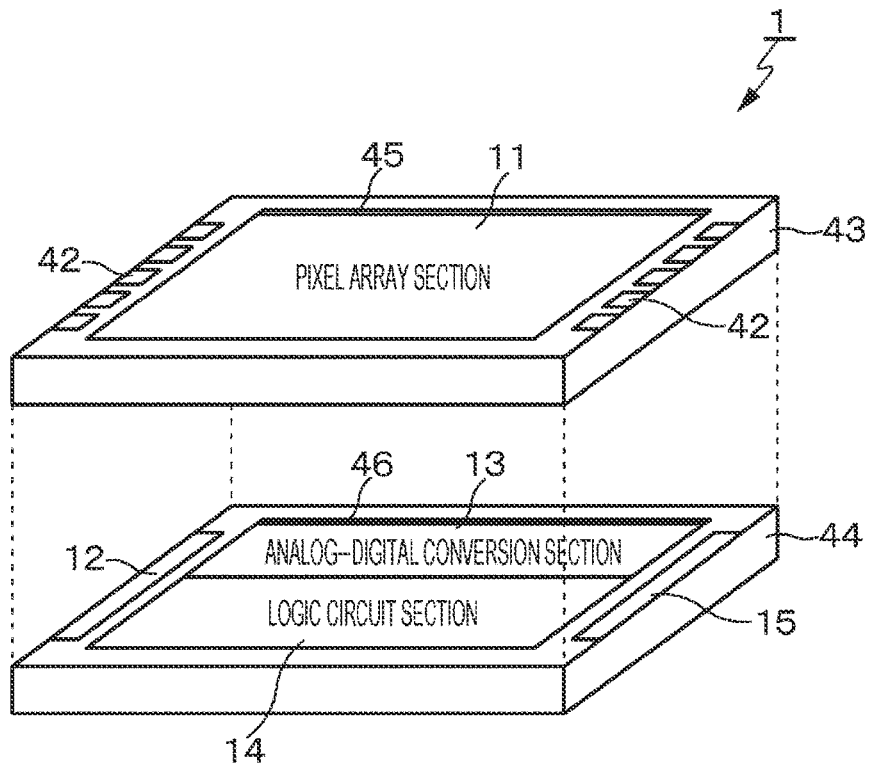

[Fig. 4]
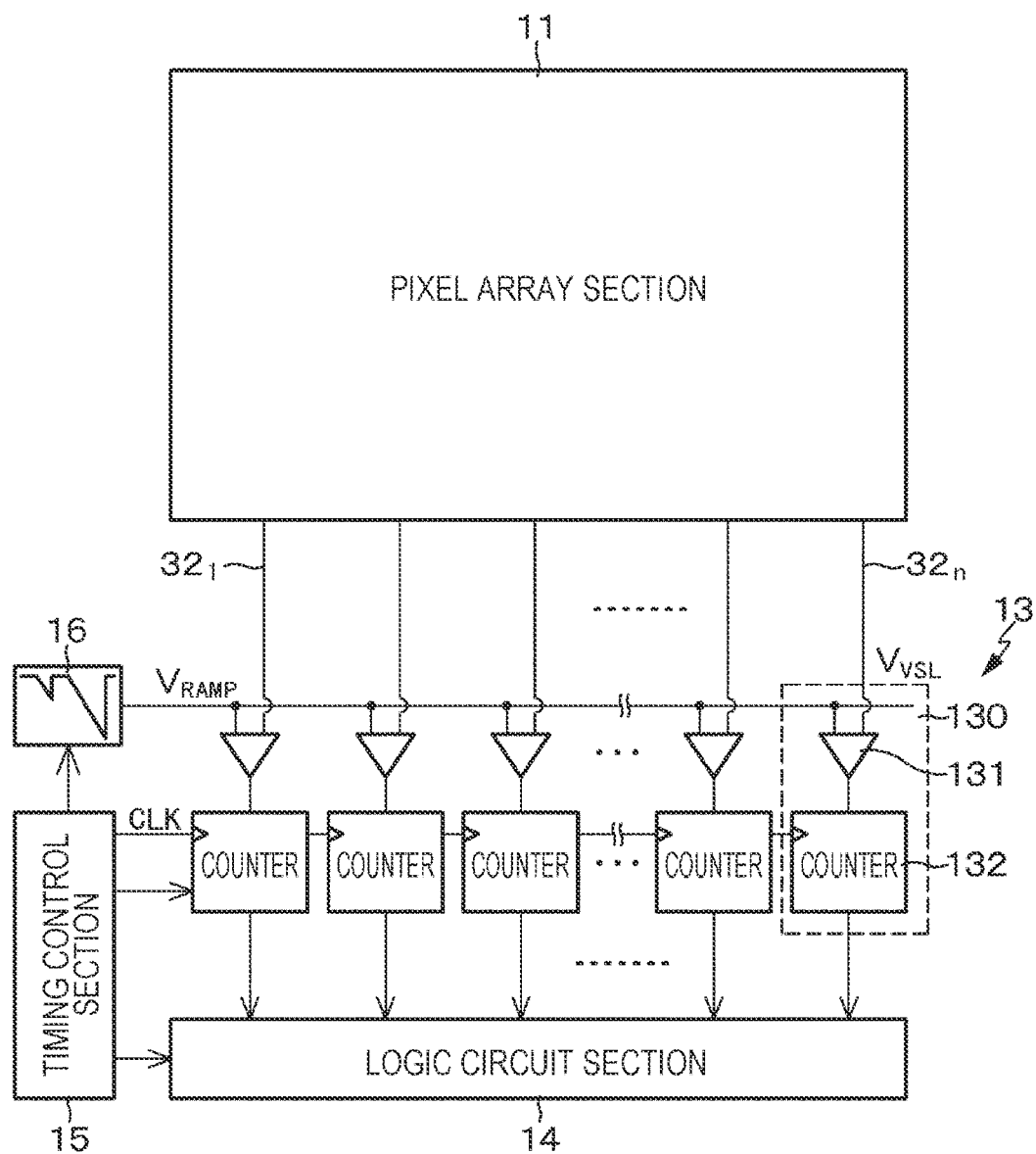

[Fig. 7]
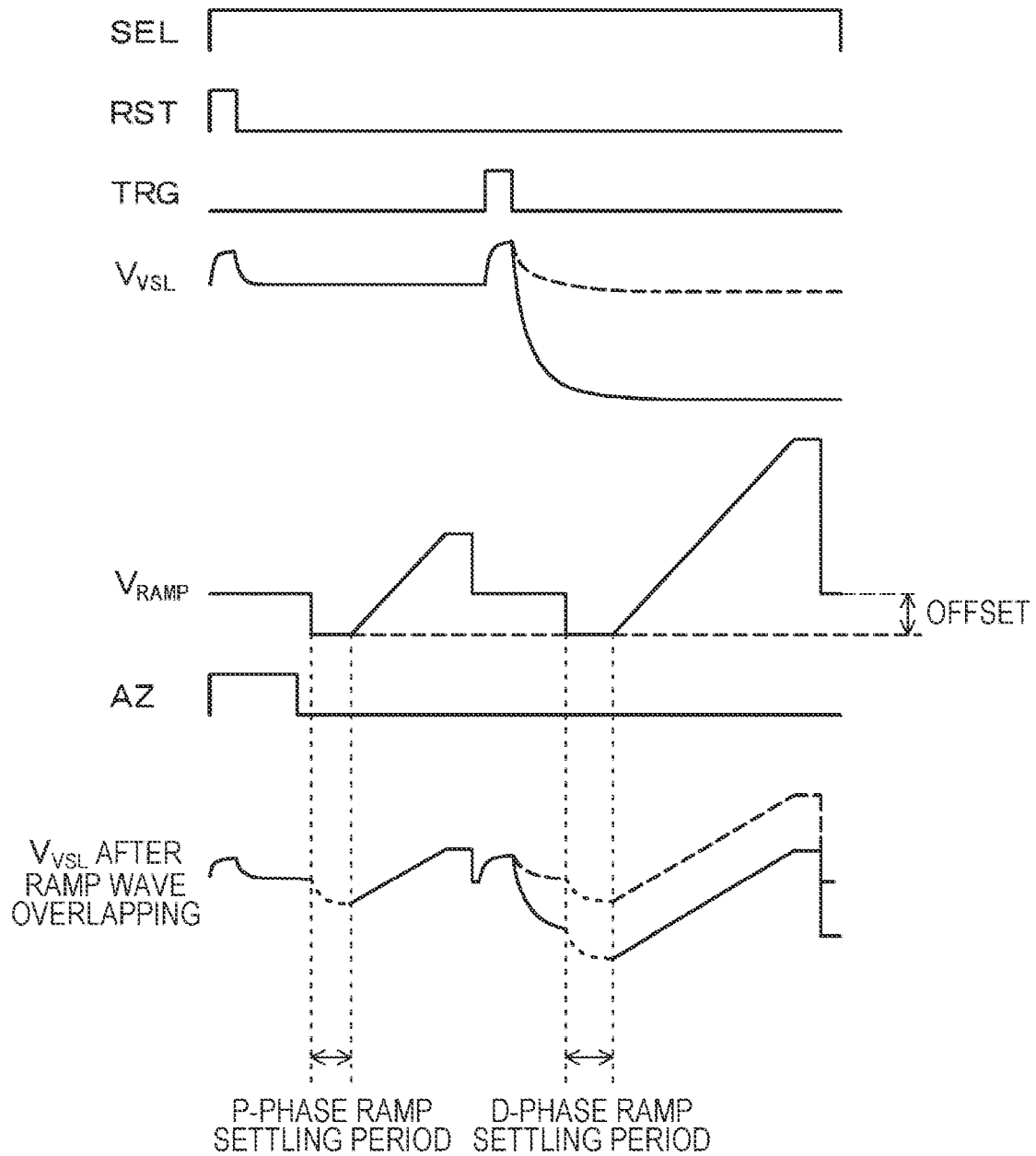

[Fig. 8A]
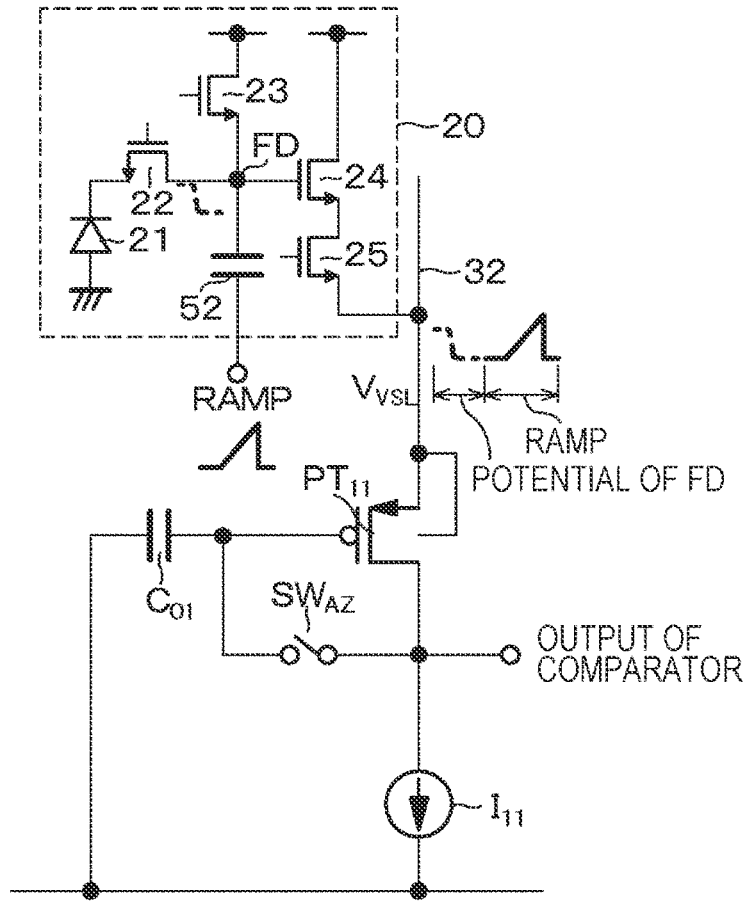
[Fig. 8B]
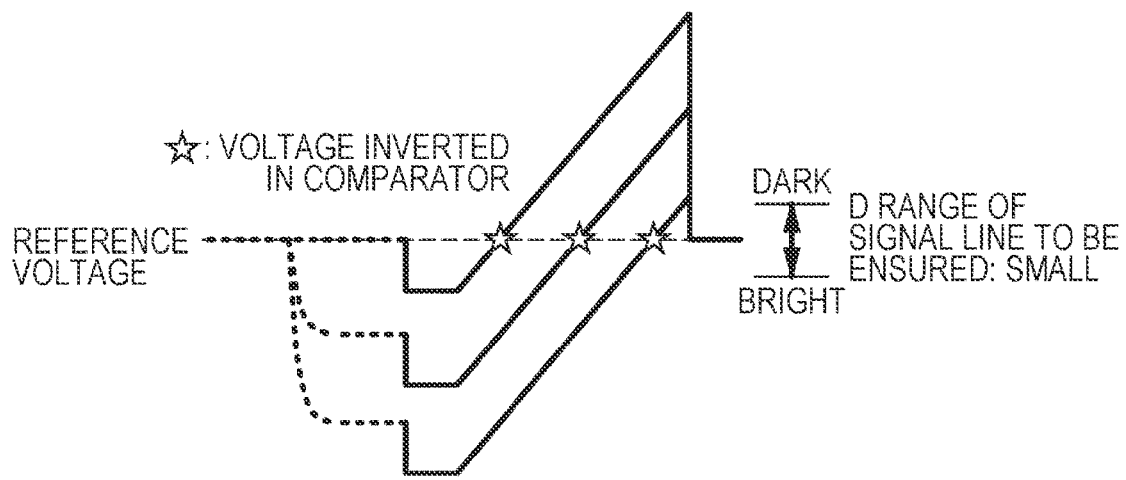

[Fig. 35]
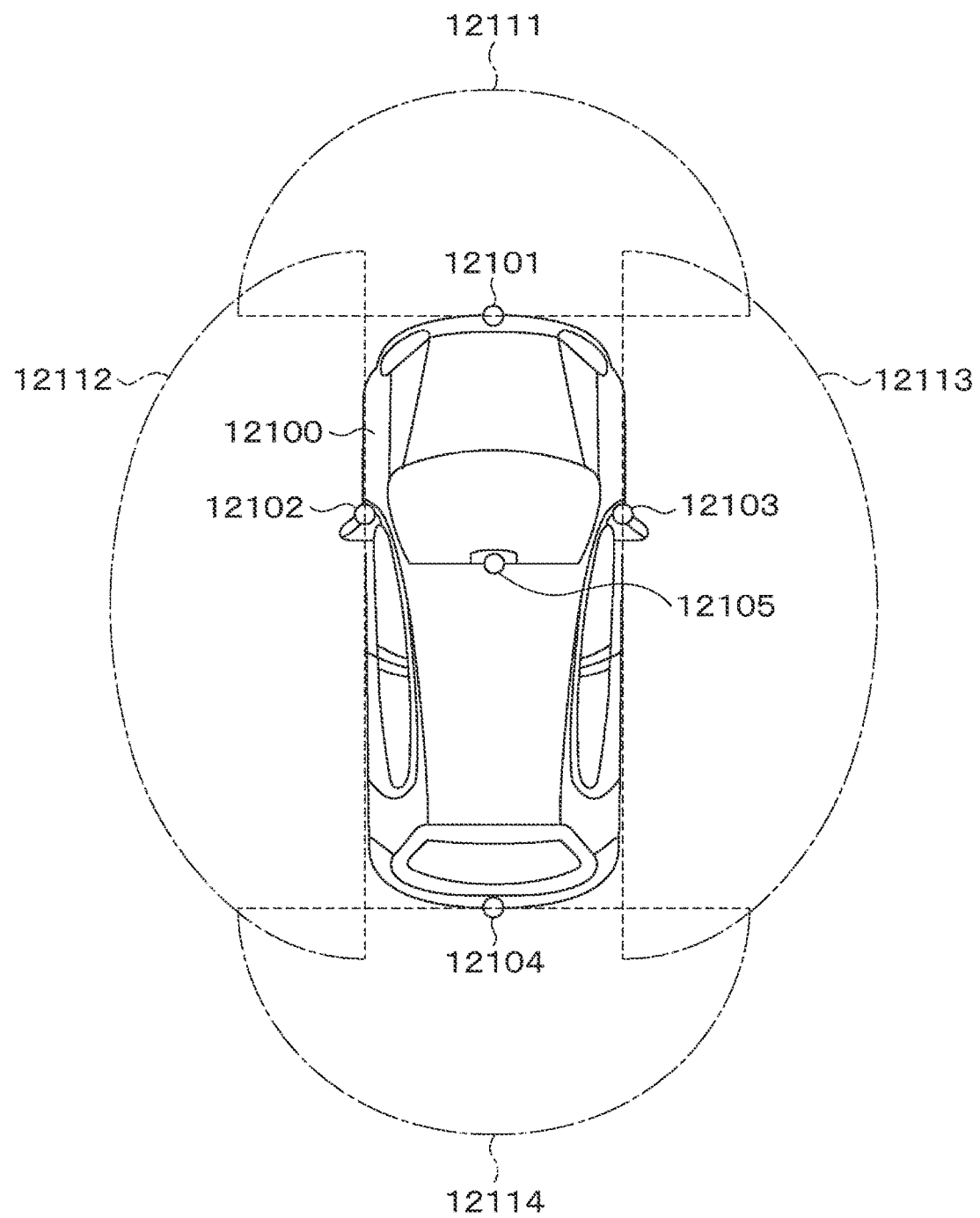

IMAGE CAPTURING DEVICE AND ELECTRONIC APPARATUS

CROSS REFERENCE TO RELATED APPLICATIONS

This application claims the benefit of Japanese Priority Patent Application JP 2020-199510 filed on Dec. 1, 2020, the entire contents of which are incorporated herein by reference.

TECHNICAL FIELD

The present disclosure relates to an image capturing device and an electronic apparatus.

BACKGROUND ART

An analog-digital conversion section that digitizes an analog pixel signal read from a pixel is mounted on an image capturing device. The analog-digital conversion section mounted on the image capturing device is a so-called column-parallel analog-digital conversion section including a plurality of analog-digital converters arranged corresponding to pixel columns.

As the analog-to-digital converter included in the column-parallel analog-to-digital conversion section, for example, a so-called single-slope analog-to-digital converter that digitizes an analog pixel signal by comparing the analog pixel signal read from a pixel with a predetermined reference signal is known.

The single-slope analog-to-digital converter includes, for example, a comparator that compares an analog pixel signal with a predetermined reference signal, and a counter that performs counting on the basis of a comparison result of the comparator. As an image capturing device including the single-slope analog-to-digital converter, for example, an image capturing device having a configuration in which an input transistor of a comparator that compares an analog pixel signal with a predetermined reference signal is inserted between a signal line that transmits a signal read from a pixel and a load current source has been proposed (see, for example, PTL 1).

CITATION LIST

Patent Literature

PTL 1: WO 2020/170518 A1

SUMMARY

Technical Problem

As described above, in the image capturing device described in PTL 1, the input transistor of the comparator of the analog-digital converter is inserted between the signal line that transmits the signal read from the pixel and the load current source. By inserting the input transistor between the signal line and the load current source in this manner, an extra drain-source voltage $V_{ds}$ for one transistor becomes necessary. As a result, a lower limit of a signal line potential at which linearity is guaranteed increases, and a dynamic range of the entire image capturing device decreases.

It is desirable to provide an image capturing device capable of suppressing a decrease of a dynamic range of the entire image capturing device caused by an input transistor of a comparator inserted between a signal line and a load current source in an analog-digital converter, and an electronic apparatus including the image capturing device.

Solution to Problem

According to an embodiment of the present disclosure, there is provided an image capturing device including:
a load current source;
a comparator that includes an input transistor connected between a signal line that transmits a signal read from a pixel and the load current source; and
a reference signal supply section that supplies a predetermined reference signal to a charge-voltage conversion section of the pixel.

According to another embodiment of the present disclosure, there is provided an electronic apparatus including an image capturing device including:
a load current source;
a comparator that includes an input transistor connected between a signal line that transmits a signal read from a pixel and the load current source; and
a reference signal supply section that supplies a predetermined reference signal to a charge-voltage conversion section of the pixel.

BRIEF DESCRIPTION OF DRAWINGS

FIG. 1 is a block diagram schematically illustrating an outline of a system configuration of a CMOS image sensor which is an example of an image capturing device to which a technology according to an embodiment of the present disclosure is applied.

FIG. 2 is a circuit diagram illustrating an example of a circuit configuration of a pixel.

FIG. 3A is a perspective view schematically illustrating a flat type chip structure.

FIG. 3B is an exploded perspective view schematically illustrating a stacked type semiconductor chip structure.

FIG. 4 is a block diagram schematically illustrating an example of a configuration of an analog-digital conversion section.

FIG. 7 is a timing chart for describing an operation of the CMOS image sensor according to the first embodiment of the present disclosure.

FIG. 8A is a diagram illustrating a state in which a ramp wave reference signal overlaps with a potential of a floating diffusion PD.

FIG. 8B is an explanatory diagram of a comparison operation of the comparator.

FIG. 35 is a diagram illustrating an example of an installation position of an image capturing section in the moving body control system.

DESCRIPTION OF EMBODIMENTS

Figure 5:
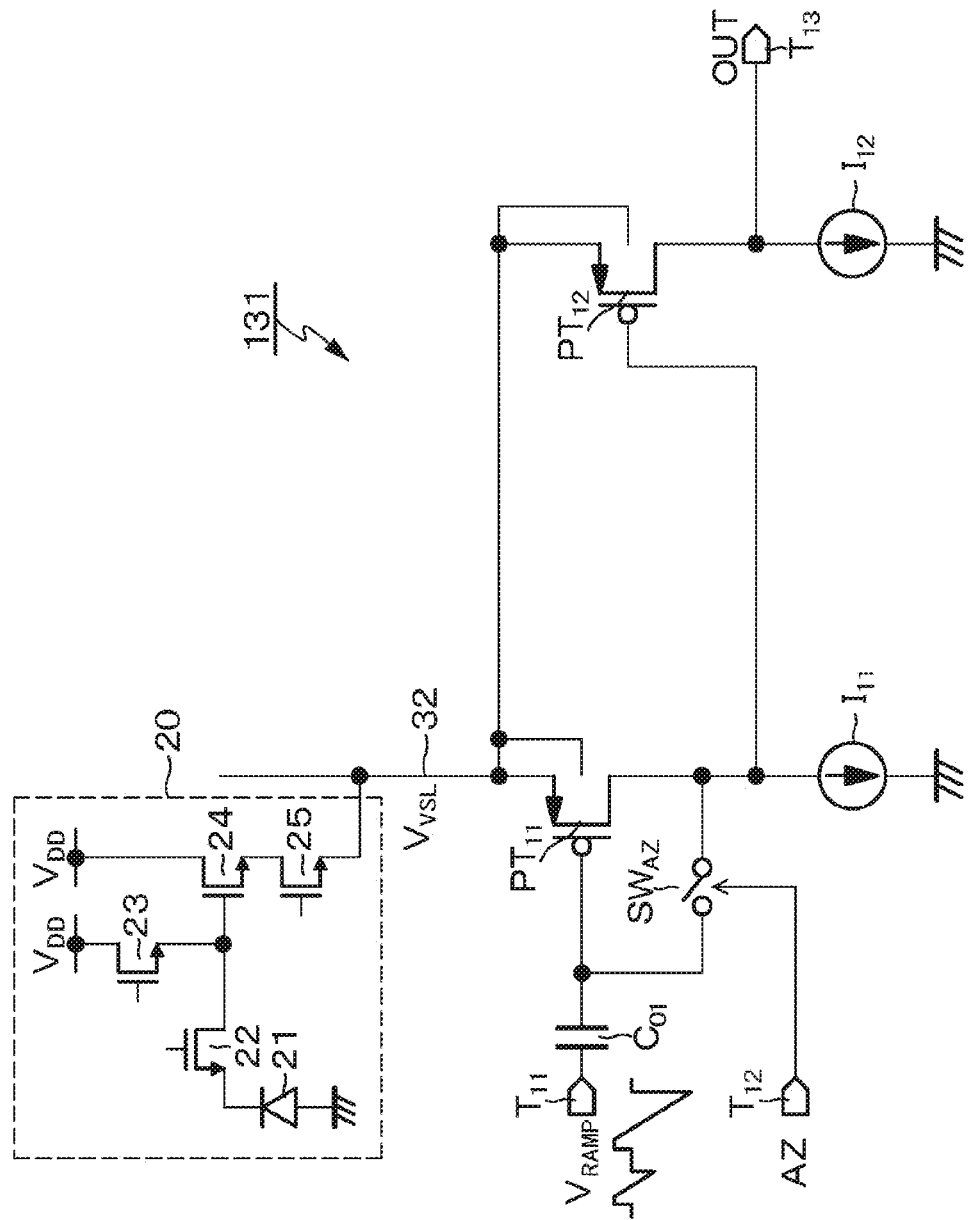
FIG. 5 is a circuit diagram illustrating an example of a circuit configuration of a comparator according to a technology of the related art.

Hereinafter, a mode for carrying out the technology according to the present disclosure (hereinafter, referred to as "embodiment") will be described in detail with reference to the drawings. The technology according to the present disclosure is not limited to the embodiment. In the following description, the same reference signs will be used for the same elements or elements having the same function, and an overlapping description will be omitted. Note that descriptions will be provided in the following order.

1. Overall Description of Image Capturing Device and Electronic Apparatus of Present Disclosure
2. Image Capturing Device to which Technology According to Present Disclosure is Applied
2-1. Configuration Example of CMOS Image Sensor
2-2. Example of Circuit Configuration of Pixel
2-3. Semiconductor Chip Structure
2-3-1. Flat Type Semiconductor Chip Structure
2-3-2. Stacked Type Semiconductor Chip Structure
2-4. Configuration Example of Analog-to-Digital Conversion Section
2-5. Comparator of Analog-to-Digital Converter
2-6. Comparator According to Reference Example
2-6-1. Example of Circuit Configuration of Comparator According to Technology of Related Art
2-6-2. Problems of Comparator According to Technology of Related Art
3. First Embodiment of Present Disclosure (Example in which Ramp Wave Reference Signal is Applied to Floating Diffusion FD)
3-1. Example of Circuit Configuration for One Pixel Column Including Comparator
4. Second. Embodiment of Present Disclosure (Example in which Offset. Portion of Ramp Wave Reference Signal is Separated from Ramp Waveform, Vertically Inverted, and Input to Comparator)
4-1. Example of Circuit Configuration for One Pixel Column Including Comparator
5. Third Embodiment of Present Disclosure (Example of Pixel Sharing)
5-1. Example of Circuit Configuration for One Pixel Column Including Comparator
6. Configuration Example of Reference Signal Supply Section
6-1. Example 1 (Example in which Ramp Wave Reference Signal is Supplied along Column Direction)
6-2. Example 2 (Modified Example of Example 1: Reference Signal Generation Section is Arranged Common to All Pixel Columns)
6-3. Example 3 (Modified Example of Example 2: Reference Signal Generated by Reference Signal Generation Section is Directly Supplied to Each Pixel Column)
6-4. Example 4 (Modified Example of Example 3: Example of Driving from Both Upper and Lower Sides of Matrix Pixel Array)
6-5. Example 5 (Example in which Ramp Wave Reference Signal is Supplied along Row Direction)
6-6. Example 6 (Modified Example of Example 5: Example of Driving from Both Left and Right Sides of Matrix Pixel Array)

6-7. Example 7 (Modified Example of Example 5: Reference Signal Generation Section is Arranged Common to All Pixel Rows)
6-8. Example 8 (Modified Example of Example 7: Example of Driving from Both Left and Right. Sides of Matrix Pixel Array)
6-9, Example 9 (Example in which Reference Signal is Supplied in Mesh Pattern in Pixel Units)
6-10. Example 10 (Modified Example of Example 9: Example in which Buffer is Interposed Between Wiring of Reference Signal and Reference Signal Generation Section)
6-11, Example 11 (Example in which Ramp Wave Reference Signal is Supplied in Column Direction from Central Portion of Matrix Pixel Array)
7. Circuit Configuration Examples of Pixel Circuit
7-1. Circuit Configuration Example 1 (Example in which Buffer is provided in Front of Input Capacitive Element)
7-2. Circuit Configuration Example 2. (Example in which Constant Current Source Transistor of Buffer is Provided in Chip Different from Pixel)
7-3. Circuit Configuration Example 3 (Example in which Reference Signal Generation Section is Provided in Pixel)
8. Example of Inter-Chip Wiring Structure in Stacked Type Semiconductor Chip Structure
8-1. Wiring Structure Example 1 (Example of Inter-Chip Wiring Structure in Two-Layer Chip Structure)
8-2. Wiring Structure Example 2 (Example in which electrical connection is made between chips at Output Portion of Reference Signal Generation Section in Two-Layer Chip Structure)
8-3. Wiring Structure Example 3 (Example in which Reference Signal Generation Section is provided for Each Pixel in Two-Layer Chip Structure)
8-4. Wiring Structure Example 4 (Example of Inter-Chip Wiring Structure in Three-Layer Chip Structure)
8-5. Wiring Structure Example 5 (Example in which Electrical Connection is Made between Chips at Output Portion of Reference Signal Generation Section in Three-Layer Chip Structure)
8-6. Wiring Structure Example 6 (Example in which Reference Signal Generation Section is Provided for Each Pixel in Three-Layer Chip Structure)
9. Modified Example
10. Application Example
11. Application Example of Technology According to Present Disclosure.
11-1. Electronic Apparatus of Present Disclosure (Example of Image Capturing Device)
11-2. Example of Application to Moving Body
12. Configurations that Present Disclosure Can Take <Overall Description of Image Capturing Device and Electronic Apparatus of Present Disclosure>

In an image capturing device and an electronic apparatus of the present disclosure, a predetermined reference signal can be a voltage with a sloping waveform that linearly changes with a predetermined slope. In addition, a comparator can be configured to compare a signal voltage, which is supplied through a signal line and with which the voltage with the sloping waveform overlaps, with a predetermined reference voltage.

In the image capturing device and the electronic apparatus of the present disclosure having the preferable configuration described above, in a case where the voltage with the sloping waveform includes a slope portion and an offset portion, the slope portion of the voltage with the sloping waveform is input to a charge-voltage conversion section via a capacitive element, and the offset portion of the voltage with the sloping waveform is inverted in polarity relative to the slope portion and input to the comparator as the predetermined reference voltage.

Furthermore, in the image capturing device and the electronic apparatus of the present disclosure having the preferable configuration described above, a reference signal supply section can be configured to supply the predetermined reference signal to the charge-voltage conversion section shared among a plurality of pixels. Furthermore, the reference signal supply section can include a reference signal generation section that generates the predetermined reference signal, and an input capacitive element that applies the reference signal generated by the reference signal generation section to the charge-voltage conversion section of the pixel.

Furthermore, in the image capturing device and the electronic apparatus of the present disclosure having the preferable configuration described above, the reference signal supply section can be configured to supply the reference signal to the charge-voltage conversion section of the pixel along a column direction of a pixel array in which the pixels are two-dimensionally arranged in a matrix form. Moreover, the reference signal generation section can be arranged common to all pixel columns of the pixel array in which the pixels are two-dimensionally arranged in a matrix form. Moreover, the reference signal generation section can be arranged on each of opposite sides of the pixel array in the column direction.

Furthermore, in the image capturing device and the electronic apparatus of the present disclosure having the preferable configuration described above, the reference signal supply section can be configured to supply the reference signal to the charge-voltage conversion section of the pixel along a row direction of the pixel array in which the pixels are two-dimensionally arranged in a matrix form. Moreover, the reference signal generation section can be arranged common to all pixel rows of the pixel array. Moreover, the reference signal generation section can be arranged on each of opposite sides of the pixel array in the row direction.

Furthermore, in the image capturing device and the electronic apparatus of the present disclosure having the preferable configuration described above, the reference signal generation section can be configured to supply the reference signal to the charge-voltage conversion section of the pixel in pixel units with respect to each pixel of the pixel array in which the pixels are two-dimensionally arranged in a matrix form. Furthermore, the reference signal generation section can be configured to supply the reference signal to the charge-voltage conversion section of the pixel from a central portion of the pixel array along the column direction.

Furthermore, in the image capturing device and the electronic apparatus of the present disclosure having the preferable configuration described above, a buffer can be provided in front of the input capacitive element for the pixel. Alternatively, the reference signal generation section can be provided in the pixel.

Furthermore, in the image capturing device and the electronic apparatus of the present disclosure having the preferable configuration described above, in a case of having a stacked type semiconductor chip structure formed by stacking at least two semiconductor chips, the pixel and the comparator can be formed in different semiconductor chips, respectively. Furthermore, in a case of a two-layer chip structure in which a semiconductor chip as the first layer and a semiconductor chip as the second layer are stacked, the pixel can be formed in the semiconductor chip as the first layer, and the comparator and the reference signal generation section can be formed in the semiconductor chip as the second layer. Alternatively, in a case of a three-layer chip structure in which a semiconductor chip as the first layer, a semiconductor chip as the second layer, and a semiconductor chip as the third layer are stacked, a photoelectric transformation element can be formed in the semiconductor chip as the first layer, a constituent element of the pixel other than the photoelectric transformation element can be formed in the semiconductor chip as the second layer, and the comparator and the reference signal generation section can be formed in the semiconductor chip as the third layer.

<Image Capturing Device to which Technology According to Present Disclosure is Applied>

As an image capturing device to which the technology according to the present disclosure is applied, a complementary metal oxide semiconductor (CMOS) image sensor, which is a type of X-Y address image capturing device, will be described as an example. The CMOS image sensor is an image sensor manufactured by applying or partially using a CMOS process.

(Configuration Example of CMOS Image Sensor)

FIG. 1 is a block diagram schematically illustrating an outline of a system configuration of the CMOS image sensor which is an example of the image capturing device to which the technology according to the present, disclosure is applied.

A CMOS image sensor 1 according to the present application example includes a pixel array section 11 and a peripheral circuit section of the pixel array section 11. The pixel array section 11 has a configuration in which pixels (pixel circuits) 20 including light receiving elements are two-dimensionally arranged in a row direction and a column direction, that is, in a matrix form. Here, the row direction refers to an arrangement direction of the pixels 20 in a pixel row, and the column direction refers to an arrangement direction of the pixels 20 in a pixel column. The pixel 20 performs photoelectric transformation to generate and accumulate a photocharge according to the amount of received light.

The peripheral circuit section of the pixel array section 11 includes, for example, a row selection section 12, an analog-digital conversion section 13, a logic circuit section 14 as a signal processing section, a timing control section 15, and the like.

Note that, in the pixel array section 11, a pixel control line 31 ($31_1$ to $31_m$) is wired along the row direction for each pixel row of a pixel array in a matrix form. Further, a signal line 32 ($32_1$ to $32_n$) is wired along the column direction for each pixel column. The pixel control line 31 transmits a drive signal for performing driving when reading a signal from the pixel 20. In FIG. 1, the pixel control line 31 is illustrated as one wiring, but the number of pixel control lines 31 is not limited to one. One end of the pixel control line 31 is connected to an output terminal of the row selection section 12 corresponding to each row.

Hereinafter, respective components of the peripheral circuit section of the pixel array section 11, that is, the row selection section 12, the analog-digital conversion section 13, the logic circuit section 14, and the timing control section 15, will be described.

The row selection section 1:2 includes a shift register, an address decoder, and the like, and controls scanning of a pixel row and an address of the pixel row when selecting each pixel 20 of the pixel array section 11. Although a specific configuration of the row selection section 12 is not illustrated, the row selection section 12 generally includes two scanning systems including a read scanning system and a sweep scanning system.

In order to read a pixel signal from the pixel 20, the read scanning system sequentially selects and scans the pixel 20 of the pixel array section 11 row by row. The pixel signal read from the pixel 20 is an analog signal. The sweep scanning system performs sweep scanning on a read row on which read scanning is performed by the read scanning system prior to the read scanning by a time corresponding to a shutter speed.

By the sweep scanning performed by the sweep scanning system, unnecessary charges are swept out from the photoelectric transformation elements of the pixels 20 in the read row, whereby the photoelectric transformation elements are reset. Then, as the sweeping scanning system sweeps out unnecessary charges (performs resetting), a so-called electronic shutter operation is performed. Here, the electronic shutter operation refers to an operation of discarding photocharges of the photoelectric transformation element and newly starting exposure (starting accumulation of the photocharges).

The analog-digital conversion section 13 includes a set of a plurality of analog-digital converters (ADC) provided corresponding to (for example, for each pixel column) the pixel columns of the pixel array section 11. The analog-digital conversion section 13 is a column-parallel analog-digital conversion section that converts an analog pixel signal output through each of the signal lines $32_1$ to $32_n$ for each pixel column into a digital signal.

As the analog-to-digital converter in the column-parallel analog-to-digital conversion section 13, for example, a single-slope analog-to-digital converter, which is an example of a reference signal comparison analog-to-digital converter, can be used.

The logic circuit section 14, which is the signal processing section, reads the pixel signal digitized by the analog-digital conversion section 13 and performs predetermined signal processing. Specifically, in the logic circuit section 14, as the predetermined signal processing, for example, correction of vertical line defects and point defects, clamping of a signal, or digital signal processing such as parallel-serial conversion, compression, coding, addition, averaging, or intermittent operation is performed. The logic circuit section 14 outputs generated image data to a device in the subsequent stage as an output signal OUT of the CMOS image sensor 1.

The timing control section 15 generates various timing signals, clock signals, control signals, and the like on the basis of a synchronization signal provided from the outside. Then, the timing control section 15 performs a drive control of the row selection section 12, the analog-digital conversion section 13, the logic circuit section 14, and the like on the basis of the generated signals.

(Example of Circuit Configuration of Pixel)

FIG. 2 is a circuit diagram illustrating an example of a circuit configuration of the pixel 20. The pixel 20 includes, for example, a photodiode 21 as the photoelectric transformation element. The pixel 20 includes a transfer transistor 22, a reset transistor 23, an amplification transistor 24, and a selection transistor 25 in addition to the photodiode 21.

As the four transistors including the transfer transistor 22, the reset transistor 23, the amplification transistor 24, and the selection transistor 25, for example, N-channel MOS field effect transistors (PET) are used. However, a conductive combination of the four transistors 22 to 25 illustrated here is only an example, and the present disclosure is not limited to the combination thereof.

For the pixel 20, as the above-described pixel control lines 31 ($31_1$ to $31_m$), a plurality of pixel control lines is wired common to the respective pixels 20 in the same pixel row. The plurality of pixel control lines is connected to an output terminal of the row selection section 12 corresponding to each pixel row in pixel row units. The row selection section 12 appropriately outputs a transfer signal TRG, a reset signal RST, and a selection signal SEL to the plurality of pixel control lines.

In the photodiode 21, an anode electrode is connected to a low-potential side power supply (for example, ground), and received light is photoelectrically transformed into a photocharge (here, a photoelectron) having a charge amount corresponding to the amount of the received light, and the photocharge is accumulated. A cathode electrode of the photodiode 21 is electrically connected to a gate electrode of the amplification transistor 24 via the transfer transistor 22. Here, a region to which the gate electrode of the amplification transistor 24 is electrically connected is a floating diffusion (floating diffusion region/impurity diffusion region) PD. The floating diffusion FD is a charge-voltage conversion section that converts electric charge into voltage.

The transfer signal TRG that is active high (for example, $V_{DD}$ level) is applied to a gate electrode of the transfer transistor 22 from the row selection section 12. In a case where the transfer transistor 22 becomes conductive in response to the transfer signal TRG, the photocharge that is obtained through the photoelectric transformation performed by the photodiode 21, and is accumulated in the photodiode 21 is transferred to the floating diffusion FD.

The reset transistor 23 is connected between a node of a high-potential side power supply voltage $V_{DD}$ and the floating diffusion FD. The reset signal RST that is active high is applied to a gate electrode of the reset transistor 23 from the row selection section 12. The reset transistor 23 becomes conductive in response to the reset signal RST, and resets the floating diffusion FD by discarding the charge of the floating diffusion FD to the node of the voltage $V_{DD}$.

In the amplification transistor 24, a gate electrode is connected to the floating diffusion FD, and a drain electrode is connected to the node of the high-potential side power supply voltage $V_{DD}$. The amplification transistor 24 serves as an input unit of a source follower that reads a signal obtained by the photoelectric transformation performed by the photodiode 21. That is, in the amplification transistor 24, a source electrode is connected to the signal line 32 via the selection transistor 25.

In the selection transistor 25, a drain electrode is connected to the source electrode of the amplification transistor 24, and a source electrode is connected to the signal line 32. The selection signal SEL that is active high is applied to a gate electrode of the selection transistor 25 from the row selection section 12. The selection transistor 25 becomes conductive in response to the selection signal SEL, such that a signal output from the amplification transistor 24 is transmitted to the signal line 32 in a state where the pixel 20 is selected.

Note that, in the circuit example described above, a 4Tr configuration including four transistors (Tr), that is, the transfer transistor 22, the reset transistor 23, the amplification transistor 24, and the selection transistor 25 is described as an example of the pixel 20, but the pixel 20 is not limited thereto. For example, the pixel. 20 can also be a 3Tr configuration in which the selection transistor 25 is omitted, and the amplification transistor 24 has the function of the selection transistor 25, or can be a 5 or more Tr configuration including an increased number of transistors as needed.

From the pixel 20 in the circuit configuration example described above, a reset signal (so-called P-phase signal), which is a reset level at the time of resetting the floating diffusion FD by the reset transistor 23, and a data signal (so-called D-phase signal), which is a signal level based on photoelectric transformation in the photodiode 21, are sequentially output. That is, the pixel signal output from the pixel 20 includes the reset signal at the time of resetting and the data signal at the time of photoelectric transformation in the photodiode 21, (Semiconductor Chip Structure)

As the semiconductor chip structure of the CMOS image sensor 1 having the configuration described above, a flat type semiconductor chip structure and a stacked type semiconductor chip structure can be exemplified. Furthermore, a pixel structure can be a hack surface irradiation type pixel structure in which in a case where a substrate surface on a side on which a wiring layer is formed is defined as an outer surface (front surface), light irradiated from a back surface side on the opposite side is taken in, or a front surface irradiation type pixel structure in which light irradiated from the front surface side is taken in.

Hereinafter, an outline of the flat type semiconductor chip structure and the stacked type semiconductor chip structure will be described.

(Flat Type Semiconductor Chip Structure)

FIG. 3A is a perspective view schematically illustrating the flat type chip structure of the CMOS image sensor 1. As illustrated in FIG. 3A, the flat type semiconductor chip structure is a structure in which each component of the peripheral circuit section of the pixel array section 11 is formed on the same semiconductor substrate 41 as the pixel array section 11 in which the pixels 20 are arranged in a matrix form. Specifically, the row selection section 12, the analog-digital conversion section 13, the logic circuit section 14, the timing control section 15, and the like are formed on the same semiconductor substrate 41 as the pixel array section 11. Pads 42 for external connection and power supply are provided, for example, at both left and right ends of the semiconductor chip 41 as the first layer.

(Stacked Type Semiconductor Chip Structure)

FIG. 3B is an exploded perspective view schematically illustrating the stacked type semiconductor chip structure of the CMOS image sensor 1. As illustrated in FIG. 3B, the stacked type semiconductor chip structure, that is, the so-called stacked type structure is a structure in which at least two semiconductor chips including a semiconductor chip 43 as the first layer and a semiconductor chip 44 as the second layer are stacked.

In the stacked type semiconductor chip structure, the semiconductor chip 43 as the first layer is a pixel chip, in which the pixel array section 11 in which the pixels 20 each including the photoelectric transformation element (for example, the photodiode 21) are two-dimensionally arranged in a matrix form is formed. Pads 42 for external connection and power supply are provided, for example, at both left and right ends of the semiconductor chip 43 as the first layer.

The semiconductor chip 44 as the second layer is a circuit chip in which the peripheral circuit section of the pixel array section 11, that is, the row selection section 12, the analog-digital conversion section 13, the logic circuit section 14, the timing control section 15, and the like are formed. Note that the arrangement of the row selection section 12, the analog-digital conversion section 13, the logic circuit section 14, and the timing control section 15 is an example, and is not limited to this arrangement example.

The pixel array section 11 on the semiconductor chip 43 as the first layer and the peripheral circuit section on the semiconductor chip 44 as the second layer are electrically connected via a bonding portion (not illustrated) including a Cu—Cu direct bonding in which Cu electrodes are directly bonded, a through silicon via (TSV), a microbump, and the like.

According to the stacked type semiconductor chip structure described above, a process suitable for manufacturing the pixel array section 11 can be applied to the semiconductor chip 43 as the first layer, and a process suitable for manufacturing the circuit portion can be applied to the semiconductor chip 44 as the second layer. Therefore, process optimization can be made for manufacturing the CMOS image sensor 1. In particular, an advanced process can be applied to manufacturing of the circuit portion.

(Configuration Example of Analog-to-Digital Conversion Section)

Next, an example of a configuration of the analog-digital conversion section 13 will be described. Here, it is assumed that the single-slope analog-to-digital converter is used as each analog-to-digital converter of the analog-to-digital conversion section 13.

FIG. 4 illustrates an example of the configuration of the analog-digital conversion section 13. In the CMOS image sensor 1, the analog-digital conversion section 13 includes a set of a plurality of single-slope analog-digital converters provided corresponding to the respective pixel columns of the pixel array section 11. Here, a single-slope analog-to-digital converter 130 of the n-th column will be described as an example.

The analog-digital converter 130 has a circuit configuration including a comparator 131 and a counter 132. Then, in the single-slope analog-to-digital converter 130, a reference signal generated by a reference signal generation section 16 is used. The reference signal generation section 16 includes, for example, a digital-to-analog converter (DAC), generates a reference signal $V_{RAMP}$ with a sloping waveform (so-called ramp wave) whose level (voltage) monotonously decreases with the lapse of time, and provides the reference signal $V_{RAMP}$ to the comparator 131 provided for each pixel column as a standard signal.

The comparator 131 uses an analog pixel signal $V_{VSL}$ read from the pixel 20 as a comparison input and the ramp wave reference signal $V_{RAMP}$ generated by the reference signal generation section 16 as a reference input, and compares both signals. Then, for example, in a case where the reference signal $V_{RAMP}$ is larger than the pixel signal $V_{VSL}$, the output of the comparator 131 enters a first state (for example, high level), and in a case where the reference signal $V_{RAMP}$ is equal to or smaller than the pixel signal $V_{VSL}$, the output of the comparator 131 enters a second state (for example, low level). Therefore, the comparator 131 outputs, as a comparison result, a pulse signal having a pulse width corresponding to the signal level of the pixel signal $V_{VSL}$, specifically, the magnitude of the signal level.

A clock signal CLK is supplied from the timing control section 15 to the counter 132 at the same timing as a timing at which the reference signal $V_{RAMP}$ starts to be supplied to the comparator 131. Then, the counter 132 performs a counting operation in synchronization with the clock signal CLK to measure a period of a pulse width of an output pulse of the comparator 131, that is, a period from the start of the comparison operation to the end of the comparison operation. The count result (count value) of the counter 132 is supplied to the logic circuit section 14 as a digital value obtained by digitizing the analog pixel signal $V_{VSL}$.

With the analog-digital conversion section 13 including the set of single-slope analog-digital converters 130 described above, it is possible to obtain a digital value from information on a time until a magnitude relationship between the ramp wave reference signal $V_{RAMP}$ generated by the reference signal generation section 16 and the analog pixel signal $V_{VSL}$ read from the pixel 20 through the signal line 32 changes.

Note that, in the example described above, as the analog-digital conversion section 13, the analog-digital converters 130 are arranged in a one-to-one correspondence with the pixel columns of the pixel array section 11, but a configuration in which the analog-digital converter 130 is arranged for a plurality of pixel columns is also possible.

(Comparator of Analog-to-Digital Converter)

In the single-slope analog-to-digital converter 130 described above, a comparator having a differential amplifier configuration is generally used as the comparator 131. However, in a case of the comparator having the differential amplifier configuration, since it is necessary to secure an input range according to a signal amount of the pixel 20, it is necessary to set the power supply voltage $V_{DD}$ relatively high, and thus there is a problem that the power consumption of the analog-digital converter 130 and the power consumption of the CMOS image sensor 1 become relatively high.

On the other hand, there is a technology of the related art having a configuration in which a P-channel metal-oxide-semiconductor (MOS) transistor in which an analog pixel signal is input to a source electrode and a predetermined reference signal is input to a gate electrode is provided, and a load current source of a pixel (pixel circuit) is shared as a current source of a comparator (see, for example, PTL 1). According to such a technology of the related art, power consumption can be reduced as compared with a configuration in which a current source is also provided in a comparator separately from a pixel circuit.

(Comparator According to Technology of Related Art)

Hereinafter, a comparator according to a technology of the related art will be described.

(Example of Circuit Configuration of Comparator According to Technology of Related Art)

FIG. 5 illustrates an example of a circuit configuration of the comparator according to the technology of the related art. Here, in order to simplify the drawing, a circuit configuration for one pixel column is illustrated.

As illustrated in FIG. 5, the comparator 131 according to the technology of the related art includes a capacitive element $C_{01}$, an auto-zero switch $SW_{AZ}$, an input transistor $PT_{11}$, an input-side load current source $I_{11}$, an output transistor $PT_{12}$, and an output-side load current source $I_{12}$.

In the pixel 20, the transfer transistor 22, the reset transistor 23, the amplification transistor 24, and the selection transistor 25 have a circuit configuration including, for example, an N-channel MOS transistor. Correspondingly, a P-channel MOS transistor is used as the input transistor $PT_{11}$.

The input transistor $PT_{11}$ including the P-channel MOS transistor is connected between one end of the signal line 32 and the input-side load current source $I_{11}$. Specifically, a source electrode of the input transistor $PT_{11}$ is connected to one end of the signal line 32, and a drain electrode thereof is connected to one end of the input-side load current source $I_{11}$. Therefore, the analog pixel signal $V_{VSL}$ is input to the source electrode of the input transistor $PT_{11}$ through the signal line 32.

The other end of the input-side load current source $I_{11}$ is connected to a low-potential side power supply, for example, a ground GILD. The input-side load current source $I_{11}$ supplies a constant current to a series connection circuit of the input transistor $PT_{11}$ and the signal line 32.

The capacitive element $C_{01}$ is connected between an input terminal $T_{11}$ of the ramp wave reference signal $V_{RAMP}$ and a gate electrode of the input transistor $PT_{11}$, serves as an input capacitance for the reference signal $V_{RAMP}$, and absorbs an offset. Therefore, the analog pixel signal $V_{VSL}$ is input to the source electrode of the input transistor $PT_{11}$ through the signal line 32, and the ramp wave reference signal $V_{RAMP}$ is input to the gate electrode via the capacitive element $C_{01}$.

The input transistor $PT_{11}$ amplifies a difference between the ramp wave reference signal $V_{RAMP}$ input to the gate electrode and the analog pixel signal $V_{VSL}$ input to the source electrode, that is, a gate-source voltage $V_{gs}$ of the input transistor $PT_{11}$, and outputs the amplified difference as a drain voltage $V_d$ from a drain electrode.

The auto-zero switch $SW_{AZ}$ is connected between the gate electrode and the drain electrode of the input transistor $PT_{11}$, and is controlled to be turned on (closed) or off (opened) according to a drive signal AZ input via an input terminal $T_{12}$. The auto-zero switch $SW_{AZ}$ is turned on to perform an auto zero operation (initialization operation) for short-circuiting between the gate electrode and the drain electrode of the input transistor $PT_{11}$. The auto-zero switch $SW_{AZ}$ can be configured using a P-channel or N-channel MOS transistor.

The output transistor $PT_{12}$ includes, for example, a P-channel MOS transistor, and is connected between one end of the signal line 32 and the output-side load current source $I_{12}$. Specifically, a source electrode of the output transistor $PT_{12}$ is connected to one end of the signal line 32, and a drain electrode thereof is connected to one end of the output-side load current source $I_{12}$. Therefore, the pixel signal $V_{VSL}$ is input to the source electrode of the output transistor $PT_{12}$ through the signal line 32.

The other end of the output-side load current source $I_{12}$ is connected to the low potential side power supply, for example, the ground GND. The output-side load current source $I_{12}$ supplies a constant current to a series connection circuit of the output transistor $PT_{12}$ and the signal line 32.

A gate electrode of the output transistor $PT_{12}$ is connected to the drain electrode of the input transistor $PT_{11}$. Therefore, a drain voltage of the input transistor $PT_{11}$ is input to the gate electrode of the output transistor $PT_{12}$.

The output transistor $PT_{12}$ outputs a signal OUT indicating whether or not a voltage difference between the analog pixel signal $V_{VSL}$ input to the source electrode through the signal line 32 and the drain voltage $V_d$ of the input transistor $PT_{11}$ input to the gate electrode exceeds a predetermined threshold voltage from the drain electrode as a result of comparison between the analog pixel signal $V_{VSL}$ and the ramp wave reference signal $V_{RAMP}$ through an output terminal $T_{13}$.

The comparator 131 according to the technology of the related art having the above described configuration has a circuit configuration in which the load current source $I_{11}$ and the load current source $I_{12}$ that supply a current to the signal line 32 are shared as a current source of the comparator 131. With the comparator 131 having the circuit configuration, it is possible to reduce the power consumption of the analog-digital converter 130 and reduce the power consumption of the CMOS image sensor 1. That is, the comparator 131 according to the technology of the related art is an ultra-low power consumption type comparator.

Moreover, in the comparator 131 according to the technology of the related art, since the input transistor $PT_{11}$ supplies the drain-source voltage between the gate and the source of the output transistor $PT_{12}$, the comparison result can be inverted at a timing at which a change of the analog pixel signal $V_{VSL}$ and a change of the ramp wave reference signal $V_{RAMP}$ match. As a result, nonlinearity caused by an error of the inversion timing can be reduced, and image quality of the image data can be improved.

(Problems of Comparator According to Technology of Related Art)

As described above, the comparator 131 according to the technology of the related art has a configuration in which the input transistor $PT_{11}$ including a P-channel MOS transistor is inserted between the signal line 32 that transmits a signal read from the pixel 20 and the input-side load current source $I_{11}$. In this manner, as the input transistor $PT_{11}$ is inserted between the signal line 32 and the input-side load current source $I_{11}$, an extra drain-source voltage $V_{ds}$ for one transistor becomes necessary. As a result, a lower limit of a potential of the signal line 32 at which linearity is guaranteed increases, and a dynamic range of the entire CMOS image sensor 1 decreases.

First Embodiment of Present Disclosure

In order to solve the problem described above, it is assumed that a CMOS image sensor 1 according to a first embodiment of the present disclosure includes a comparator 131 including an input transistor $PT_{11}$ connected between a signal line 32 that transmits a signal read from a pixel 20 and an input-side load current source $I_{11}$. Then, a charge-voltage conversion section of the pixel 20, that is, a reference signal supply section that supplies a predetermined reference signal, for example, a ramp wave (sloping waveform) reference signal $V_{RAMP}$ linearly changing with a predetermined slope to a floating diffusion ED is provided.

As the ramp wave reference signal $V_{RAMP}$ is applied to the floating diffusion FD, a potential of the signal line 32 at the time of inversion in the comparator 131 can be made constant regardless of the amount of light incident on the pixel 20. Since the potential (that is, an inversion potential of the comparator 130 of the signal line 32 at the time of inversion in the comparator 131 becomes constant regardless of the amount of incident light, an operation range at a node of the signal line 32 can be expanded, and as a result, a dynamic range of the entire CMOS image sensor 1 can be expanded. Furthermore, since the inversion potential of the comparator 131 becomes constant, a part or all of a power supply voltage of the pixel 20 can be lowered as compared with a case of the comparator according to the technology of the related art. As a result, the power consumption of the entire CMOS image sensor 1 can be reduced.

(Example of Circuit Configuration for One Pixel Column Including Comparator)

Figure 6:
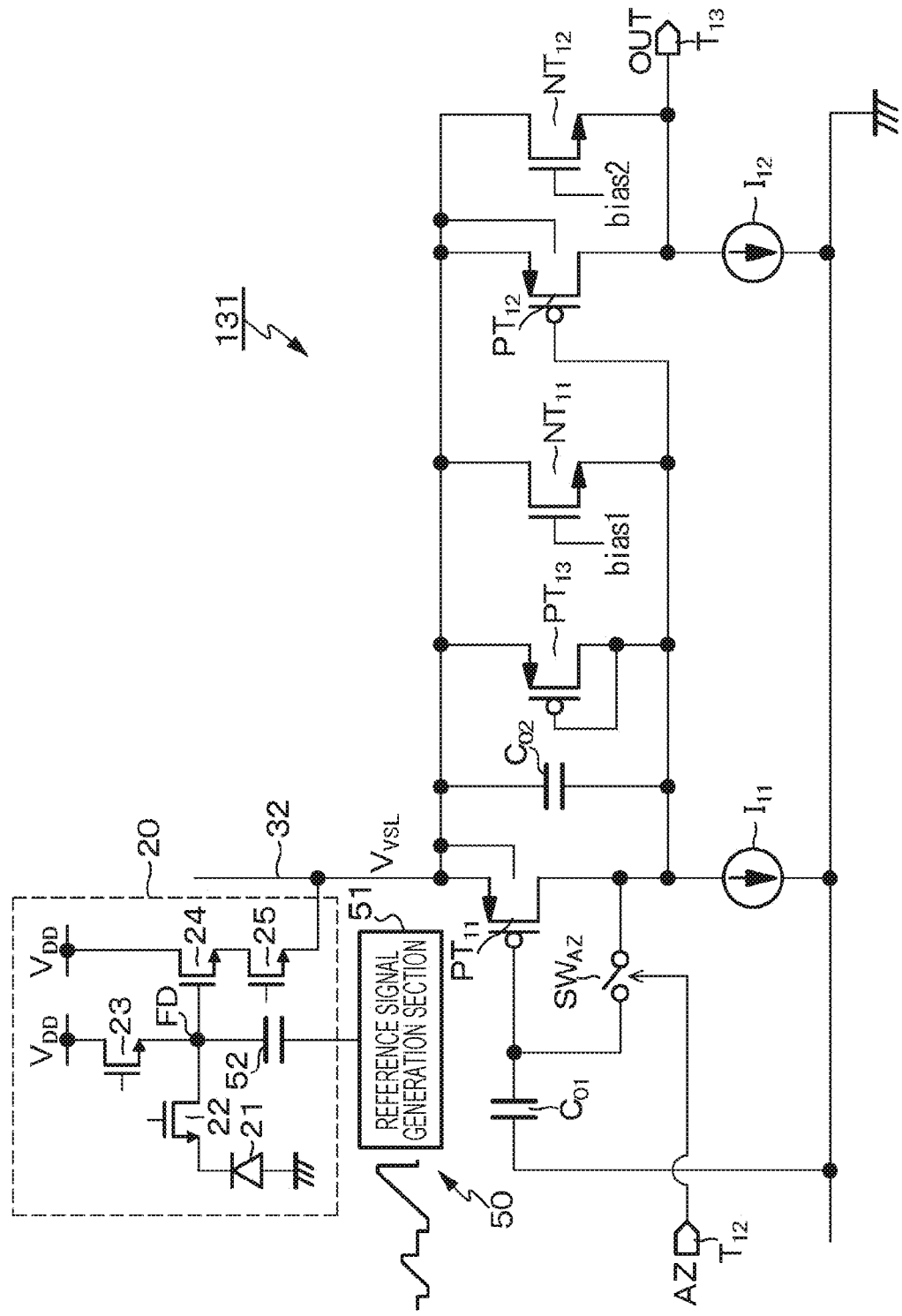
FIG. 6 is a circuit diagram illustrating an example of a circuit configuration for one pixel column including a comparator of a CMOS image sensor according to a first embodiment of the present disclosure.

FIG. 6 illustrates an example of a circuit configuration for one pixel column including a comparator of the CMOS image sensor 1 according to the first embodiment of the present disclosure.

The CMOS image sensor 1 according to the first embodiment of the present disclosure includes the comparator 131 including an input transistor $PT_{11}$ that includes, for example, a P-channel MOS transistor and is connected between one end of the signal line 32 and the input-side load current source $I_{11}$. The input transistor $PT_{11}$ has a source electrode connected to one end of the signal line 32 and a drain electrode connected to one end of the input-side load current source $I_{11}$. Therefore, the analog pixel signal $V_{VSL}$ is input to the source electrode of the input transistor $PT_{11}$ through the signal line 32. For the input transistor $PT_{11}$, it is desirable to short-circuit a back gate and the source electrode in order to suppress a back gate effect.

In addition to the input transistor $PT_{11}$, the comparator 131 includes a capacitive element $C_{01}$, an auto-zero switch $SW_{AZ}$, the input-side load current source $I_{11}$, a capacitive element $C_{02}$, an input-side clamp transistor $PT_{13}$, an input-side clamp transistor $NT_{11}$, an output transistor $PT_{12}$, an output-side load current source $I_{12}$, and an output-side clamp transistor $NT_{12}$. The capacitive element $C_{01}$ is connected between a gate electrode of the input transistor $PT_{11}$ and a node of a predetermined reference voltage.

Here, as a fixed voltage (for example, a ground GND) is input as the predetermined reference voltage to the gate electrode of the input transistor $PT_{11}$ via the capacitive element $C_{01}$, there is an advantage that the size of the capacitive element $C_{01}$ can be reduced as compared with a case where a ramp wave reference signal $V_{RAMP}$ is input.

The auto-zero switch $SW_{AZ}$ is connected between the gate electrode and the drain electrode of the input transistor $PT_{11}$, and is turned on/off according to a drive signal AZ input from the timing control section 15 illustrated in FIG. 1 via an input terminal $T_{12}$. The auto-zero switch $SW_{AZ}$ is turned on to perform an auto zero operation (initialization operation) for short-circuiting between the gate electrode and the drain electrode of the input transistor $PT_{11}$. The auto-zero switch $SW_{AZ}$ can be configured using a P-channel or N-channel MOS transistor.

The input-side load current source $I_{11}$ has one end connected to the drain electrode of the input transistor $PT_{11}$ and the other end connected to a low-potential side power supply, for example, the ground GND. The input-side load current source $I_{11}$ supplies a constant current to a series connection circuit of the input transistor $PT_{11}$ and the signal line 32.

The capacitive element $C_{02}$ is connected in parallel to the input transistor $PT_{11}$. Specifically, one end of the capacitive element $C_{02}$ is connected to the source electrode of the input transistor $PT_{11}$, and the other end of the capacitive element $C_{02}$ is connected to the drain electrode of the input transistor $PT_{11}$. The capacitive element $C_{02}$ is a band-limiting capacitor.

The input-side clamp transistor $PT_{13}$ includes, for example, a P-channel MOS transistor, and is connected between the source electrode and the drain electrode of the input transistor $PT_{11}$. The input-side clamp transistor $PT_{13}$ has a diode-connected configuration in which a gate electrode and a source electrode are commonly connected, and has an action of suppressing a decrease of a drain voltage of the input transistor $PT_{11}$ when the input transistor $PT_{11}$ is in a non-conductive state.

The input-side clamp transistor $NT_{11}$ includes, for example, an N-channel MOS transistor, and has a drain electrode connected to the source electrode of the input transistor $PT_{11}$ and a source electrode connected to the drain electrode of the input transistor $PT_{11}$. A predetermined bias voltage bias1 is applied to a gate electrode of the input-side clamp transistor $NT_{11}$. Therefore, a drain voltage $V_d$ of the input transistor $PT_{11}$ can have a lower limit regardless of the voltage of the signal line 32, and the stop of the supply of the drain current can be directly prevented.

The output transistor $PT_{12}$ includes, for example, a P-channel MOS transistor, and is connected between one end of the signal line 32 and the output-side load current source $I_{12}$. Specifically, a source electrode of the output transistor $PT_{12}$ is connected to one end of the signal line 32, and a drain electrode thereof is connected to one end of the output-side load current source $I_{12}$. Therefore, the pixel signal $V_{VSL}$ is input to the source electrode of the output transistor $PT_{12}$ through the signal line 32. For the output transistor $PT_{12}$, it is desirable to short-circuit the hack gate and the source electrode in order to suppress the back gate effect.

The output-side load current source $I_{12}$ has one end connected to the drain electrode of the output transistor $PT_{12}$, and the other end connected to the low-potential side Dower supply, for example, the ground GND. The output-side load current source $I_{12}$ supplies a constant current to a series connection circuit of the output transistor $PT_{12}$ and the signal line 32.

A gate electrode of the output transistor $PT_{12}$ is connected to the drain electrode of the input transistor $PT_{11}$. Therefore, a drain voltage of the input transistor $PT_{11}$ is input to the gate electrode of the output transistor $PT_{12}$.

The output transistor $PT_{12}$ outputs a signal OUT indicating whether or not a voltage difference between the analog pixel signal $V_{VSL}$ input to the source electrode through the signal line 32 and the drain voltage $V_d$ of the input transistor $PT_{11}$ input to the gate electrode exceeds a predetermined threshold voltage from the drain electrode as a result of comparison between the analog pixel signal $V_{VSL}$ and the ramp wave reference signal $V_{RAMP}$ through an output terminal $T_{13}$.

The output-side clamp transistor $NT_{12}$ includes, for example, an N-channel MOS transistor, and has a drain electrode connected to the source electrode of the output transistor $PT_{12}$ and a source electrode connected to the drain electrode of the output transistor $PT_{12}$. A predetermined bias voltage bias2 is applied to a gate electrode of the output-side clamp transistor $NT_{12}$. The output-side clamp transistor $NT_{12}$ including an N-channel MOS transistor can specify the lower limit of the drain voltage of the output transistor $PT_{12}$.

As described above, the comparator 131 of the CMOS image sensor 1 according to the first embodiment has a circuit configuration in which the input-side load current source $I_{11}$ and the output-side load current source $I_{12}$ that supply a current to the signal line 32 are shared as a current source of the comparator 131, similarly to the comparator 131 according to the technology of the related art. With the comparator 131 having the circuit configuration, it is possible to reduce the power consumption of the analog-digital converter 130 and reduce the power consumption of the CMOS image sensor 1. That is, the comparator 131 according to the technology of the related art is an ultra-low power consumption type comparator.

In addition to the comparator 131 having the above-described configuration including the input transistor $PT_{11}$ connected between the signal line 32 and the input-side load current source $I_{11}$, the CMOS image sensor 1 according to the first embodiment includes a reference signal supply section 50 that supplies a predetermined reference signal, for example, the ramp wave reference signal $V_{RAMP}$, to the floating diffusion FD that is a charge-voltage conversion section of the pixel 20.

The reference signal supply section 50 includes a reference signal generation section 51 that generates the ramp wave reference signal $V_{RAMP}$, and an input capacitive element 52 that applies the ramp wave reference signal $V_{RAMP}$ generated by the reference signal generation section 51 to the floating diffusion FD. The reference signal generation section 51 generates the reference signal $V_{RAMP}$ having a waveform obtained by vertically inverting the ramp waveform of the reference signal $V_{RAMP}$ (that is, the reference signal $V_{RAMP}$ to be input to the gate electrode of the input transistor $PT_{11}$) according to the technology the related art.

FIG. 7 illustrates a tuning chart for describing an operation of the CMOS image sensor 1 according to the first embodiment. The timing chart of FIG. 7 illustrates a timing relationship among a selection signal SEL for driving a selection transistor 25 of the pixel 20, a reset signal RST for driving a reset transistor 23, a transfer signal TRG for driving a transfer transistor 22, and the analog pixel signal $V_{VSL}$. The timing chart of FIG. 7 further illustrates a timing relationship among the ramp wave reference signal $V_{RAMP}$ applied to the floating diffusion FD, the drive signal AZ of the auto-zero switch $SW_{AZ}$, and the pixel signal $V_{VSL}$ after ramp wave overlapping.

As described above, as the ramp wave reference signal $V_{RAMP}$ generated by the reference signal generation section 51 is applied to the floating diffusion FD via the input capacitive element 52, as illustrated in FIG. 8A, the pixel signal $V_{VSL}$ in which the ramp wave reference signal $V_{RAMP}$ overlaps the potential of the floating diffusion FD is read from the signal line 32. Then, in a column-parallel analog-digital conversion section 13, in the comparator 131 provided for each pixel column, as illustrated in FIG. 8B, processing of comparing the pixel signal $V_{VSL}$, which is supplied through the signal line 32 and with which the ramp wave reference signal $V_{RAMP}$ overlaps, with the predetermined reference voltage (for example, the ground GND) input to the gate electrode of the input transistor $PT_{11}$ is performed. As a result, a pulse signal having a pulse width corresponding to a signal level of the pixel signal $V_{VSL}$, specifically, a pulse width corresponding to the magnitude of the signal level is output from the comparator 131 as a comparison result on the basis of a timing at which the ramp wave reference signal $V_{RAMP}$ crosses the predetermined reference voltage.

Second Embodiment of Present Disclosure

In the CMOS image sensor 1 according to the first embodiment, as the ramp wave reference signal $V_{RAMP}$ applied to the floating diffusion FD, a signal having a waveform obtained by vertically inverting the ramp waveform of the reference signal $V_{RAMP}$ (that is, the reference signal $V_{RAMP}$ to be input to the gate electrode of the input transistor $PT_{11}$) according to the technology of the related art is used. In the signal having the waveform obtained by vertically inverting the ramp waveform of the reference signal $V_{RAMP}$ according to the technology of the related art, it is necessary to set settling periods of the reset signal (P-phase signal) and the data signal (D-phase signal) to be long.

In order to reliably cause inversion and ensure linearity, an offset is provided in front of a slope portion in the ramp wave reference signal $V_{RAMP}$. That is, the ramp wave reference signal $V_{RAMP}$ includes the slope portion and an offset portion. This is because a step of the offset portion causes the waveform to be blunted in the signal line 32 due to an influence of a large time constant of the signal line 32, and it is necessary to wait for settling. However, as the settling periods of the reset signal (P-phase signal) and the data signal (D-phase signal) are increased, the entire time necessary for the analog-digital conversion in the column-parallel analog-digital conversion section 13 increases accordingly. As a result, a frame rate is lowered or a time average of power consumption is deteriorated.

In order to solve this problem, in a CMOS image sensor 1 according to a second embodiment of the present disclosure, an offset portion of a ramp wave reference signal $V_{RAMP}$ including a slope portion and the offset portion is separated from the ramp waveform, vertically inverted, and supplied to a gate electrode of an input transistor $PT_{11}$ via a capacitive element $C_{01}$.

(Example of Circuit Configuration for One Pixel Column Including Comparator)

Figure 9:
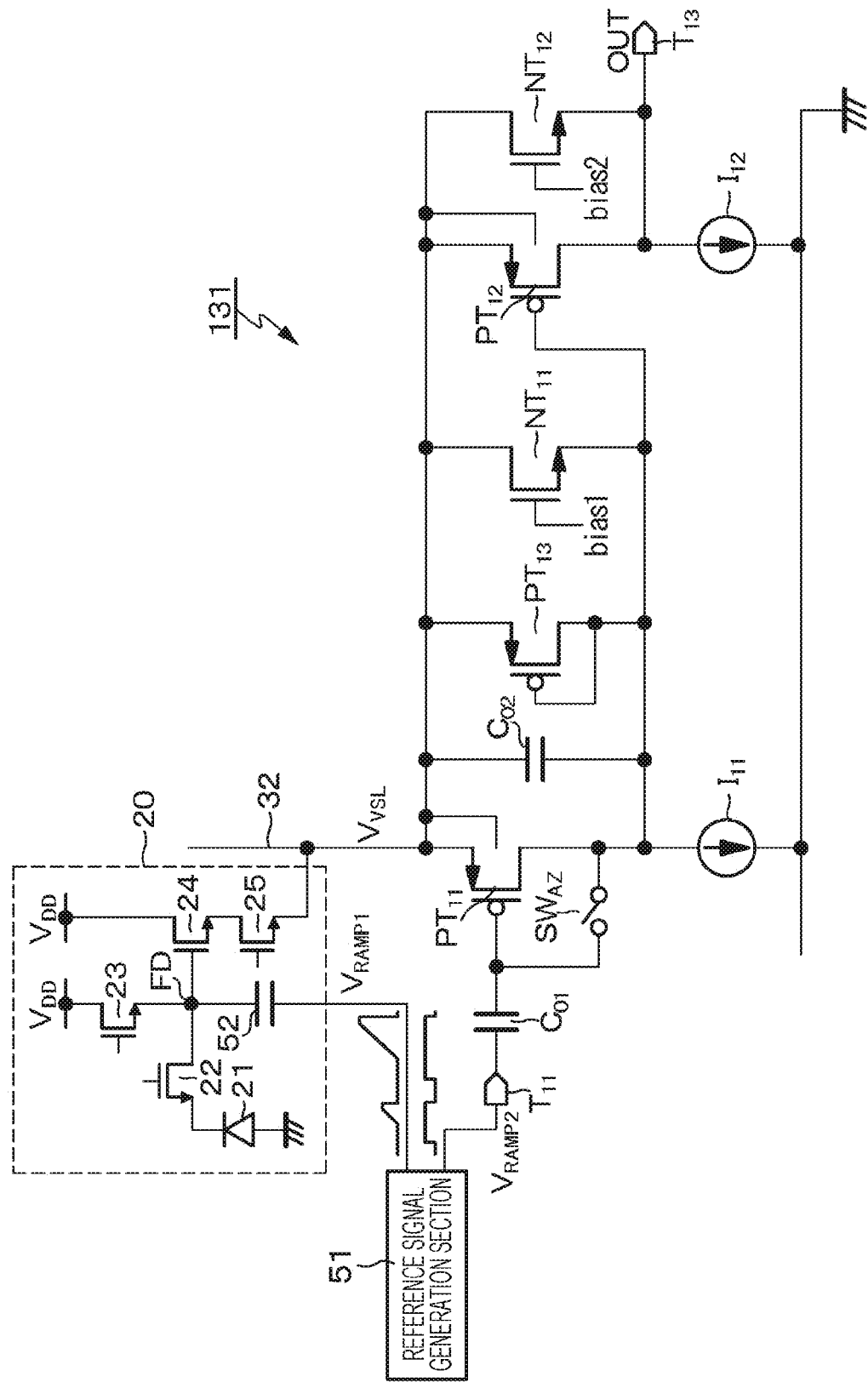
FIG. 9 is a circuit diagram illustrating an example of a circuit configuration for one pixel column including a comparator of a CMOS image sensor according to a second embodiment of the present disclosure.
Figure 10:
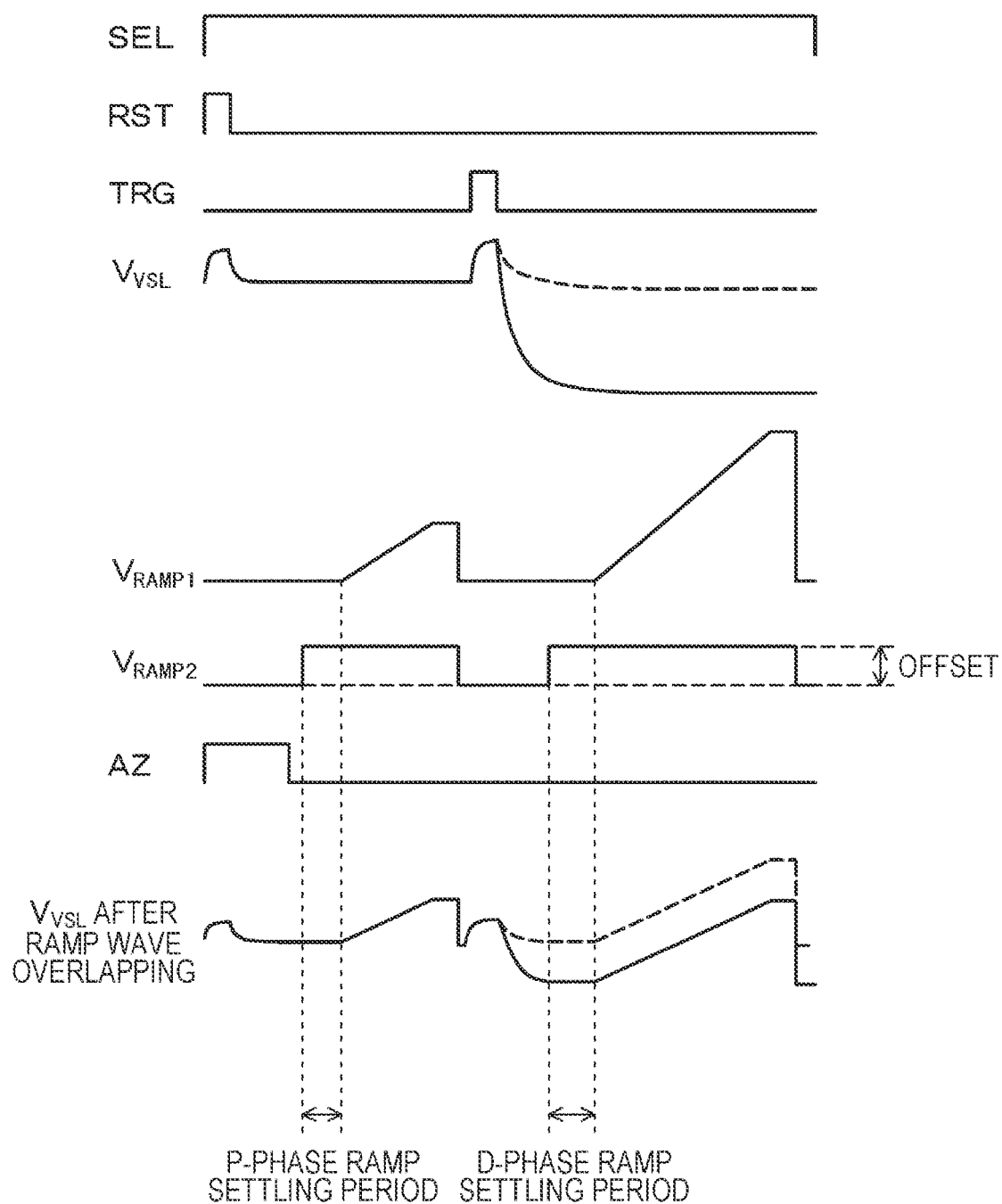
FIG. 10 is a timing chart for describing an operation of the CMOS image sensor according to the second embodiment of the present disclosure.

FIG. 9 illustrates an example of a circuit configuration for one pixel column including a comparator of the CMOS image sensor 1 according to the second embodiment of the present disclosure, and FIG. 10 illustrates a timing chart for describing an operation of the CMOS image sensor 1 according to the second embodiment.

In the CMOS image sensor 1 according to the second embodiment, a reference signal generation section 51 separates the ramp wave reference signal $V_{RAMP}$ including the slope portion and the offset portion into the slope portion and the offset portion, outputs the slope portion as a reference signal $V_{RAMP1}$, vertically inverts the offset portion, and outputs the inverted offset portion as a reference signal $V_{RAMP2}$. The reference signal $V_{RAMP1}$ that is the slope portion is applied to a floating diffusion FD via an input capacitive element 52. The reference signal $V_{RAMP2}$ that is the offset portion is supplied as a predetermined reference voltage to the gate electrode of the input transistor $PT_{11}$ via an input terminal $T_{11}$ and a capacitive element $C_{01}$.

As described above, in the CMOS image sensor 1 according to the second embodiment of the present disclosure, the offset portion of the ramp wave reference signal $V_{RAMP}$ including the slope portion and the offset portion is separated from the ramp waveform, vertically inverted, and supplied to the gate electrode of the input transistor $PT_{11}$ via the capacitive element $C_{01}$. As a result, although the reference signal $V_{RAMP1}$ that is the slope portion overlaps a pixel signal $V_{VSL}$, the step of the offset portion is not placed on the pixel signal $V_{VSL}$. Therefore, the waveform is not blunted in the signal line 32 due to the influence of the large time constant of the signal line 32, and it is not necessary to wait for settling. Then, a waveform of a gate-source voltage $V_{gs}$ of the input transistor $PT_{11}$ including a P-channel MOS transistor is "$V_{RAMP1}$-$V_{RAMP2}$", which is the same as the original ramp wave reference signal $V_{RAMP}$. Therefore, as a circuit operation, the same output as in a case of the CMOS image sensor 1 according to the first embodiment can be obtained.

Third Embodiment of Present Disclosure

A third embodiment of the present disclosure is an example in which a ramp wave reference signal $V_{RAMP}$ is supplied to a shared floating diffusion FD in a CMOS image sensor 1 in which pixel circuits that serve as a charge-voltage conversion section at the downstream of the floating diffusion ED are shared among a plurality of pixels.

(Example of Circuit Configuration for One Pixel Column Including Comparator)

Figure 11:
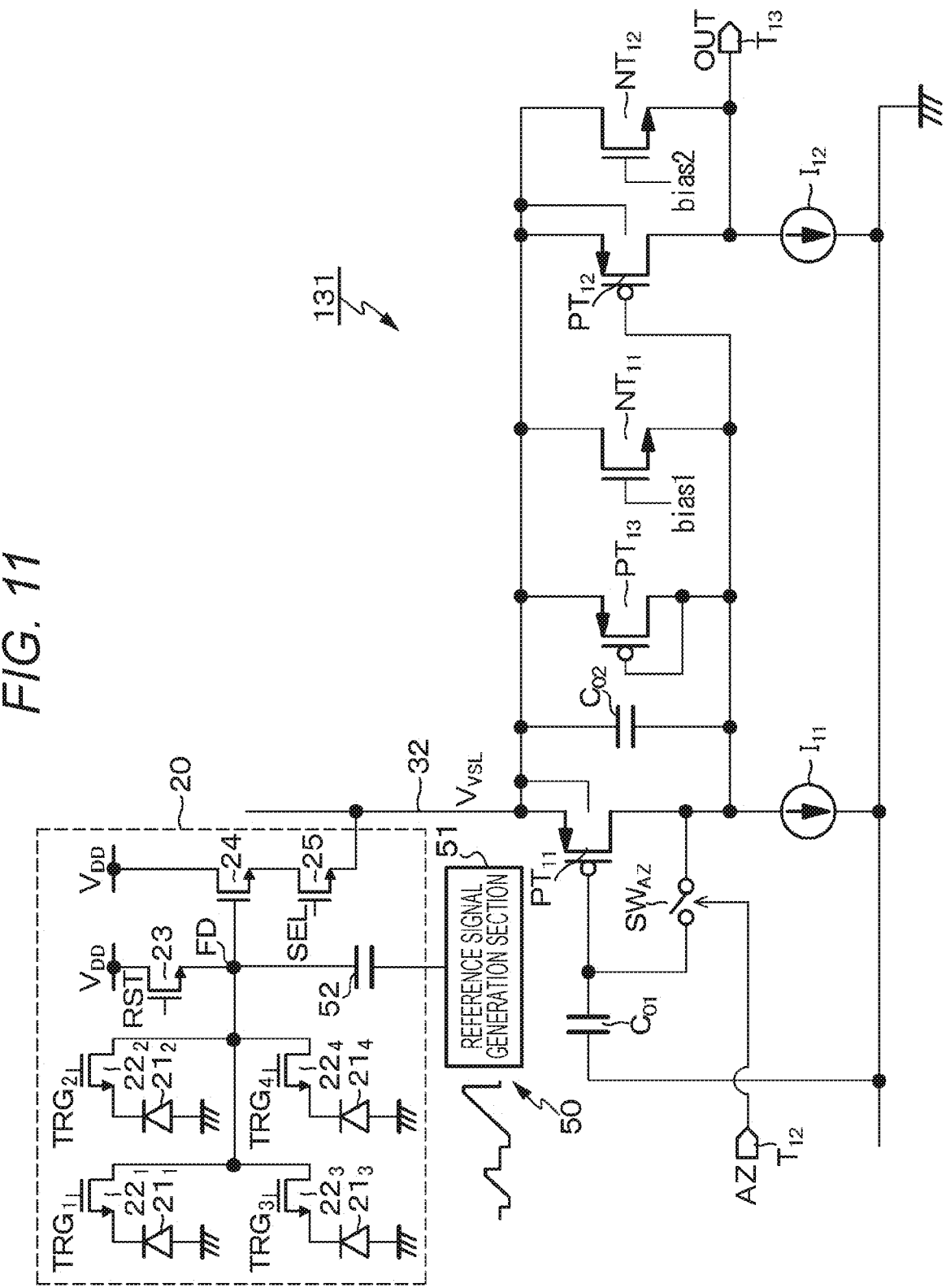
FIG. 11 is a circuit diagram illustrating an example of a circuit configuration for one pixel column including a comparator of a CMOS image sensor according to a third embodiment of the present disclosure.

FIG. 11 illustrates an example of a circuit configuration for one pixel column including a comparator of the CMOS image sensor 1 according to the third embodiment of the present disclosure.

In the example of the pixel configuration illustrated in FIG. 11, for example, four pixels share the pixel circuits in a stage subsequent to the floating diffusion FD. Specifically, the four pixels are a first pixel including a photodiode $21_1$ and a transfer transistor $22_1$, a second pixel including a photodiode $21_2$ and a transfer transistor $22_2$, a third pixel including a photodiode $21_3$ and a transfer transistor $22_3$, and a fourth pixel including a photodiode $21_4$ and a transfer transistor $22_4$.

The first to fourth pixels share the pixel circuits at the downstream of the floating diffusion FD, that is, the floating diffusion FD, a reset transistor 23, an amplification transistor 24, and a selection transistor 25. Then, the CMOS image sensor 1 according to the third embodiment has a configuration in which the ramp wave reference signal $V_{RAMP}$ generated by a reference signal generation section 51 is applied to the floating diffusion FD shared among the four pixels via an input capacitive element 52.

Also in the CMOS image sensor 1 according to the third embodiment in which the pixel sharing is made, as the ramp wave reference signal $V_{RAMP}$ is applied to the floating diffusion FD shared among the pixels via the input capacitive element 52, it is possible to obtain actions and effects similar to those of the CMOS image sensor 1 according to the first embodiment.

Note that, here, a case where the technology according to the first embodiment is applied to the CMOS image sensor 1 according to the third embodiment in which the pixel sharing is made has been described as an example. However, it is also possible to apply the technology according to the second embodiment, that is, a technology of separating an offset portion from a ramp waveform of the ramp wave reference signal $V_{RAMP}$, vertically inverting the offset portion, and supplying the inverted offset portion to a gate electrode of an input transistor $PT_{11}$ via a capacitive element $C_{01}$.

<Configuration Example of Reference Signal Supply Section>

Next, for example, a specific example of a configuration example of the reference signal supply section 50 that supplies the ramp wave reference signal $V_{RAMP}$ to the floating diffusion FD in the CMOS image sensor 1 according to the first embodiment will be described below.

Example 1

Figure 12:
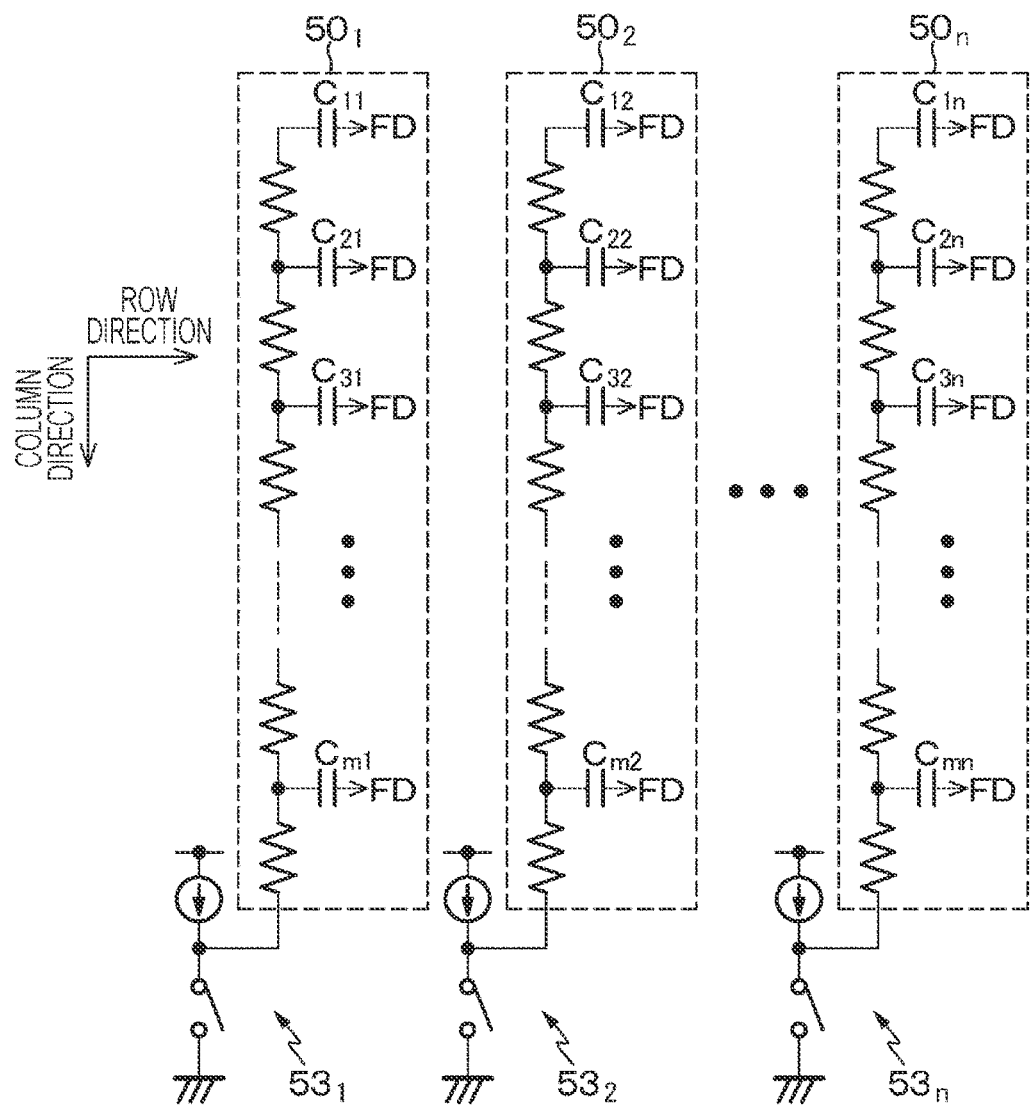
FIG. 12 is a circuit diagram illustrating an example of a configuration of a reference signal supply section according to Example 1.

Example 1 is an example in which the ramp wave reference signal $V_{RAMP}$ is supplied to the floating diffusion FD along the column direction of the matrix pixel array. FIG. 12 illustrates an example of a configuration of a reference signal supply section according to Example 1.

In FIG. 12, in the correspondence relationship with the circuit configuration example of FIG. 6 and the like, the input capacitive elements 52 of the reference signal supply sections 50 ($50_1$ to $50_n$) are described as $C_{11}$ to $C_{mn}$ corresponding to the respective pixels of a pixel array of m rows and n columns. In addition, resistors illustrated by symbols of resistance elements represent wiring resistors of the reference signal supply sections 50. The same applies to the respective Examples as described later.

The reference signal supply sections 50 according to Example 1 include current integration type digital-analog converters $53_1$ to $53_n$ provided for the respective pixel columns as the reference signal generation sections 51, and has a configuration which current integration capacitors of the current integration type digital-analog converters $53_1$ to $53_n$ are arranged for the respective pixels along the column direction for the respective pixel columns to form the input capacitive elements 52 of the ramp wave reference signal $V_{RAMP}$.

According to the configuration example of the reference signal supply section 50 according to Example 1, since a wiring of the ramp wave reference signal $V_{RAMP}$ is separated for each pixel column, an interference via the wiring can be suppressed to be very small.

Example 2

Figure 13:
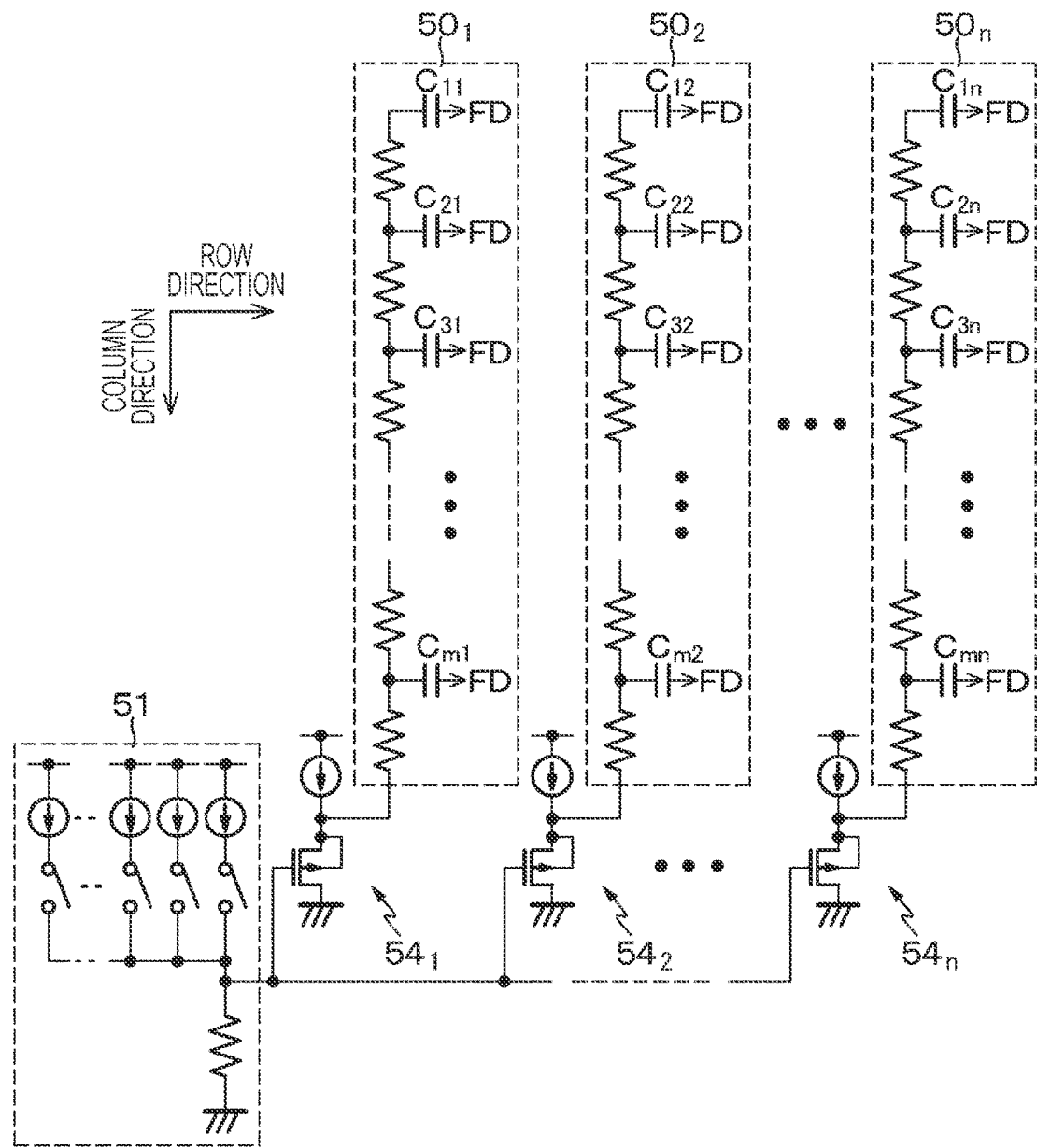
FIG. 13 is a circuit diagram illustrating an example of a configuration of a reference signal supply section according to Example 2.

Example 2 is a modified example of Example 1, and is an example in which the reference signal generation section 51 is arranged common to all the pixel columns. FIG. 13 illustrates an example of a configuration of a reference signal supply section according to Example 2.

The reference signal supply section 50 according to Example 2 has a configuration in which the reference signal generation section 51 is arranged common to all pixel columns. As the reference signal generation section 51 that intensively generates the ramp wave reference signal $V_{RAMP}$ for all the pixel columns, a current steering type digital-analog converter or a current integration digital-analog converter can be used. The ramp wave reference signal $V_{RAMP}$ generated by the reference signal generation section 51 is supplied to each pixel column via buffers $54_1$ to $54_n$.

According to the configuration example of the reference signal supply section 50 according to Example 2, the wiring of the ramp wave reference signal $V_{RAMP}$ is separated by the buffers $54_1$ to $54_n$ for each pixel column, and the current consumption increases, but an interference via the wiring of the ramp wave reference signal $V_{RAMP}$ can be suppressed to be very small. Furthermore, since the ramp wave reference signal $V_{RAMP}$ is intensively generated for all the pixel columns, it is possible to reduce the mismatch between the pixel columns.

Example 3

Figure 14:
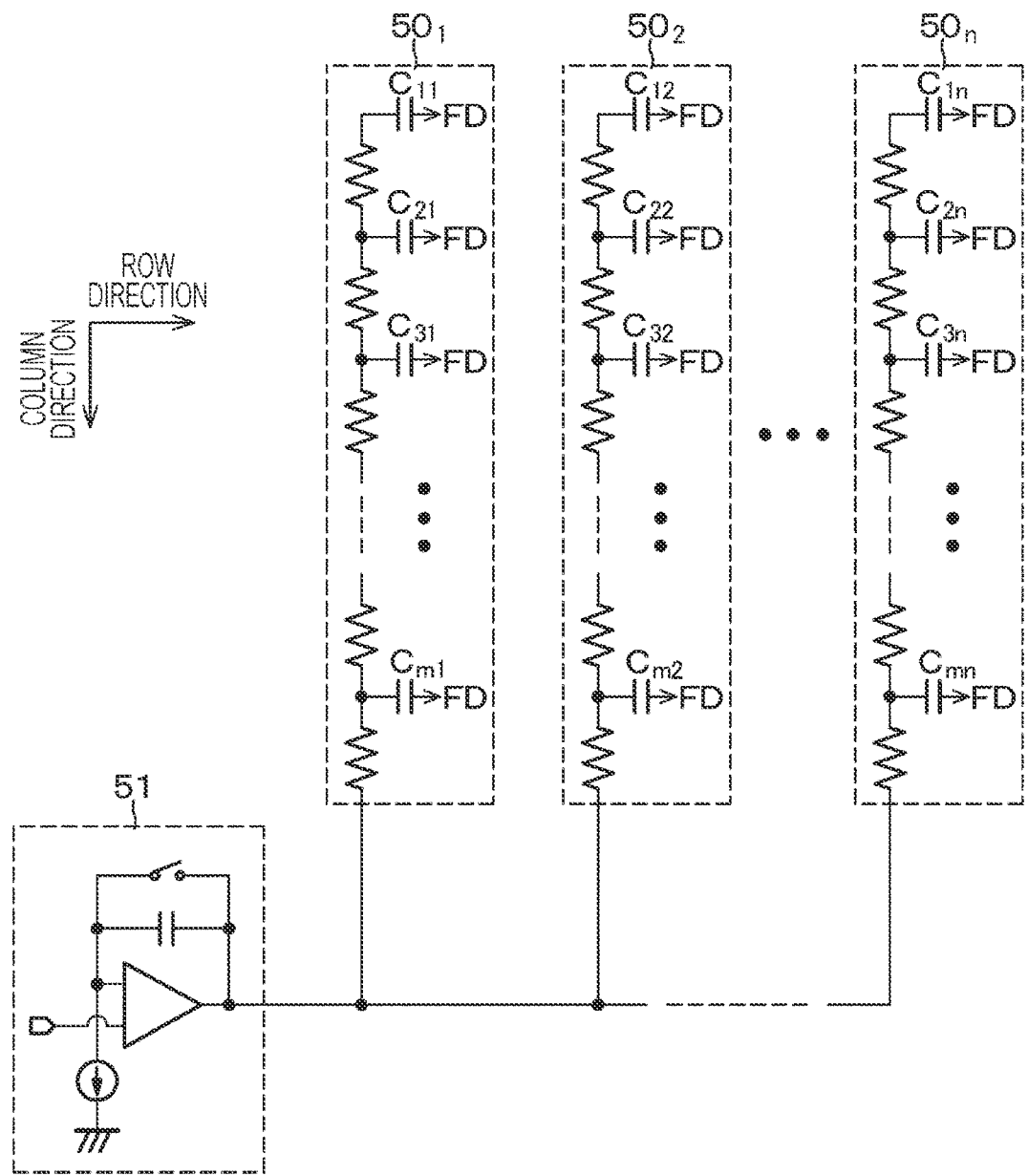
FIG. 14 is a circuit diagram illustrating an example of a configuration of a reference signal supply section according to Example 3.

Example 3 is a modified example of Example 2, and is an example in which the reference signal generation section 51 is arranged common to all the pixel columns, and the reference signal $V_{RAMP}$ generated by the reference signal generation section 51 is directly supplied to each pixel column FIG. 14 illustrates an example of a configuration of a reference signal supply section according to Example 3.

In the reference signal supply section 50 according to Example 3, the reference signal generation section 51 is arranged common to all the pixel columns, and the ramp wave reference signal $V_{RAMP}$ generated by the reference signal generation section 51 is directly supplied to the wiring of the ramp wave reference signal $V_{RAMP}$ of each pixel column. As the reference signal generation section 51 that intensively generates the ramp wave reference signal $V_{RAMP}$ for all the pixel columns, a current steering type digital-analog converter or a current integration digital-analog converter can be used.

In a case of the reference signal supply section 50 according to Example 3, since the buffers $54_1$ to $54_n$ of Example 2 are not interposed between the wirings of the ramp wave reference signal $V_{RAMP}$ and the reference signal supply section 50, power consumption can be reduced as compared with a case of the reference signal supply section 50 of Example 2. Furthermore, since the buffers $54_1$ to $54_n$ are not interposed for the respective pixel columns, it is possible to minimize the mismatch between the pixel columns.

Example 4

Figure 15:
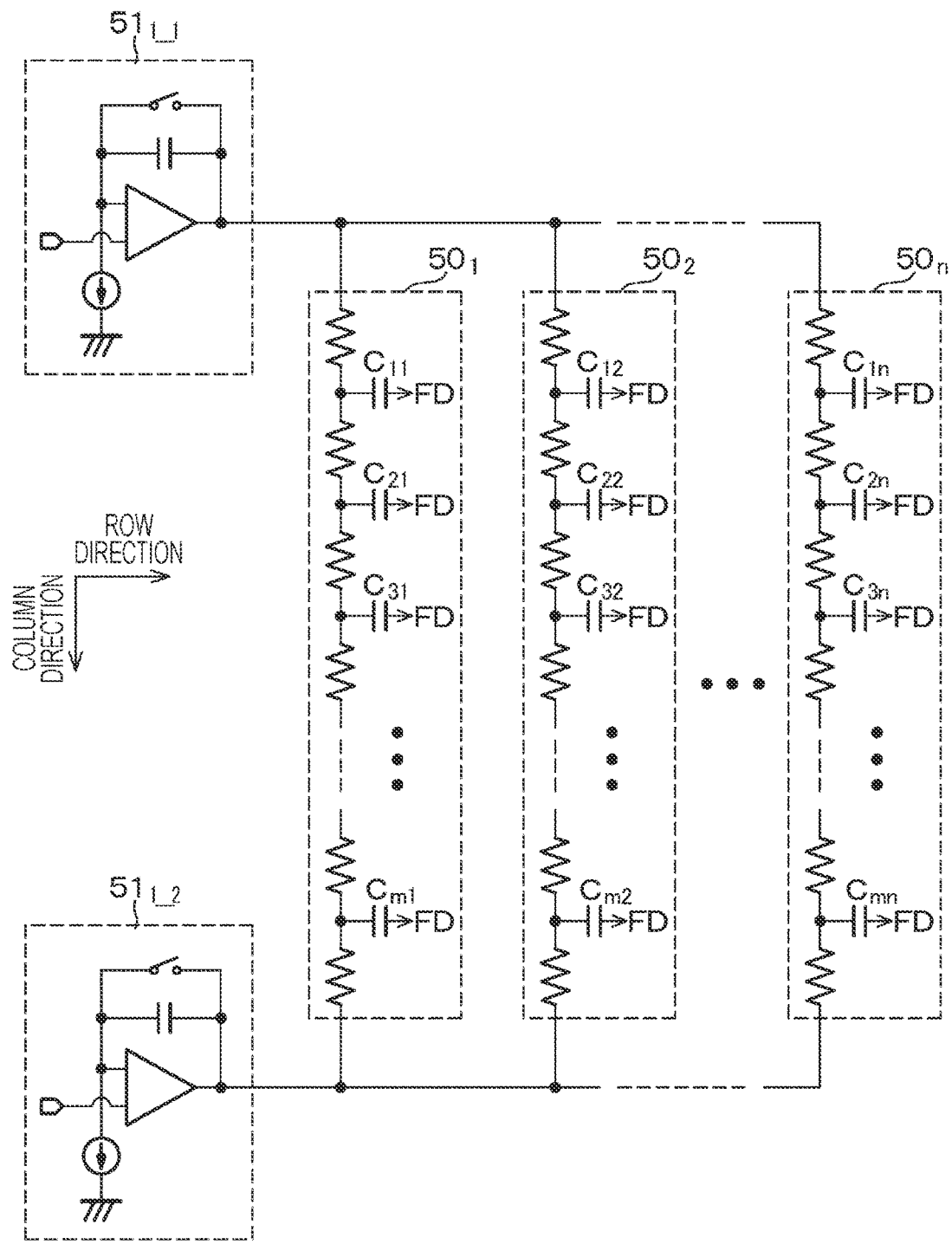
FIG. 15 is a circuit diagram illustrating an example of a configuration of a reference signal supply section according to Example 4.

Example 4 is a modified example of Example 3, and is an example of driving from both upper and lower sides of the matrix pixel array. FIG. 15 illustrates an example of a configuration of a reference signal supply section according to Example 4.

The reference signal supply section 50 according to Example 4 has a configuration in which reference signal generation sections $51_{1\_1}$ and $51_{1\_2}$ are arranged on the upper and lower sides in the pixel column direction of the matrix pixel array, respectively, and are driven from the upper and lower sides of the matrix pixel array, that is, the generated ramp wave reference signal $V_{RAMP}$ is supplied for each pixel column. Here, an example of the configuration of the reference signal supply sections driven from the upper and lower sides has been described, but the present disclosure is not limited to this configuration. In a case of supplying from both the upper and lower sides of the matrix pixel array, there is a possibility that the timing is slightly shifted between the upper and lower sides due to a delay of a control signal or the like, but since the reference signal $V_{RAMP}$ is a ramp wave, there is no problem in operation even in a case where the timing is slightly shifted.

In a case of the reference signal supply section 50 of Example 4, as the ramp wave reference signal $V_{RAMP}$ is supplied from both the upper and lower sides of the matrix pixel array, a maximum delay amount can be reduced, and shading, a maximum value of an interference, and a difference between the upper side and the lower side can be suppressed, such that the image quality can be improved.

Example 5

Figure 16:
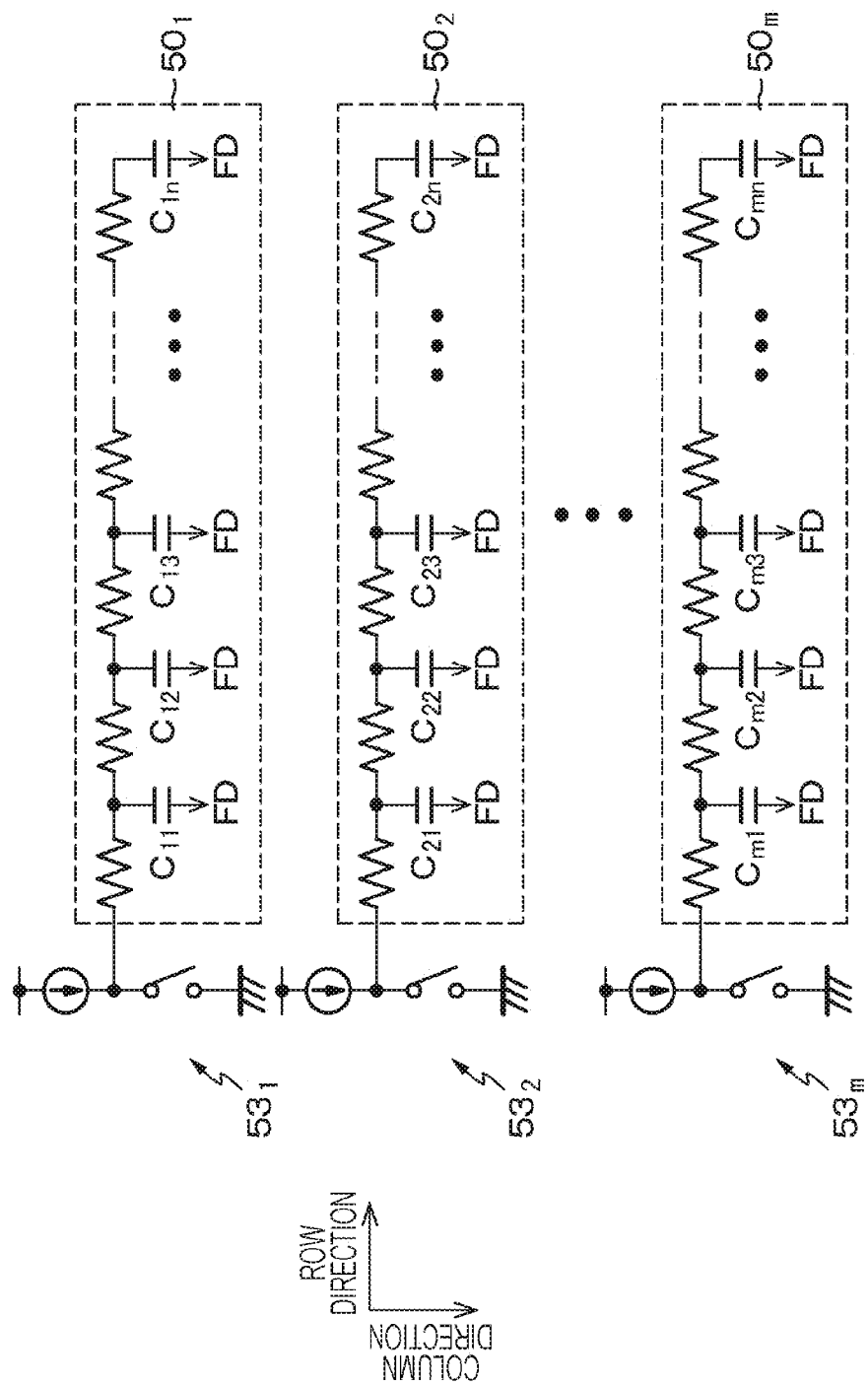
FIG. 16 is a circuit diagram illustrating an example of a configuration of a reference signal supply section according to Example 5.

Example 5 is an example in which the ramp wave reference signal $V_{RAMP}$ is supplied to the floating diffusion HD along the row direction of the matrix pixel array. FIG. 16 illustrates an example of a configuration of a reference signal supply section according to Example 5.

The reference signal supply sections 50 according to Example 5 include current integration type digital-analog converters $53_1$ to $53_n$ provided for the respective pixel rows as the reference signal generation sections 51, and has a configuration in which current integration capacitors of the current integration type digital-analog converters $53_1$ to $53_n$ are arranged for the respective pixels along the row direction for the respective pixel rows to form the input capacitive elements 52 of the ramp wave reference signal $V_{RAMP}$.

According to the configuration example of the reference signal supply section 50 according to Example 5, since the wiring of the ramp wave reference signal $V_{RAMP}$ is not separated for each pixel column, the problem of interference via the wiring is likely to occur as compared with a case where the wiring of the ramp wave reference signal $V_{RAMP}$ is separated for each pixel column. However, since it is only necessary to drive only the pixel row from which the pixel signal is read, power consumption can be suppressed to be small.

Example 6

Figure 17:
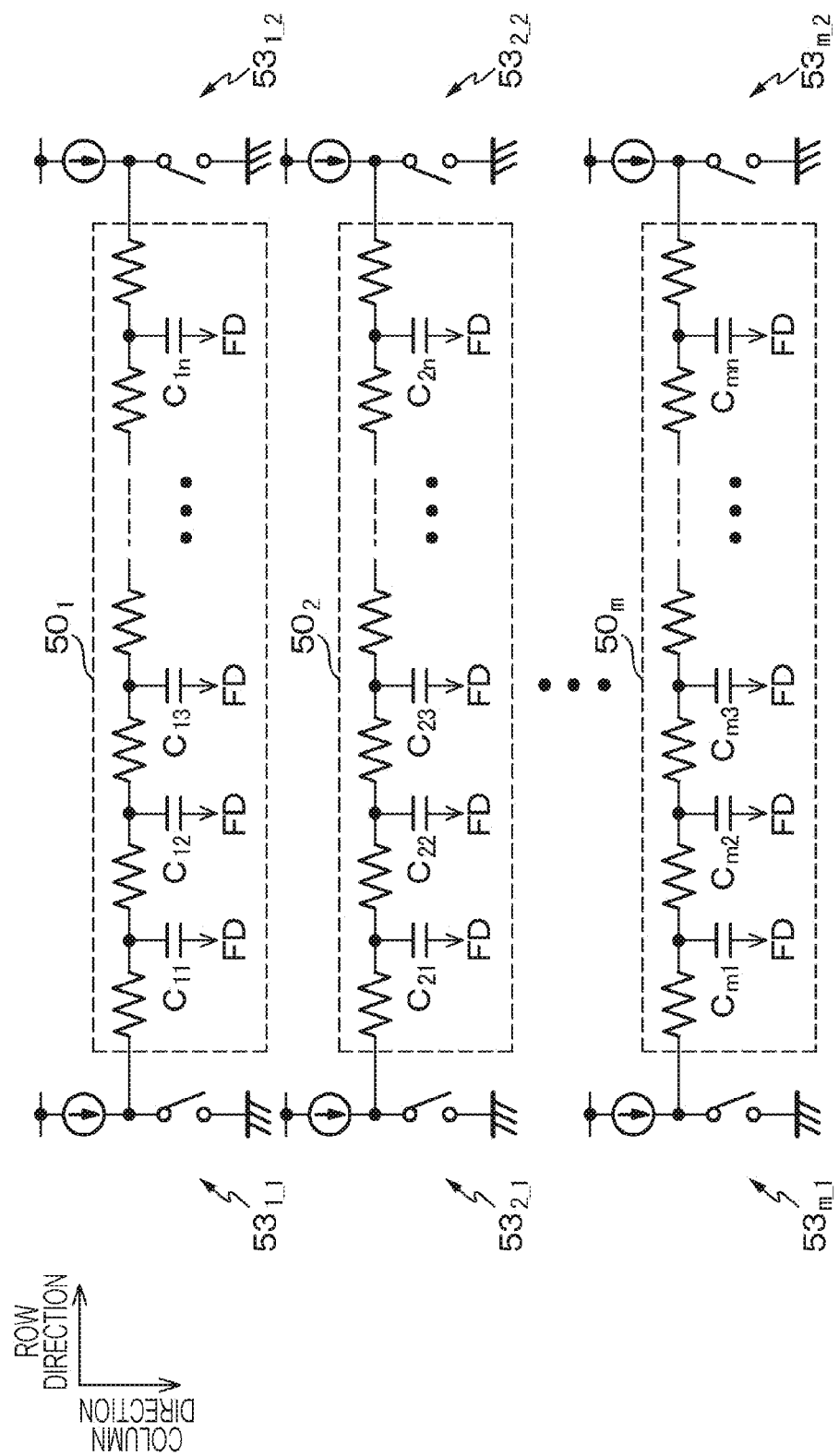
FIG. 17 is a circuit diagram illustrating an example of a configuration of a reference signal supply section according to Example 6.

Example 6 is a modified example of Example 5, and is an example of driving from both left and right sides of the matrix pixel array. FIG. 17 illustrates an example of a configuration of a reference signal supply section according to Example 6.

The reference signal supply section 50 according to Example 6 has a configuration in which current integration type digital-to-analog converters $53_{1\_1}$ to $53_{m\_1}$ and $53_{1\_2}$ to $53_{m\_2}$ are arranged on the left and right sides in the pixel row direction of the matrix pixel array, respectively, and are driven from the left and right sides of the matrix pixel array, that is, the generated ramp wave reference signal $V_{RAMP}$ is supplied for each pixel row. Here, an example of the configuration of the reference signal supply sections driven from the left and right sides has been described, but the present disclosure is not limited to this configuration. In a case of supplying from both the left and right sides of the matrix pixel array, there is a possibility that the timing is slightly shifted between the left and right sides due to a delay of a control signal or the like, but since the reference signal $V_{RAMP}$ is a ramp wave, there is no problem in operation even in a case where the timing is slightly shifted.

In a case of the reference signal supply section 50 of Example 6, as the ramp wave reference signal $V_{RAMP}$ is supplied from both the left and right sides of the matrix pixel array, a maximum delay amount can be reduced, and shading, a maximum value of an interference, and a difference between the left side and the right side can be suppressed, such that the image quality can be improved.

Example 7

Figure 18:
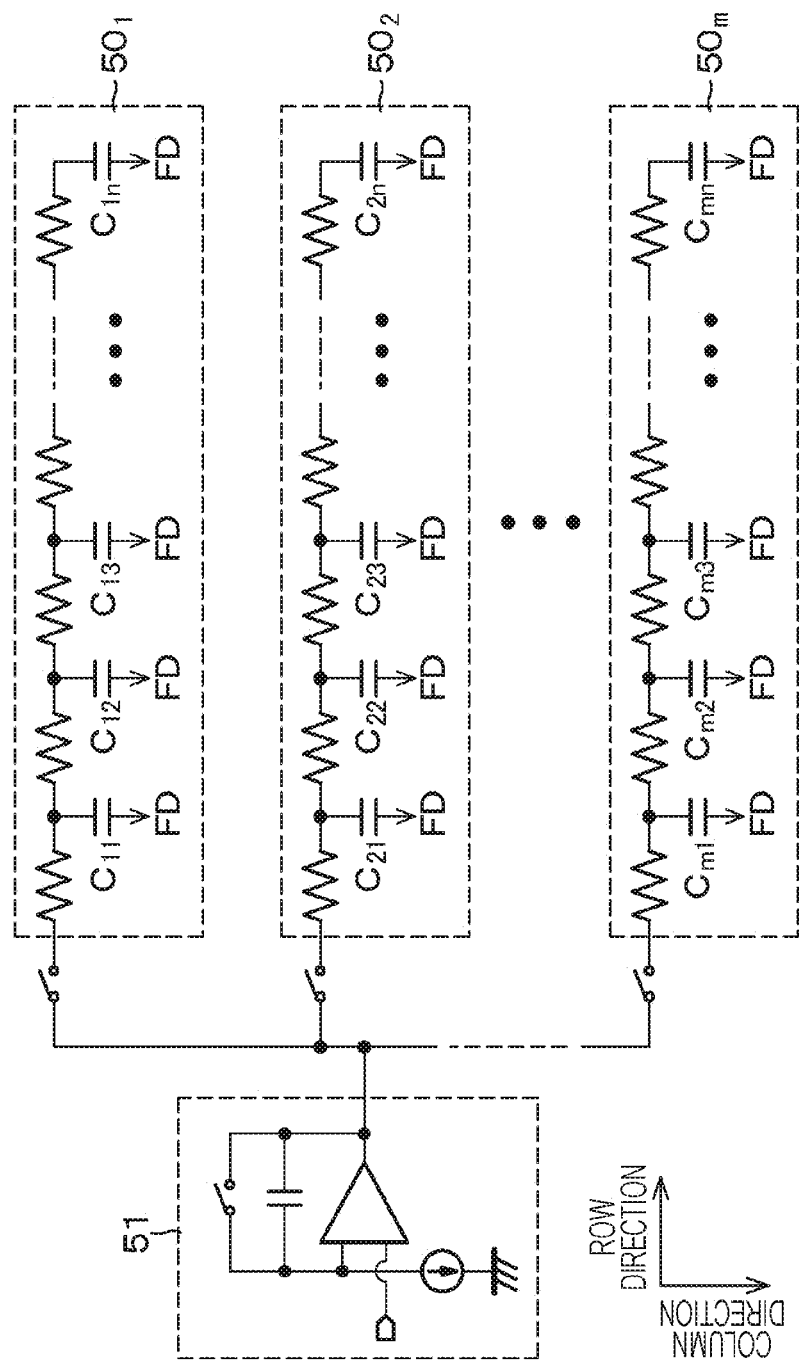
FIG. 18 is a circuit diagram illustrating an example of a configuration of a reference signal supply section according to Example 7.

Example 7 is a modified example of Example 5, and is an example in which the reference signal generation section 51 is arranged common to all pixel rows, and the reference signal $V_{RAMP}$ generated by the reference signal generation section 51 is supplied to each pixel row. FIG. 18 illustrates an example of a configuration of a reference signal supply section according to Example 7.

In the reference signal supply section 50 according to Example 7, the reference signal generation section 51 is arranged common to all pixel rows, and the ramp wave reference signal $V_{RAMP}$ generated by the reference signal generation section 51 is supplied to the wiring of the ramp wave reference signal $V_{RAMP}$ of each pixel column via switches $S_1$ to $S_m$. As the reference signal generation section 51 that intensively generates the ramp wave reference signal $V_{RAMP}$ for all the pixel rows, a current steering type digital-analog converter or a current integration digital-analog converter can be used.

In a case of the reference signal supply section 50 according to Example 7, since the wiring of the ramp wave reference signal $V_{RAMP}$ is not separated for each pixel column, the problem of interference via the wiring is likely to occur as compared with a case where the wiring of the ramp wave reference signal $V_{RAMP}$ is separated for each pixel column. However, since it is only necessary to connect only the pixel row from which the pixel signal is read via the switches $S_1$ to $S_m$, power consumption can be suppressed to be small. Furthermore, since the ramp wave reference signal $V_{RAMP}$ is intensively generated for all the pixel rows, it is possible to reduce the mismatch between the pixel rows.

Example 8

Figure 19:
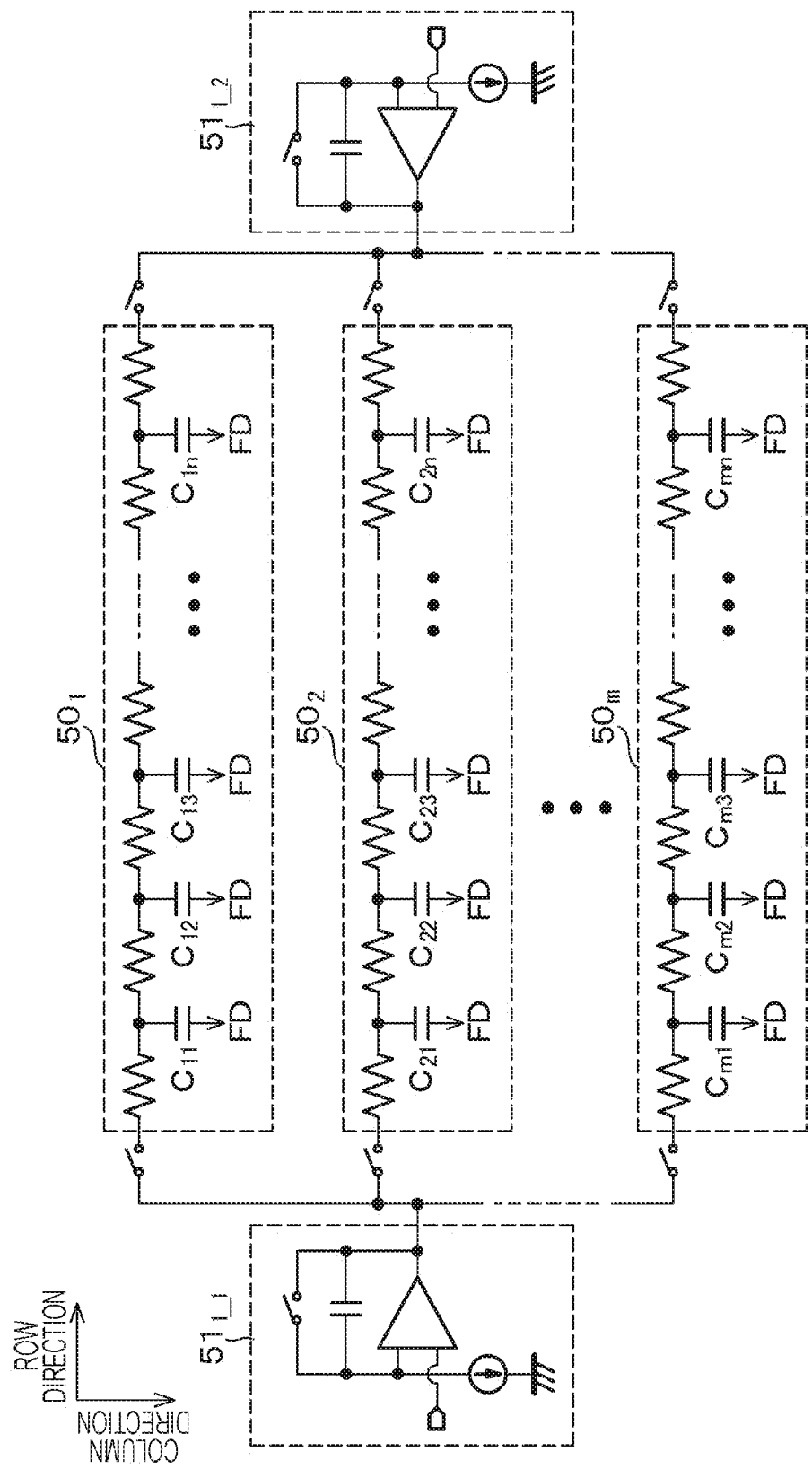
FIG. 19 is a circuit diagram illustrating an example of a configuration of a reference signal supply section according to Example 8.

Example 8 is a modified example of Example 7, and is an example of driving from both left and right sides of the matrix pixel array. FIG. 19 illustrates an example of a configuration of a reference signal supply section according to Example 8.

The reference signal supply section 50 according to Example 8 has a configuration in which reference signal generation sections $51_{1\_1}$ and $51_{1\_2}$ are arranged on the left and right sides in the pixel row direction of the matrix pixel array, respectively, and are driven from the left and right sides of the matrix pixel array, that is, the generated ramp wave reference signal $V_{RAMP}$ is supplied for each pixel row.

Here, an example of the configuration of the reference signal supply sections driven from the left and right sides has been described, but the present disclosure is not limited to this configuration. In a case of supplying from both the left and right sides of the matrix pixel array, there is a possibility that the timing is slightly shifted between the left and right sides due to a delay of a control signal or the like, but since the reference signal $V_{RAMP}$ is a ramp wave, there is no problem in operation even in a case where the timing is slightly shifted.

In a case of the reference signal supply section 50 of Example 8, as the ramp wave reference signal $V_{RAMP}$ is supplied from both the left and right sides of the matrix pixel array, a maximum delay amount can be reduced, and shading, a maximum value of an interference, and a difference between the left side and the right side can be suppressed, such that the image quality can be improved.

Example 9

Figure 20:
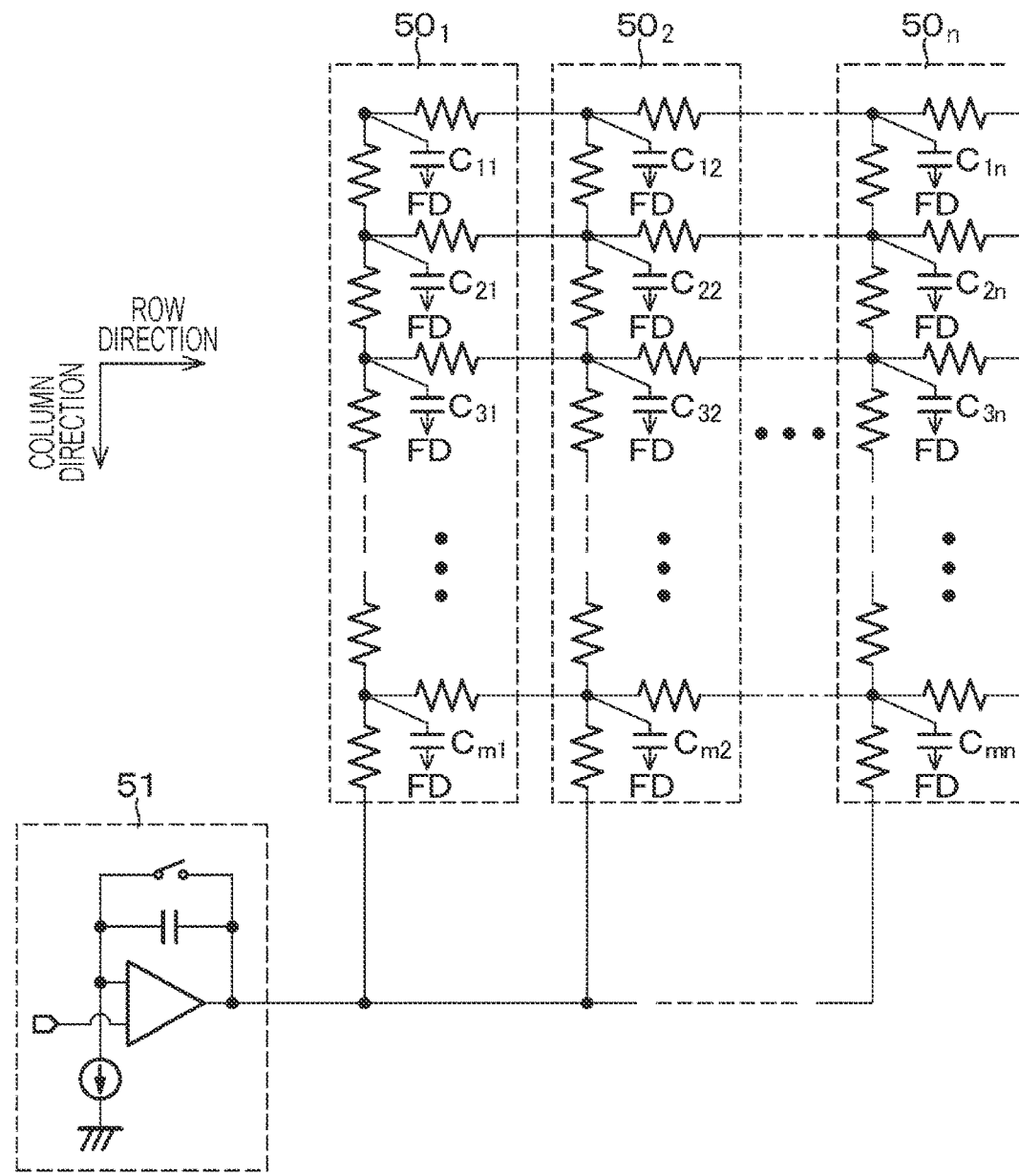
FIG. 20 is a circuit diagram illustrating an example of a configuration of a reference signal supply section according to Example 9.

Example 9 is an example in which the ramp wave reference signal $V_{RAMP}$ is supplied in a mesh pattern in pixel units. This is an example of driving from both left and right sides of the matrix pixel array. FIG. 20 illustrates an example of a configuration of a reference signal supply section according to Example 9.

The reference signal supply section 50 according to Example 9 has a configuration in which the reference signal generation section 51 is provided common to all the pixels, and the reference signal generation section 51 supplies the ramp wave reference signal $V_{RAMP}$ to all the pixels in a mesh pattern in pixel units. As the reference signal generation section 51, a current steering type digital-analog converter or a current integration type digital-analog converter can be used.

According to the configuration example of the reference signal supply section 50 of Example 9, since the wiring of the ramp wave reference signal $V_{RAMP}$ is not separated for each pixel column, there is a possibility that an interference via the wiring may occur as compared with a case where the wiring of the ramp wave reference signal $V_{RAMP}$ is separated for each pixel column. However, since the buffer is not interposed between the wiring of the reference signal $V_{RAMP}$ and the reference signal generation section 51, power consumption can be suppressed to be small. Furthermore, since the ramp wave reference signal $V_{RAMP}$ is supplied in a mesh pattern in pixel units, it is possible to minimize the mismatch between the pixel rows/pixel columns.

Example 10

Figure 21:
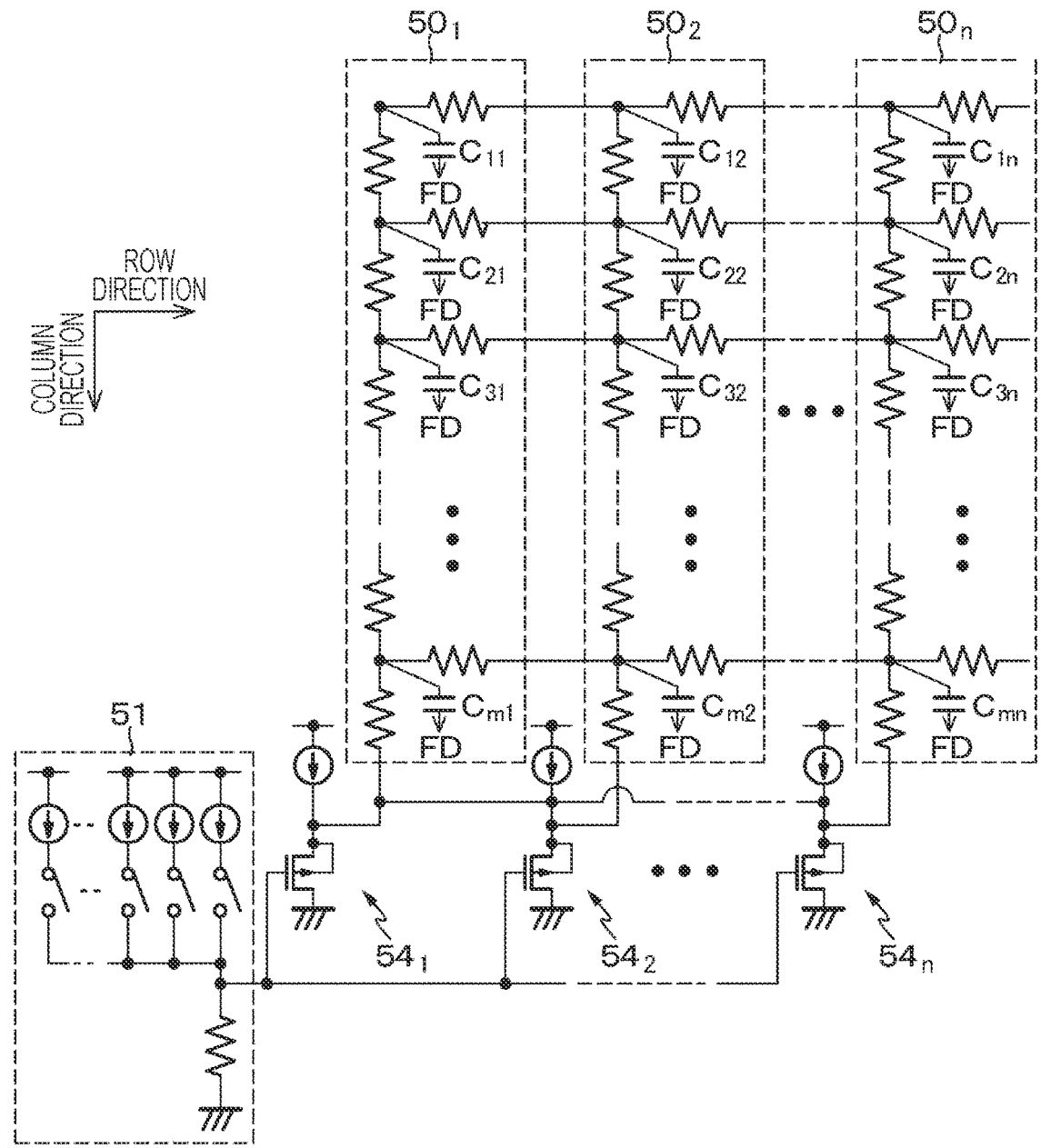
FIG. 21 is a circuit diagram illustrating an example of a configuration of a reference signal supply section according to Example 10.

Example 10 is a modified example of Example 9, and is an example in which the buffer is interposed between the wiring of the reference signal $V_{RAMP}$ and the reference signal generation section 51. FIG. 21 illustrates an example of a configuration of a reference signal supply section according to Example 10.

The reference signal supply section 50 according to Example 10 has a configuration in which the buffers $54_1$ to $54_n$ are provided between the wirings of the reference signal $V_{RAMP}$ and the reference signal generation section 51 in the configuration in which the ramp wave reference signal $V_{RAMP}$ is supplied in a mesh pattern in pixel units. As the reference signal generation section 51, a current steering type digital-analog converter or a current integration type digital-analog converter can be used.

According to the configuration example of the reference signal supply section 50 according to Example 10, since the buffers $54_1$ to $54_n$ are interposed between the wirings of the reference signal $V_{RAMP}$ and the reference signal generation section 51, although power consumption increases as compared with a case where the buffer is not interposed, settling can be improved and an interference via the wiring of the ramp wave reference signal $V_{RAMP}$ can also be suppressed to be small. Furthermore, since the ramp wave reference signal $V_{RAMP}$ is supplied in a mesh pattern in pixel units, it is possible to minimize the mismatch between the pixel rows/pixel columns.

Example 11

Figure 22:
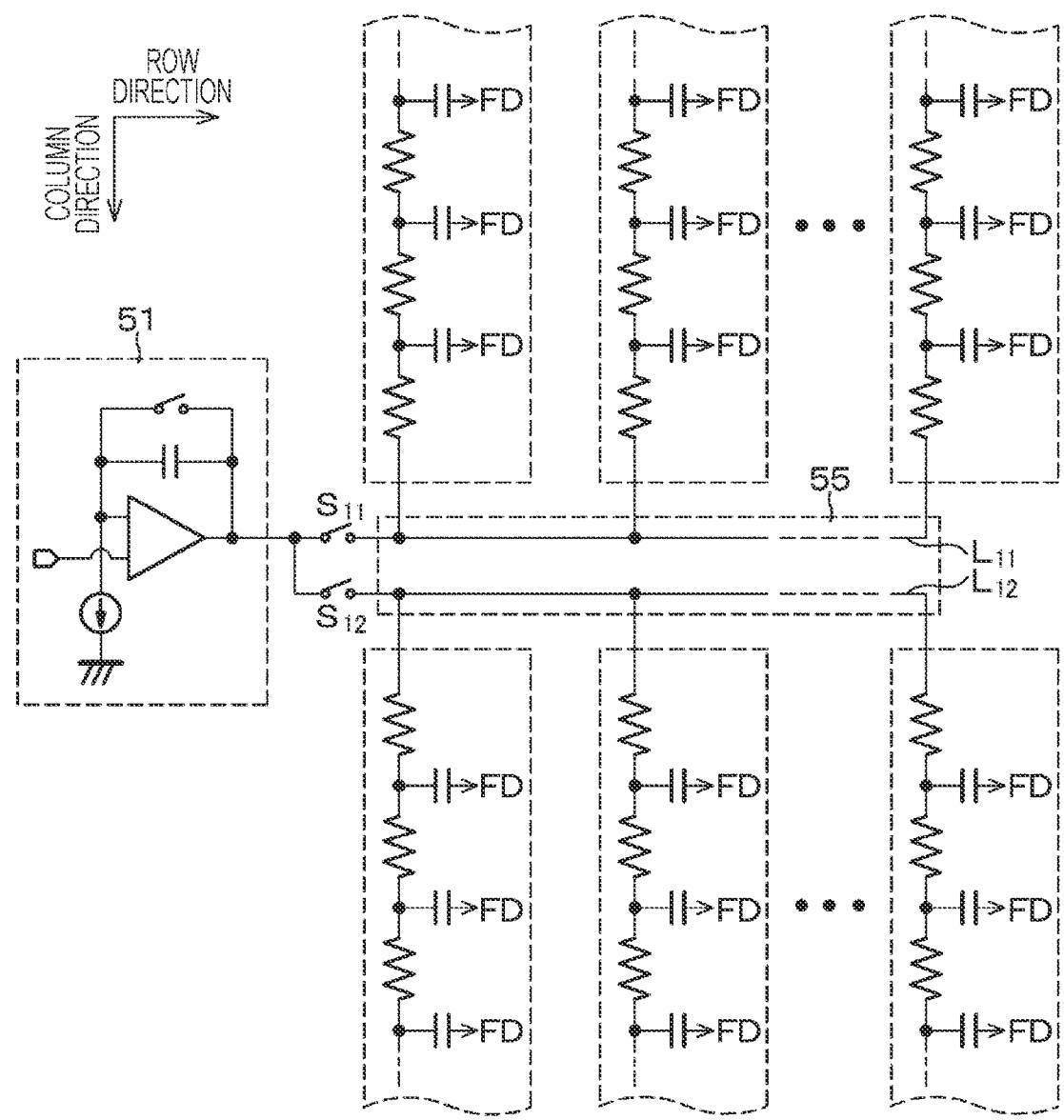
FIG. 22 is a circuit diagram illustrating an example of a configuration of a reference signal supply section according to Example 11.

Example 11 is an example in which the ramp wave reference signal $V_{RAMP}$ is supplied from the central portion of the matrix pixel array along the column direction. FIG. 22 illustrates an example of a configuration of a reference signal supply section according to Example 11.

The reference signal supply section 50 according to Example 11 has a configuration in which the reference signal generation section 51 is provided common to all the pixels in the vicinity of the center of the matrix pixel array outside the matrix pixel array, and the ramp wave reference signal $V_{RAMP}$ generated by the reference signal generation section 51 is supplied in the column direction via switches $S_{11}$ and $S_{12}$ and wirings $L_{11}$ and $L_{12}$. As the reference signal generation section 51, a current steering type digital-analog converter or a current integration type digital-analog converter can be used.

Upper and lower wirings for supplying the ramp wave reference signal $V_{RAMP}$ along the pixel column direction and the wirings $L_{11}$ and $L_{12}$ can be electrically connected by a connection portion 55 such as the Cu—Cu direct bonding at the central portion of the matrix pixel array.

According to the configuration example of the reference signal supply section 50 according to Example 11, as the ramp wave reference signal $V_{RAMP}$ is supplied in the column direction from the central portion of the matrix pixel array, it is possible to separate the wiring on a side from which the pixel signal is not read among the upper half side and the lower half side of the matrix pixel array. As a result, since a load resistance or load capacity of the reference signal generation section 51 can be halved, the power consumption of the reference signal generation section 51 and the power consumption of the entire CMOS image sensor 1 can be reduced.

<Circuit Configuration Examples of Pixel Circuit>

Next, a circuit configuration example of a pixel circuit in which the ramp wave reference signal $V_{RAMP}$ is applied to the floating diffusion FD will be described.

(Circuit Configuration Example 1)

Figure 23:
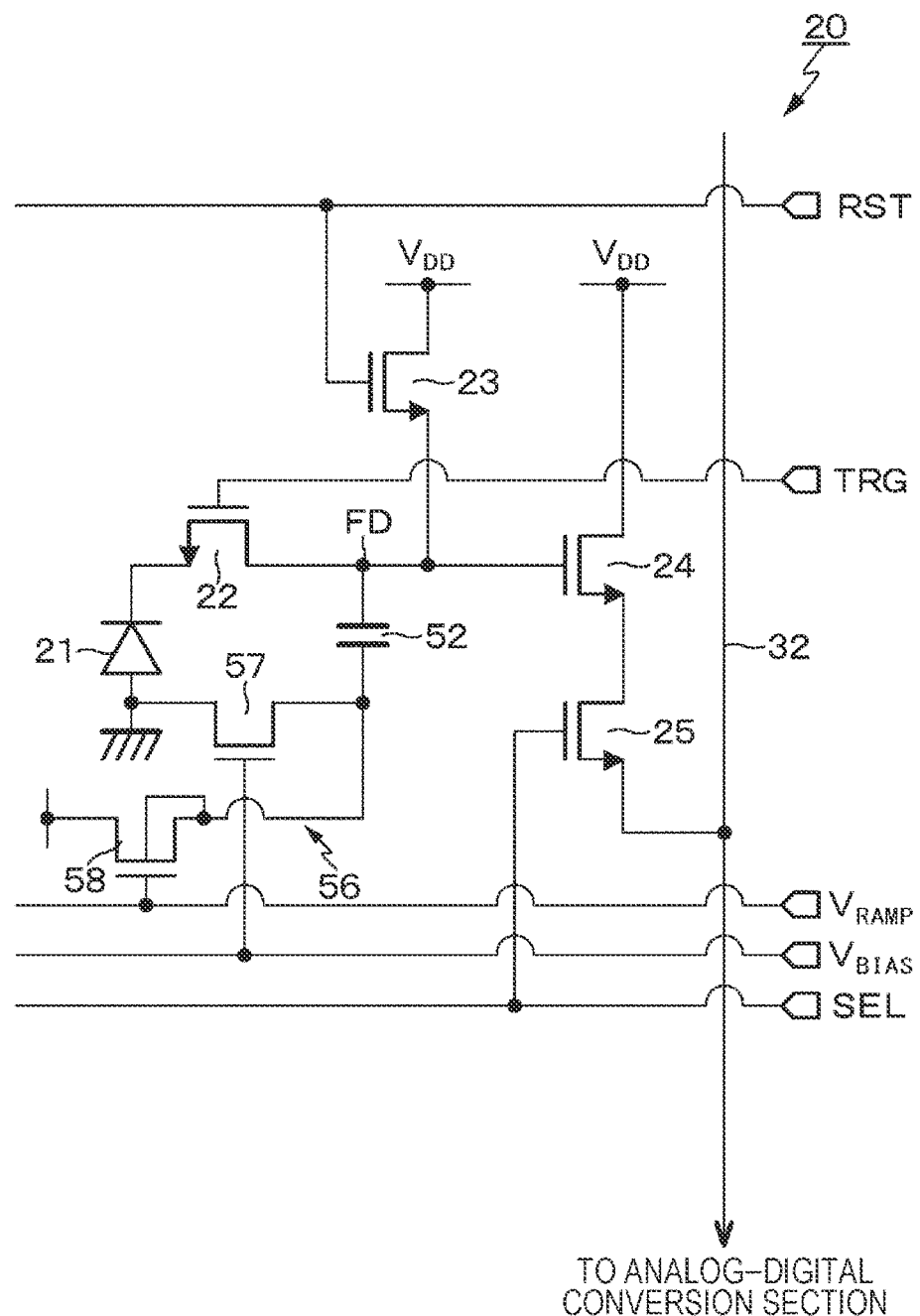
FIG. 23 is a circuit diagram illustrating a pixel circuit according to Circuit Configuration Example 1.

Circuit Configuration Example 1 is an example in which a buffer is provided in front of the input capacitive element 52. FIG. 23 illustrates a circuit diagram of the pixel circuit according to Circuit Configuration Example 1.

The pixel circuit according to Circuit Configuration Example 1 has a configuration in which a buffer 56 that applies the ramp wave reference signal $V_{RAMP}$ supplied from the reference signal generation section 51 to the floating diffusion ED via the input capacitive element 52 is provided in the preceding stage of the input capacitive element 52. The buffer 56 has a source follower configuration including a constant current source transistor 57 and an input transistor 58.

In the buffer 56 having the source follower configuration, the constant current source transistor 57 is connected between the anode electrode of the photodiode 21 and the input terminal of the input capacitive element 52, and a predetermined bias voltage $V_{BIAS}$ is applied to a gate electrode thereof. The input transistor 58 is connected between a node of a predetermined potential and the input terminal of the input capacitive element 52, and the ramp wave reference signal $V_{RAMP}$ is applied to a gate electrode thereof.

Here, a case where the buffer 56 is not provided in the preceding stage of the input capacitive element 52 is considered. In a case where the buffer 56 is not provided in the preceding stage of the input capacitive element 52, a signal may flow reversely from the pixel circuit side to the reference signal generation section 51 side, and an interference may easily occur.

On the other hand, in a case of the pixel circuit according to Circuit Configuration Example 1, since the buffer 56 is provided in the preceding stage of the input capacitive element 52, it is possible to suppress the interference caused by the reverse flow of the signal from the pixel circuit side to the reference signal generation section 51 side. Furthermore, since the load of the buffer 56 having the source follower configuration is minimized, the power consumption of the buffer 56 can be reduced, (Circuit Configuration Example 2)

Figure 24:
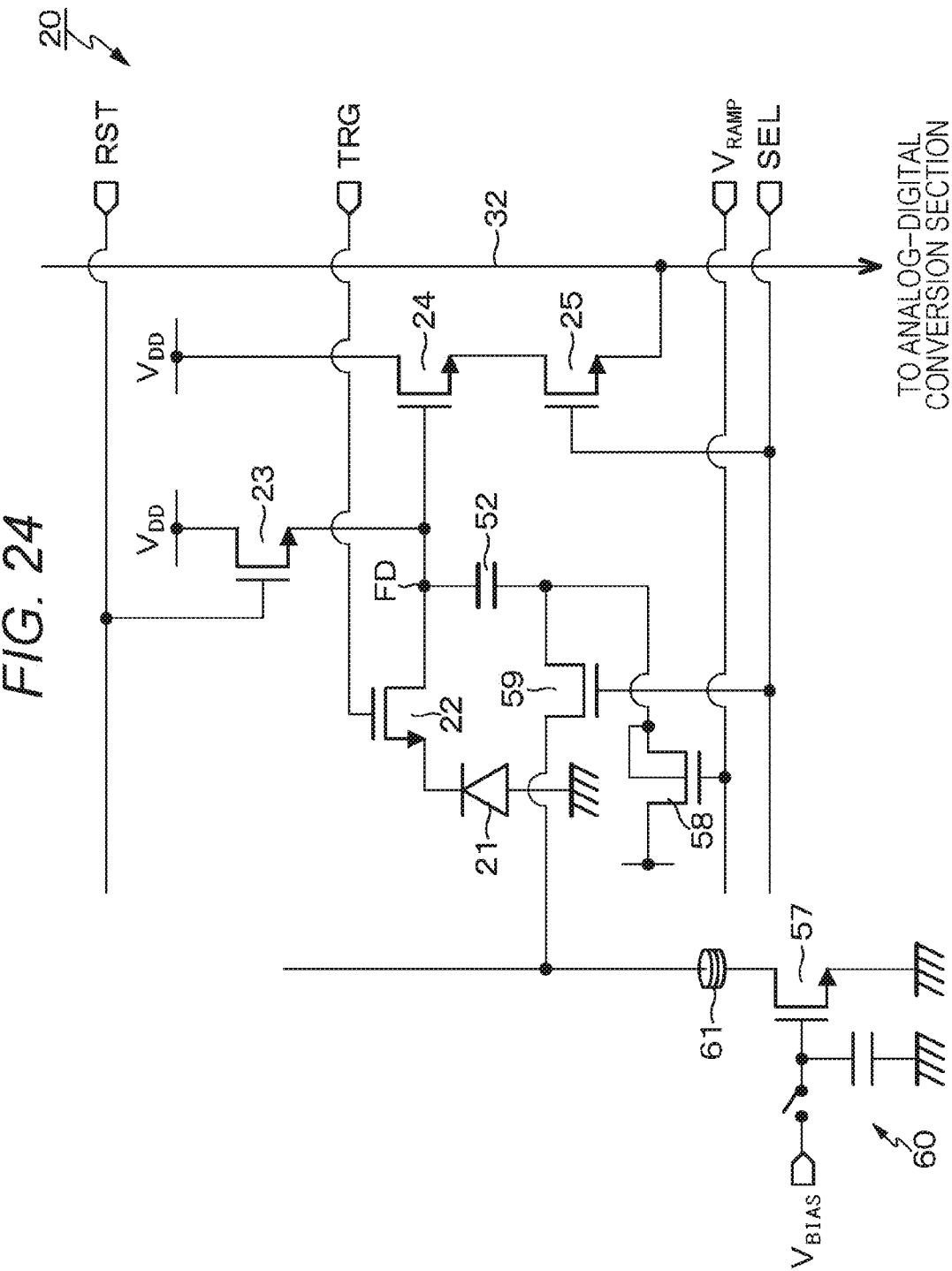
FIG. 24 is a circuit diagram illustrating a pixel circuit according to Circuit Configuration Example 2.

Circuit Configuration Example 2 an example in which the constant current source transistor 57 of the buffer is provided in a chip different from the pixel. FIG. 24 illustrates a circuit diagram of a pixel circuit according to Circuit Configuration Example 2.

In the pixel circuit according to Circuit. Configuration Example 2, on the premise of the stacked type semiconductor chip structure illustrated in FIG. 3B, when the buffer 56 having the source follower configuration is provided in the pixel, the constant current source transistor 57 is provided in a chip different from the pixel chip (corresponding to the semiconductor chip 43 as the first layer illustrated in FIG. 3B), that is, the circuit chip (corresponding to the semiconductor chip 44 as the second layer illustrated in FIG. 3B).

The pixel chip and the circuit chip are electrically connected via, for example, a bonding portion 61 including the Cu—Cu direct bonding for directly bonding Cu electrodes to each other. On the pixel chip side, a switching transistor 59 is connected between the bonding portion 61 and the input terminal of the input capacitive element 52, and the selection signal SEL is applied to a gate electrode thereof. On the circuit chip side, a sample/hold circuit 60 is connected to the gate electrode of the constant current source transistor 57.

According to the pixel circuit of Circuit Configuration Example 2, since the sample/hold circuit 60 which is difficult to be arranged in the pixel in terms of space can be connected to the gate electrode of the constant current source transistor 57 on the circuit chip side, noise of the bias can be cut off and output noise can be suppressed.

(Circuit Configuration Example 3)

Figure 25:
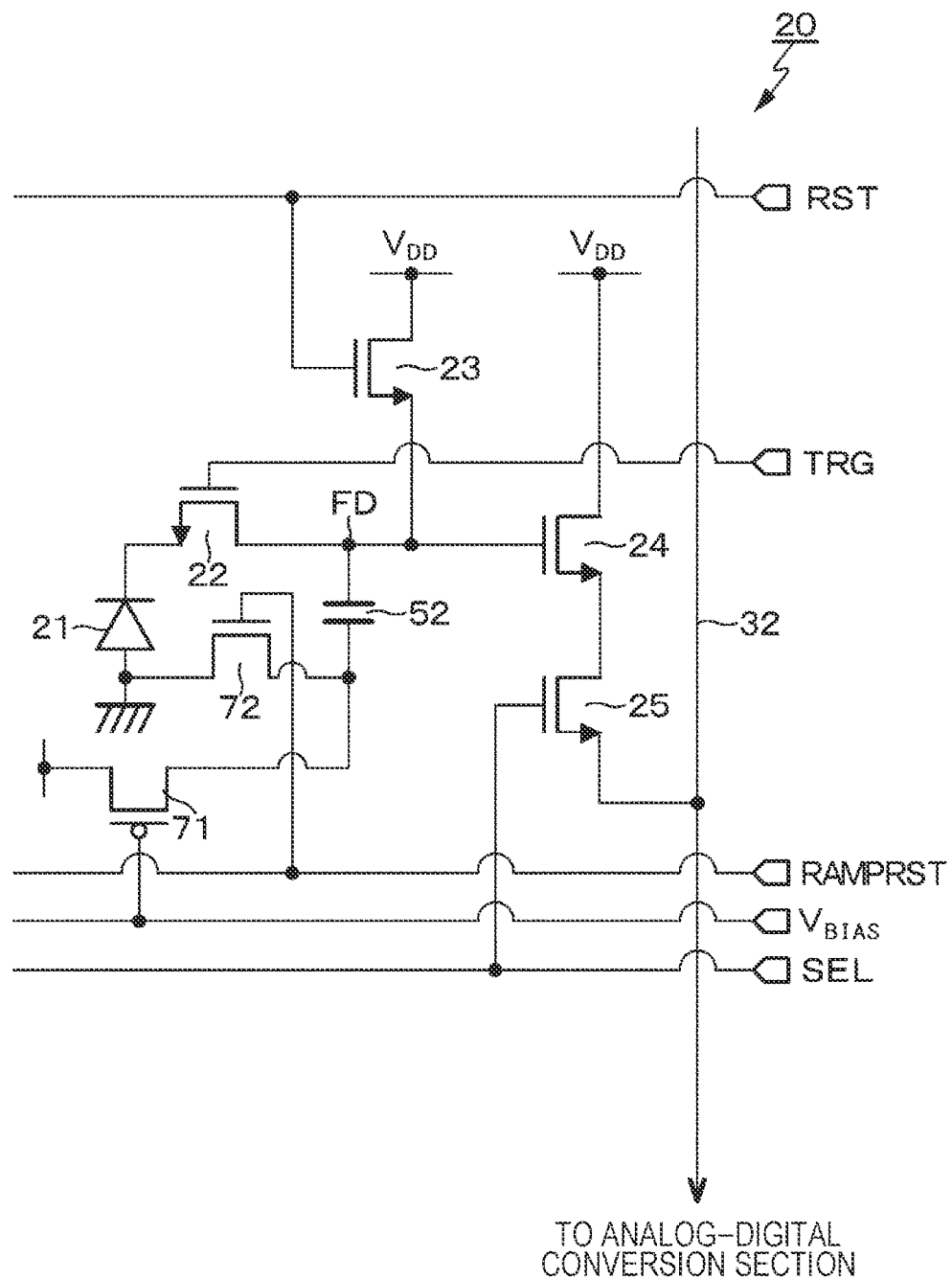
FIG. 25 is a circuit diagram illustrating a pixel circuit according to Circuit Configuration Example 3.

Circuit Configuration Example 3 is an example in which the reference signal generation section is provided in a pixel. FIG. 25 illustrates a circuit diagram of a pixel circuit according to Circuit Configuration Example 3.

In the pixel circuit according to Circuit Configuration Example 3, the input capacitive element 52 provided for each pixel is used as a capacitive element for current integration, and a current integration type digital-analog converter (DAC) for reference signal generation is formed in the pixel together with a constant current source transistor 71 including a P-channel MOS transistor. A reset transistor 72 is connected between the input terminal of the input capacitive element 52 and the anode electrode of the photodiode 21, and the reset signal RST is applied to a gate electrode of the reset transistor 72.

In a case of the pixel circuit according to Circuit Configuration Example 3, the input capacitive element 52 is used as a capacitive element for current integration, and the current integration type DAC for reference signal generation is formed in the pixel, such that it is not necessary to form the current integration type DAC for reference signal generation in the circuit chip, and thus, it is possible to reduce the size of the circuit chip and the size of the entire stacked type semiconductor chip.

<Example of Inter-Chip Wiring Structure in Stacked Type Semiconductor Chip Structure>

Next, an example of an electrical wiring structure between semiconductor chips in the stacked type semiconductor chip structure formed by stacking a plurality of semiconductor chips will be described.

(Wiring Structure Example 1)

Figure 26:
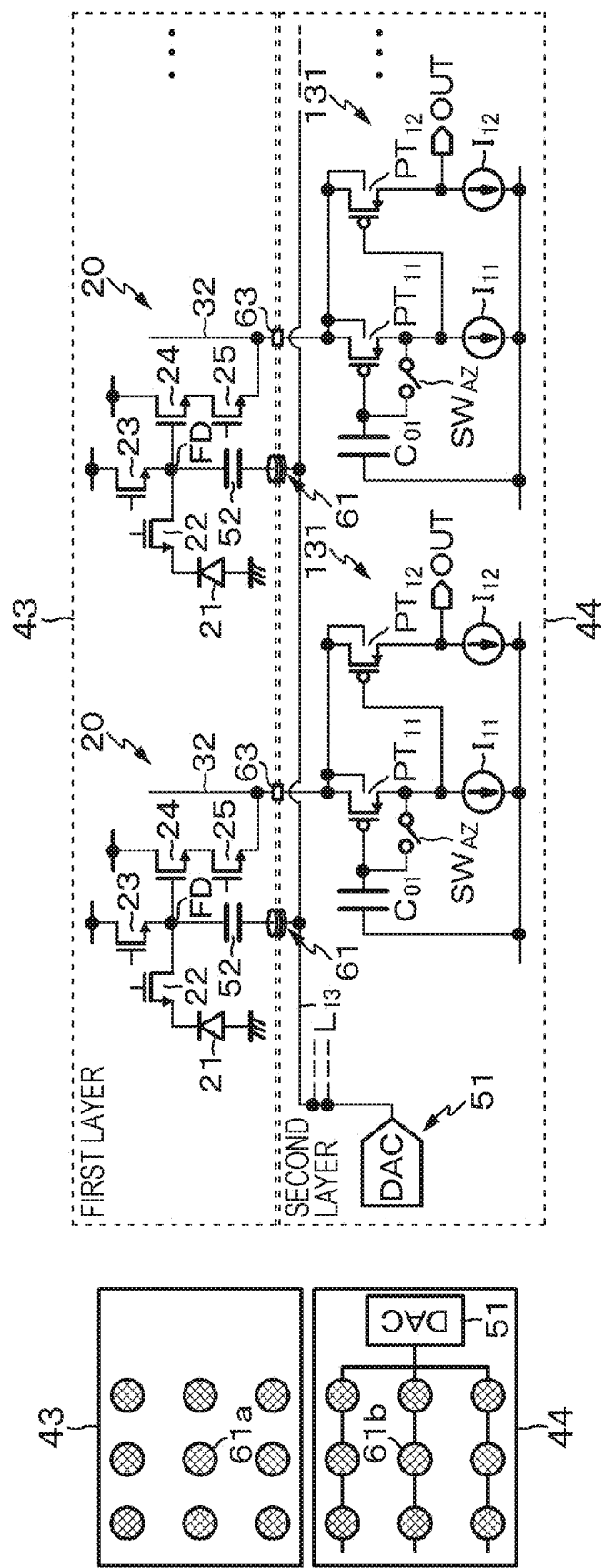
FIG. 26 is an explanatory diagram of an inter-chip wiring structure according to Wiring Structure Example 1.

Wiring Structure Example 1 is an example of an electrical wiring structure between chips in the two-layer chip structure. FIG. 26 illustrates an inter-chip wiring structure example according to Wiring Structure Example 1. A plan view of the semiconductor chip is illustrated on the left side of FIG. 26, and a wiring structure of each semiconductor chip is schematically illustrated on the right side of FIG. 26. The same applies to each wiring structure example as described later.

The inter-chip wiring structure according to Wiring Structure Example 1 is the two-layer chip structure in which the semiconductor chip 43 as the first layer and the semiconductor chip 44 as the second layer are stacked. The semiconductor chip 43 as the first layer is a pixel chip in which the pixel 20 including the photodiode 21 is formed. The semiconductor chip 44 as the second layer is a circuit chip in which the comparator 131 included in the column-parallel analog-digital conversion section 13 and the reference signal generation section 51 including, for example, a digital-analog converter (DAC) are formed.

Then, the semiconductor chip 43 as the first layer, which is the pixel chip, and the semiconductor chip 44 as the second layer, which is the circuit chip, are electrically connected to each floating diffusion FD to which the ramp wave reference signal $V_{RAMP}$ is supplied from the reference signal generation section 51, for example, via the bonding portion 61 including a Cu—Cu direct bonding in which a Cu electrode 61a and a Cu electrode 61b are directly bonded. In a case of Wiring Structure Example 1, the ramp wave reference signal $V_{RAMP}$ generated by the reference signal generation section 51 is distributed to each pixel through a wiring $L_{13}$ in the semiconductor chip 44 as the second layer. Furthermore, the signal line 32 on the semiconductor chip 43 as the first layer and the comparator 131 on the semiconductor chip 44 as the second layer are electrically connected via a connection portion 63 for each pixel column. The same applies to Wiring Structure Examples 2 and 3 as described later.

(Wiring Structure Example 2)

Figure 27:
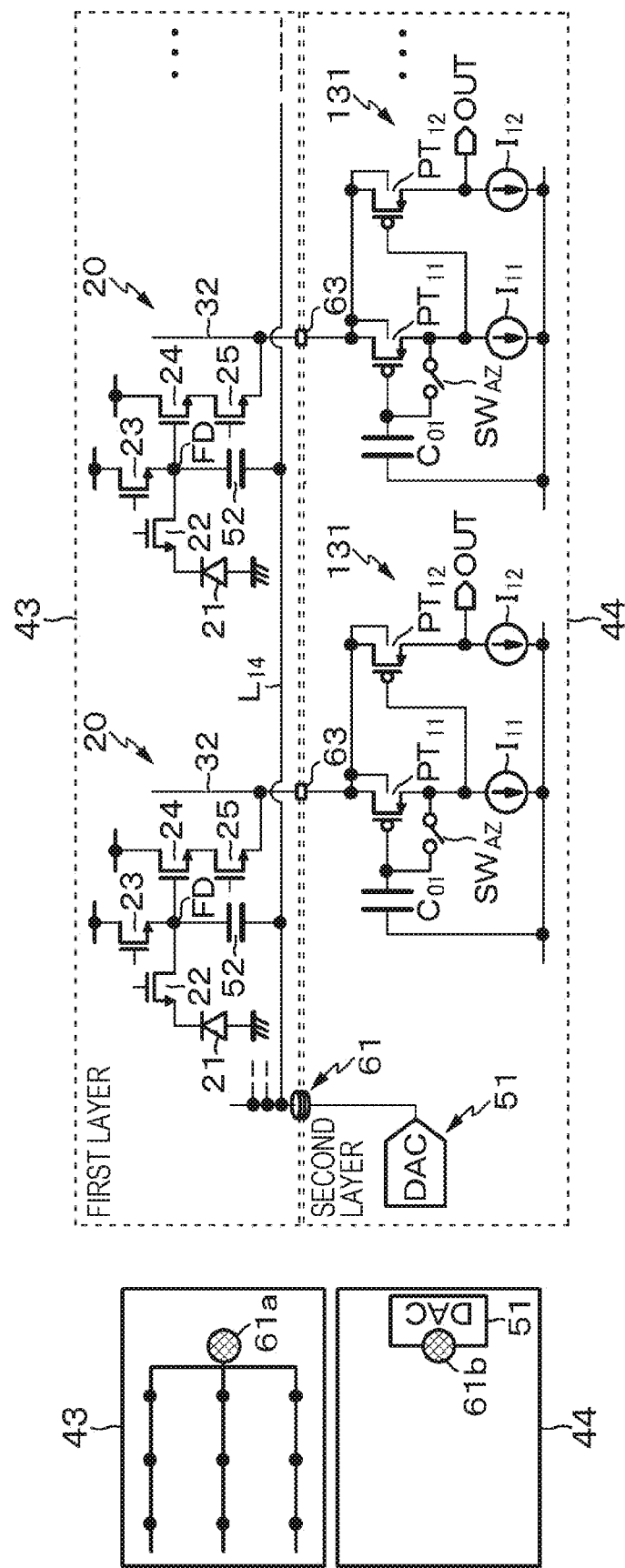
FIG. 27 is an explanatory diagram of an inter-chip wiring structure according to Wiring Structure Example 2.

Wiring Structure Example 2 is an example in which electrical connection is made between chips at an output portion of the reference signal generation section 51 in the two-layer chip structure. FIG. 27 illustrates an inter-chip wiring structure example according to Wiring Structure Example 2.

In the inter-chip wiring structure according to Wiring Structure Example 2, the output portion of the reference signal generation section 51 formed in the semiconductor chip 44 as the second layer, which is the circuit chip, is electrically connected to the semiconductor chip 43 as the first layer which is the pixel chip via the bonding portion 61 including the Cu—Cu direct bonding, for example. In a case of Wiring Structure Example 2, the ramp wave reference signal $V_{RAMP}$ generated by the reference signal generation section 51 and supplied to the semiconductor chip 43 as the first layer via the bonding portion 61 is distributed to each pixel through a wiring $L_{14}$ in the semiconductor chip 43 as the first layer. Then, as indicated by black circles (•) on the semiconductor chip 43 as the first layer in the left diagram of FIG. 27, the input capacitive element 52 is electrically connected to the wiring $L_{14}$ for each pixel. In a case of Wiring Structure Example 2, there is an advantage that it is not necessary to provide the bonding portion 61 immediately below the pixel.

(Wiring Structure Example 3)

Figure 28:
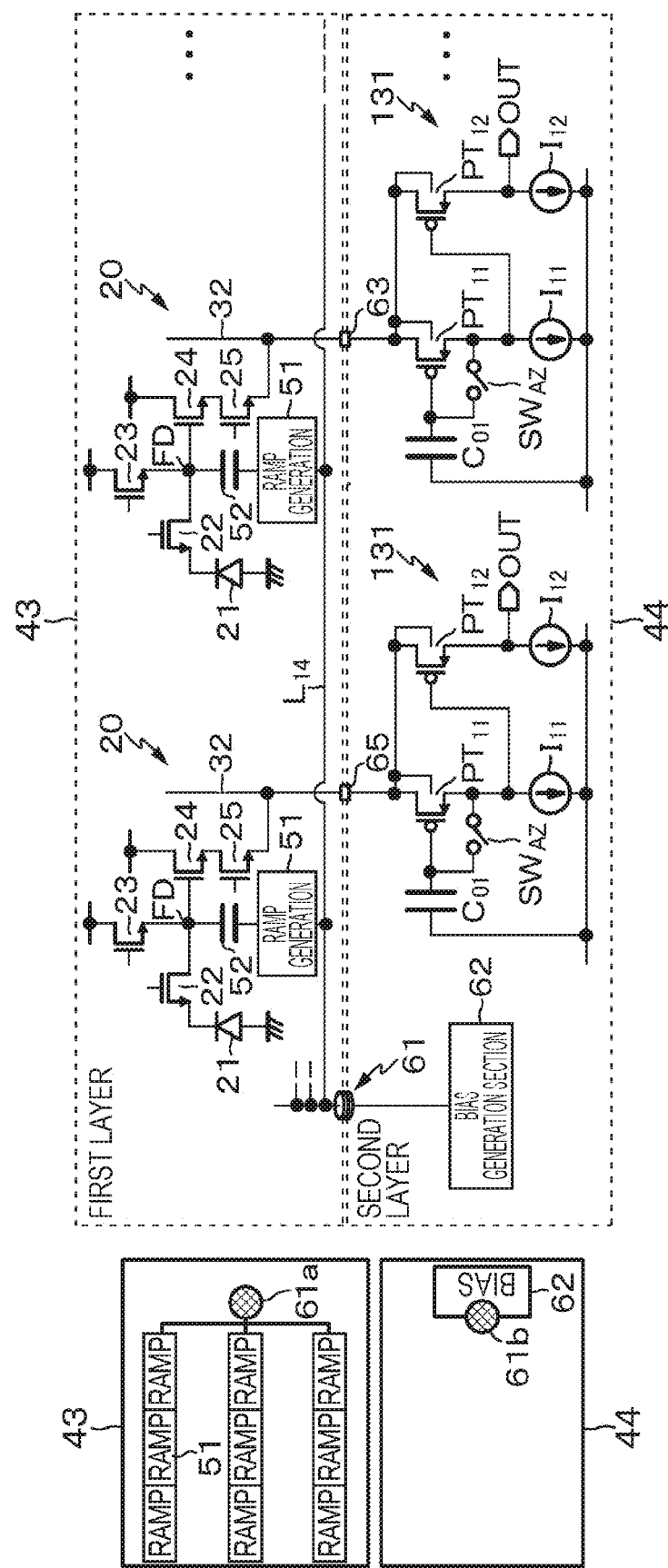
FIG. 28 is an explanatory diagram of an inter-chip wiring structure according to Wiring Structure Example 3.

Wiring Structure Example 3 is an example in which the reference signal generation section 51 is provided for each pixel in the two-layer chip structure. FIG. 28 illustrates an inter-chip wiring structure example according to Wiring Structure Example 3.

In the inter-chip wiring structure according to Wiring Structure Example 3, the semiconductor chip 43 as the first layer, which is the pixel chip, includes the reference signal generation section 51 for each pixel. The semiconductor chip 44 as the second layer, which is the circuit chip, is provided with a bias generation section 62 that generates a bias voltage used for generating the ramp wave reference signal $V_{RAMP}$ by the reference signal generation section 51. Then, the bias voltage generated by the bias generation section 62 is transmitted to the semiconductor chip 43 as the first layer via the bonding portion 61 including, for example, the Cu—Cu direct bonding, and is supplied to the reference signal generation section 51 provided for each pixel in the semiconductor chip 43 as the first layer by the wiring $L_{14}$.

(Wiring Structure Example 4)

Figure 29:
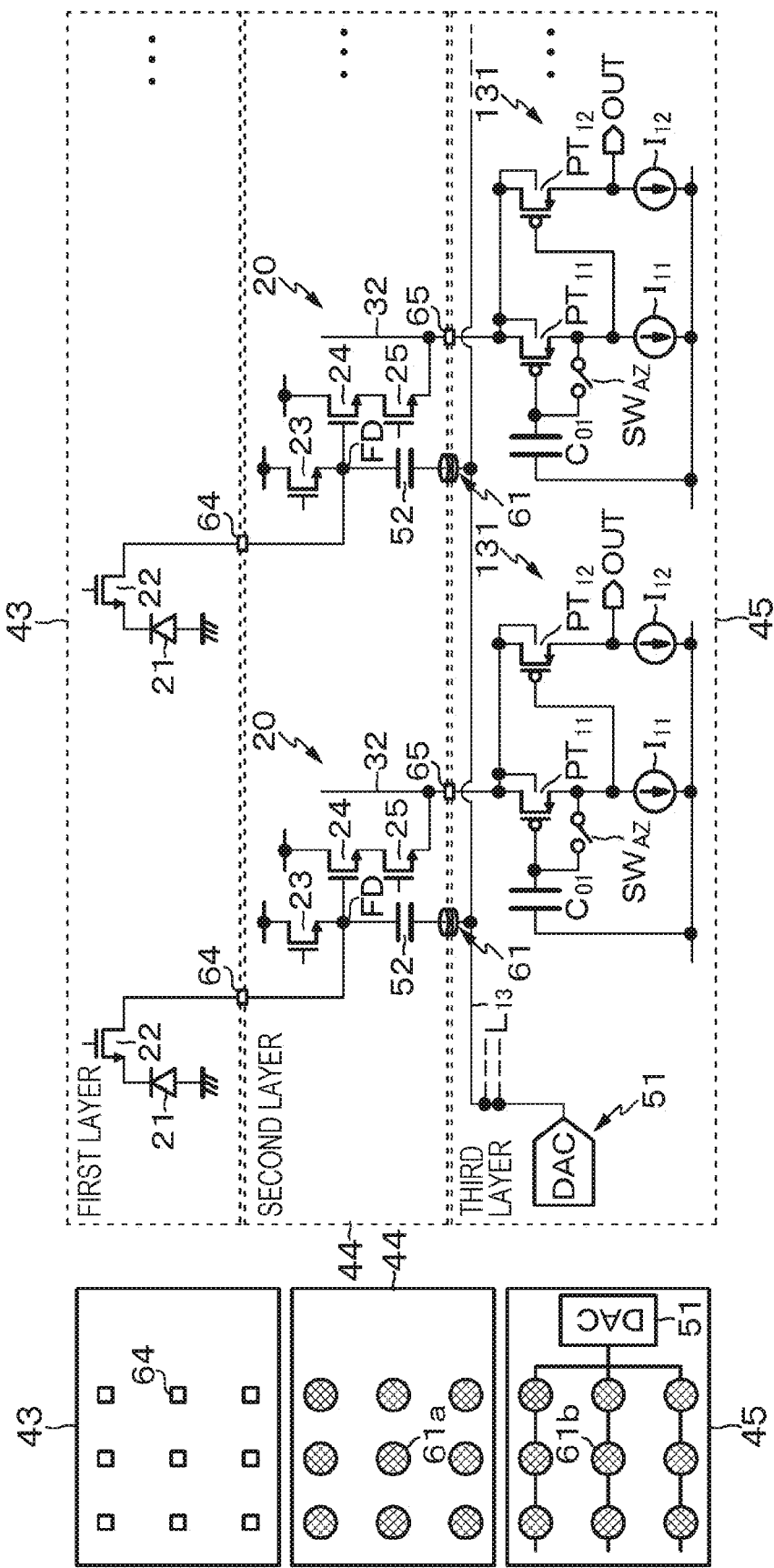
FIG. 29 is an explanatory diagram of an inter-chip wiring structure according to Wiring Structure Example 4.

Wiring Structure Example 4 is an example of an electrical wiring structure between chips in the three-layer chip structure. FIG. 29 illustrates an inter-chip wiring structure example according to Wiring Structure Example 4.

The inter-chip wiring structure according to Wiring Structure Example 4 is a three-layer chip structure in which the semiconductor chip 43 as the first layer, the semiconductor chip 44 as the second layer, and the semiconductor chip 45 as the third layer are stacked. In the semiconductor chip 43 as the first layer, the photodiode 21 and the transfer transistor 22 are arranged in pixel units. In the semiconductor chip 44 as the second layer, a constituent element of the pixel 20 other than the photodiode 21 and the transfer transistor 22 is formed. In the semiconductor chip 45 as the third layer, the comparator 131 included in the column-parallel analog-digital conversion section 13 and the reference signal generation section 51 including, for example, a digital-analog converter (DAC) are formed.

Then, the semiconductor chip 43 as the first layer and the semiconductor chip 44 as the second layer are electrically connected via a connection portion. 64 including the Cu—Cu direct bonding, a through silicon via (TSV), or the like for each pixel. The same applies to Wiring Structure Examples 5 and 6 as described later. The semiconductor chip 44 as the second layer and the semiconductor chip 45 as the third layer are electrically connected to each floating diffusion FD to which the ramp wave reference signal $V_{RAMP}$ is supplied from the reference signal generation section 51 via the bonding portion 61 including, for example, the Cu—Cu direct bonding. Furthermore, the semiconductor chip 44 as the second layer and the semiconductor chip 45 as the third layer are electrically connected via a connection portion 65 for each pixel column. The same applies to Wiring Structure Examples 5 and 6 as described later. In a case of Wiring Structure Example 4, the ramp wave reference signal $V_{RAMP}$ generated by the reference signal generation section 51 is distributed to each pixel through the wiring $L_{13}$ in the semiconductor chip 45 as the third layer.

In a case of the inter-chip wiring structure according to Wiring Structure Example 4, since only the photodiode 21 and the transfer transistor 22 are formed in the semiconductor chip 43 as the first layer, a large aperture ratio of the pixel can be set. The same applies to Wiring Structure Example 5 and Wiring Structure Example 6 as described later.

(Wiring Structure Example 5)

Figure 30:
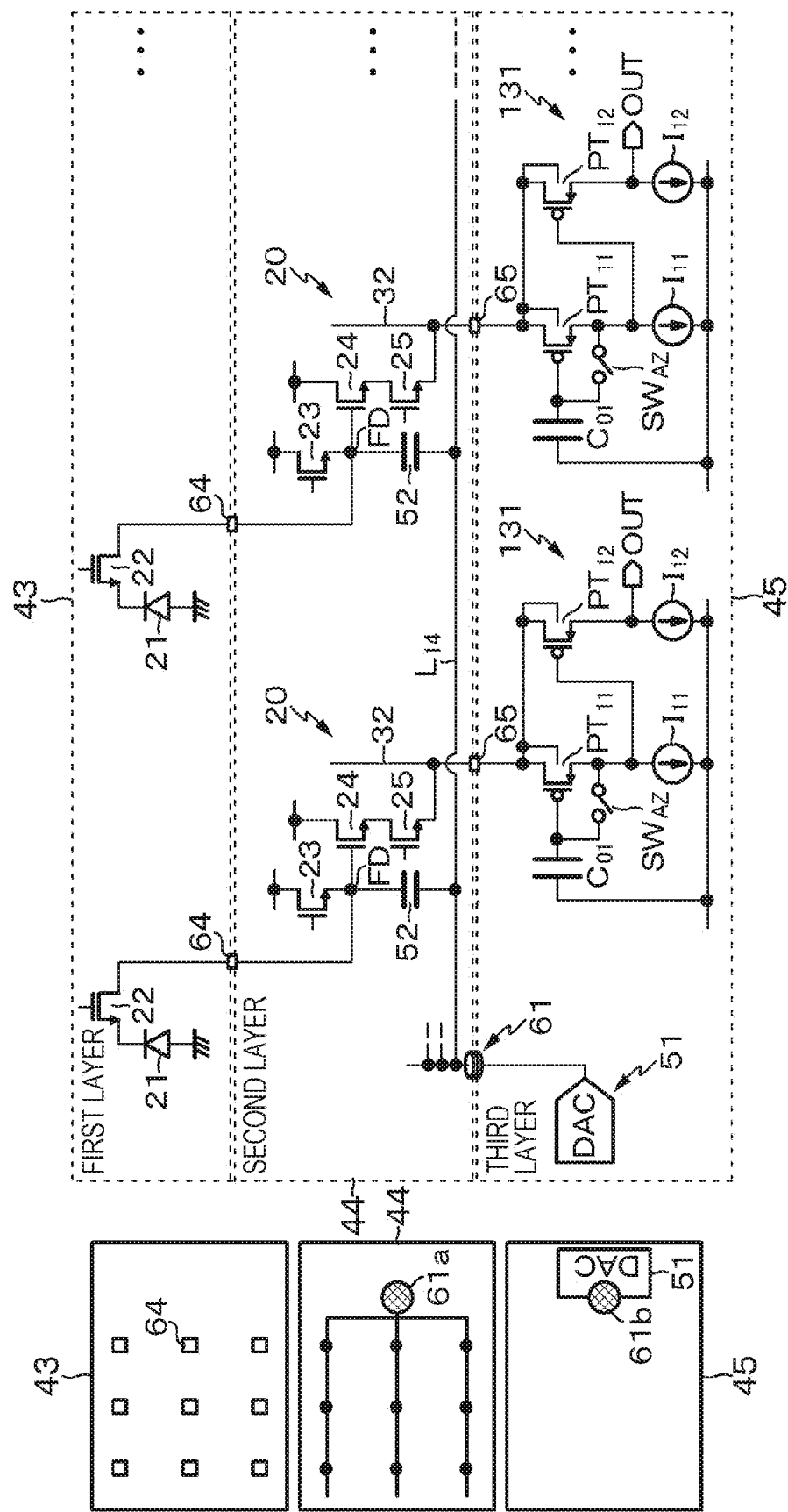
FIG. 30 is an explanatory diagram of an inter-chip wiring structure according to Wiring Structure Example 5.

Wiring Structure Example 5 is an example in which electrical connection is made between chips in an output portion of the reference signal generation section 51 in the three-layer chip structure. FIG. 30 illustrates an inter-chip wiring structure example according to Wiring Structure Example 5.

In the inter-chip wiring structure according to Wiring Structure Example 5, the output portion of the reference signal generation section 51 formed in the semiconductor chip 45 as the third layer is electrically connected to the semiconductor chip 44 as the second layer via the bonding portion 61 including the Cu—Cu direct bonding, for example. In a case of Wiring Structure Example 5, the ramp wave reference signal $V_{RAMP}$ generated by the reference signal generation section 51 and supplied to the semiconductor chip 43 as the first layer via the bonding portion 61 is distributed to each pixel through the wiring $L_{14}$ in the semiconductor chip 44 as the second layer.

(Wiring Structure Example 6)

Figure 31:
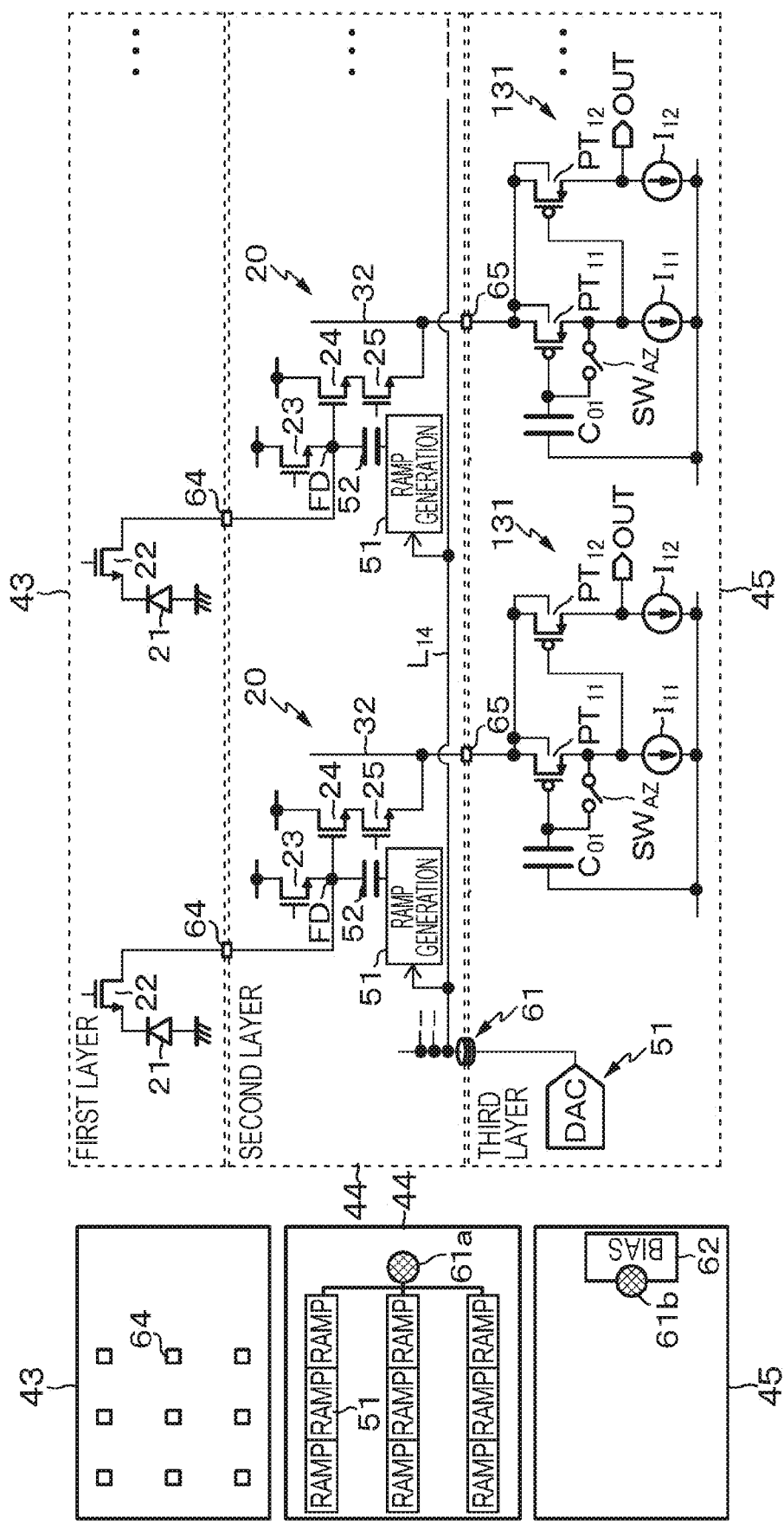
FIG. 31 is an explanatory diagram of an inter-chip wiring structure according to Wiring Structure Example 6.

Wiring Structure Example 6 is an example in which the reference signal generation section 51 is provided for each pixel in the three-layer chip structure. FIG. 31 illustrates an inter-chip wiring structure example according to Wiring Structure Example 6.

In the inter-chip wiring structure according to Wiring Structure Example 6, the semiconductor chip 44 as the second layer includes the reference signal generation section 51 for each pixel. The semiconductor chip 45 as the third layer is provided with the bias generation section 62 that generates a bias voltage used for generating the ramp wave reference signal $V_{RAMP}$ by the reference signal generation section 51. Then, the bias voltage generated by the bias generation section 62 is transmitted to the semiconductor chip 44 as the second layer via the bonding portion 61 including, for example, the Cu—Cu direct bonding, and is supplied to the reference signal generation section 51 provided for each pixel in the semiconductor chip 44 as the second layer by the wiring $L_{14}$.

Modified Example

The technology according to the present disclosure has been described above on the basis of the preferred embodiment, but the technology according to the present disclosure is not limited to the embodiment. The configuration and structure of the image capturing device described in each of the above-described embodiments are examples, and can be changed as appropriate.

For example, the circuit configuration of the comparator 131 in each of the above-described embodiments is an example, and is not limited to the circuit configuration.

Specifically, the comparators 131 according to the first, second, and third embodiments may have a circuit configuration in which at least one of the capacitive element $C_{02}$, the input-side clamp transistor $PT_{13}$, the input-side clamp transistor $NT_{11}$, or the output-side clamp transistor $NT_{12}$ is omitted.

Application Example

Figure 32:
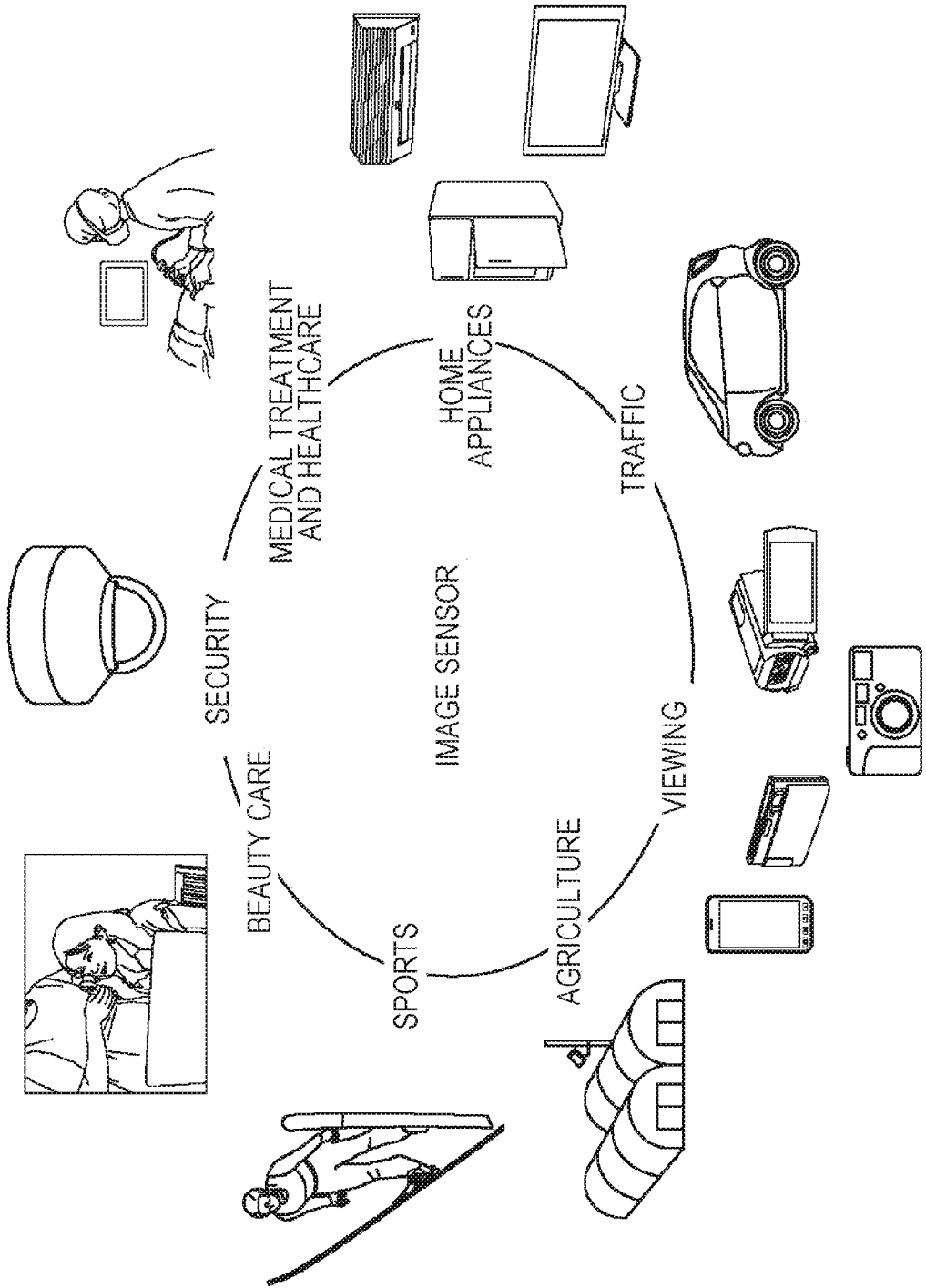
FIG. 32 is a diagram illustrating an application example of the technology according to an embodiment of the present disclosure.

The image capturing device of the present embodiment described above can be used in various devices that sense light such as visible light, infrared light, ultraviolet light, or X-ray, for example, as illustrated in FIG. 32. Specific examples of various devices are listed below.

- A device that captures an image provided for viewing, such as a digital camera and a portable device with a camera function
- A device provided for traffic, such as an in-vehicle sensor for capturing an image of the region in front of, behind, surrounding, or inside a vehicle, a monitoring camera for monitoring a traveling vehicle or a road, or a distance measurement sensor for measuring the distance between vehicles, for the purpose of safe driving such as automatic stop and recognition of driver's state
- A device provided for home appliances, such as a television, a refrigerator, and an air conditioner, to capture an image of the gesture of the user and perform a device operation in accordance with the gesture
- A device provided for medical treatment and healthcare, such as an endoscope or a device for capturing an image of blood vessels by receiving infrared light
- A device provided for security, such as a monitoring camera for security or a camera for personal authentication
- A device provided for beauty care, such as a skin measuring device for capturing an image of skin or a microscope for capturing an image of scalp
- A device provided for sports, such as an action camera or a wearable camera for use in sports
- A device provided for agriculture, such as a camera for monitoring the state of fields and crops <Application Example of Technology According to Present Disclosure>

The technology according to the present disclosure can be applied to various products. A more specific application example will be described below.

(Electronic Apparatus of Present Disclosure)

Here, application to an image capturing system such as a digital still camera or a video camera, a mobile terminal device having an image capturing function such as a mobile phone, or an electronic apparatus such as a copier using the image capturing device for an image reading section will be described.

(Example of Image Capturing System)

Figure 33:
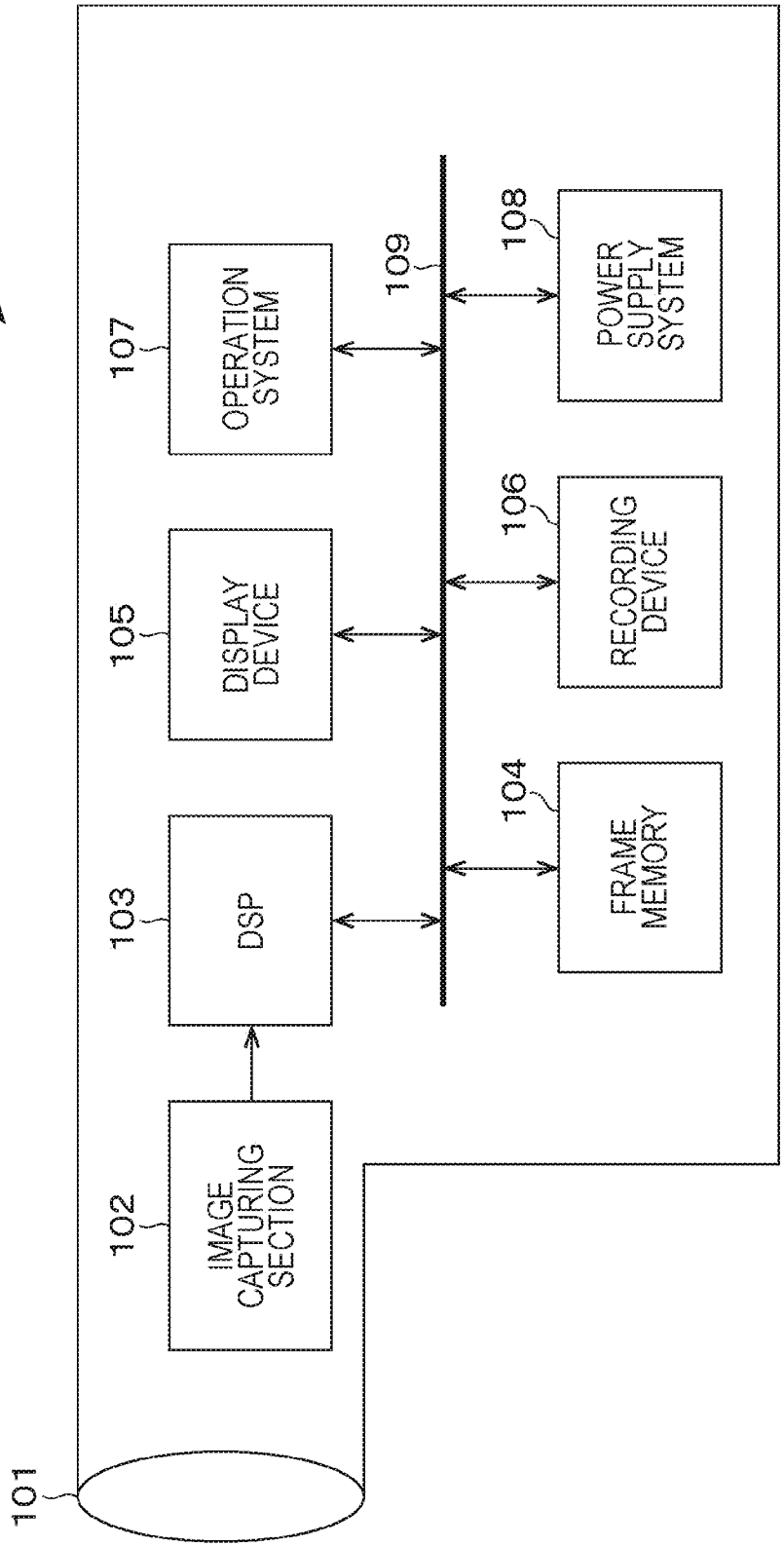
FIG. 33 is a block diagram illustrating an outline of a configuration example of an image capturing system which is an example of an electronic apparatus of the present disclosure.

FIG. 33 is a block diagram illustrating a configuration example of an image capturing system which is an example of the electronic apparatus of the present disclosure.

As illustrated in FIG. 33, an image capturing system 100 according to this example includes an image capturing optical system 101 including a lens group and the like, an image capturing section 102, a digital signal processor (DSP) circuit 103, a frame memory 104, a display device 105, a recording device 106, an operation system 107, a power supply system 108, and the like. Further, the DSP circuit 103, the frame memory 104, the display device 105, the recording device 106, the operation system 107, and the power supply system 108 are connected to each other via a bus line 109.

The image capturing optical system 101 receives incident light (image light) from a subject and forms an image on an image capturing surface of the image capturing section 102. The image capturing section 102 converts the amount of the incident light formed as the image on the image capturing surface by the optical system 101 into an electric signal in pixel units and outputs the electric signal as a pixel signal. The DSP circuit 103 performs general camera signal processing such as white balance processing, demosaic processing, or gamma correction processing.

The frame memory 104 is appropriately used for storing data in the process of the signal processing performed by the DSP circuit 103. The display device 105 includes a panel-type display device such as a liquid crystal display device or an organic electroluminescence (EL) display device, and displays a moving image or a still image captured by the image capturing section 102. The recording device 106 records the moving image or still image captured by the image capturing section 102 on a portable semiconductor memory, an optical disk, or a recording medium such as a hard disk drive (HDD).

The operation system 107 issues operation commands for various functions of the image capturing system 100 under the operation of the user. The power supply system 108 appropriately supplies various types of power that serve as operating power for the DSP circuit 103, the frame memory 104, the display device 105, the recording device 106, and the operation system 107 to these supply targets.

In the image capturing system 100 having the above-described configuration, the image capturing device according to the above-described embodiment can be used as the image capturing section 102. With the image capturing device, since the power consumption of the analog-digital converter can be reduced, the power consumption of the image capturing device can be reduced. Moreover, in the single-slope analog-to-digital converter, even in a case where the buffer is provided in front of the capacitive element for absorbing the offset in order to increase a driving force of the ramp wave reference signal and reduce an output impedance, the noise of the buffer can be reduced without connecting the output terminal of the buffer between the pixel columns, such that a captured image with high image quality can be obtained.

(Example of Application to Moving Body)

The technology (present technology) according to the present disclosure can be applied to various products. For example, the technology according to the present disclosure may be implemented as an image capturing device mounted in any one of moving bodies such as a vehicle, an electric vehicle, a hybrid electric vehicle, a motorcycle, a bicycle, a personal mobility device, a plane, a drone, a ship, a robot, a construction machine, and an agricultural machine (tractor).

Figure 34:
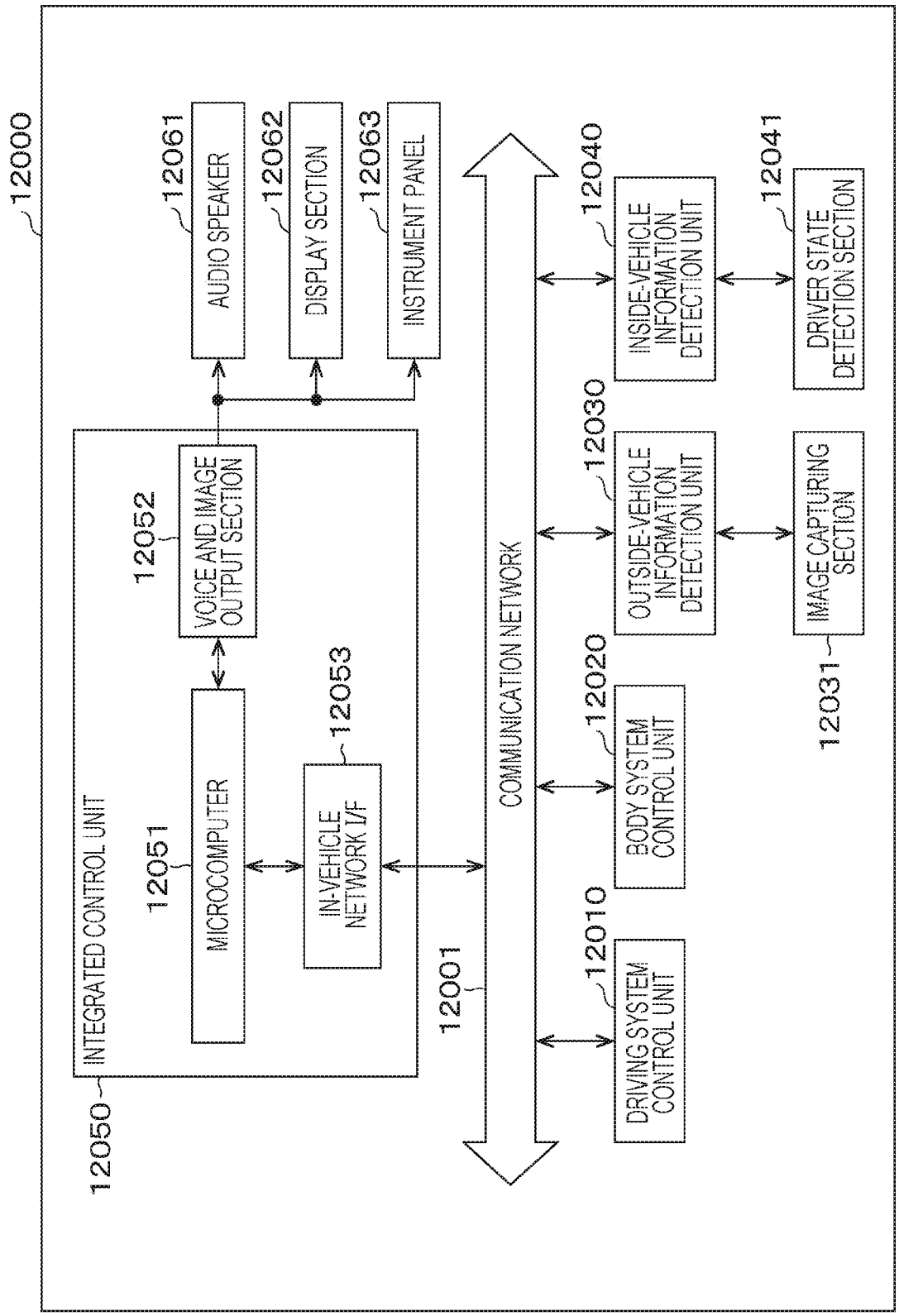
FIG. 34 is a block diagram illustrating a schematic configuration example of a vehicle control system which is an example of a moving body control system to which the technology according to an embodiment of the present disclosure can be applied.

FIG. 34 is a block diagram illustrating an example of a schematic configuration of a vehicle control system which is an example of a moving body control system to which the technology according to the present disclosure can be applied.

A vehicle control system 12000 includes a plurality of electronic control units connected through a communication network 12001. In the example illustrated in FIG. 34, the vehicle control system 12000 includes a driving system control unit 12010, a body system control unit 12020, an outside-vehicle information detection unit 12030, an inside-vehicle information detection unit 12040, and an integrated control unit 12050. Furthermore, as a functional configuration of the integrated control unit 12050, a microcomputer 12051, a voice and image output section 12052, and an in-vehicle network interface (FP) 12053 are illustrated.

The driving system control unit 12010 controls an operation of a device related to a driving system of a vehicle according to various programs. For example, the driving system control unit 12010 functions as a control device such as a driving force generation device for generating a driving force of a vehicle such as an internal combustion engine, a driving motor, or the like, a driving force transmission mechanism for transmitting a driving force to vehicle wheels, a steering mechanism for adjusting a steering angle of the vehicle, a brake device for generating a braking force of the vehicle, or the like.

The body system control unit 12020 controls an operation of various devices mounted in a vehicle body according to various programs. For example, the body system control unit 12020 functions as a keyless entry system, a smart key system, a power window device, or a control device for various lamps such as a head lamp, a back lamp, a brake lamp, a blinker, a fog lamp, and the like. In this case, electric waves sent from a portable machine substituting for a key and a signal of various switches can be input to the body system control unit 12020. The body system control unit 12020 receives the electric waves or the signal to control a door-lock device of a vehicle, a power window device, a lamp, or the like.

The outside-vehicle information detection unit 12030 detects information regarding an outside area of a vehicle in which the vehicle control system 12000 is mounted. For example, an image capturing section 12031 is connected to the outside-vehicle information detection unit 12030. The outside-vehicle information detection unit 12030 causes the image capturing section 12031 to capture an image of an area outside the vehicle, and receives the captured image. The outside-vehicle information detection unit 12030 may perform processing of detecting an object such as a person, a car, an obstacle, a sign, a letter on a road surface, or the like, or perform distance detection processing on the basis of the received image.

The image capturing section 12031 is an optical sensor that receives light and outputs an electric signal corresponding to the amount of received light. The image capturing section 12031 can output the electric signal as an image, or can output the electric signal as distance measurement information. Furthermore, the light received by the image capturing section 12031 may be visible light or invisible light such as infrared rays or the like.

The inside-vehicle information detection unit 12040 detects information regarding an inside area of the vehicle. For example, a driver state detection section 12041 detecting a state of a driver is connected to the inside-vehicle information detection unit 12040. The driver state detection section 12041 includes, for example, a camera capturing an image of the driver, and the inside-vehicle information detection unit 12040 may calculate a degree of fatigue or a degree of concentration of the driver, or discriminate whether or not the driver dozes off on the basis of detection information input from the driver state detection section 12041.

The microcomputer 12051 can calculate a target control value of a driving force generation device, a steering mechanism, or a brake device on the basis of information regarding the inside area and the outside area of the vehicle, the information being acquired by the outside-vehicle information detection unit 12030 or the inside-vehicle information detection unit 12040, and output a control instruction to the driving system control unit 12010. For example, the microcomputer 12051 can perform a cooperative control for the purpose of implementing functions of an advanced driver assistance system (ADAS) including vehicle collision avoidance, impact alleviation, following traveling based on an inter-vehicle distance, traveling while maintaining a vehicle speed, a vehicle collision warning, a vehicle lane departure warning, or the like.

Furthermore, the microcomputer 12051 can perform a cooperative control for the purpose of an automatic driving in which a vehicle autonomously travels without an operation by a driver by controlling a driving force generation device, a steering mechanism, a brake device, or the like on the basis of information regarding a surrounding area of the vehicle acquired by the outside-vehicle information detection unit 12030 or the inside-vehicle information detection unit 12040, or the like.

Furthermore, the microcomputer 12051 can output a control instruction to the body system control unit 12020 on the basis of outside-vehicle information acquired by the outside-vehicle information detection unit 12030. For example, the microcomputer 12051 can perform a cooperative control for the purpose of preventing glare by controlling a headlamp according to a position of a preceding vehicle or an oncoming vehicle detected by the outside-vehicle information detection unit 12030 to switch a high beam to a low beam, or the like.

The voice and image output section 12052 sends an output signal of at least one of voice or an image to an output device which is capable of visually or acoustically notifying a passenger of a vehicle or an outside area of the vehicle of information. In the example in FIG. 34, an audio speaker 12061, a display section 12062, and an instrument panel 12063 are illustrated as the output devices. The display section 12062 may include at least one of, for example, an on-board display or a head-up display.

FIG. 35 is a diagram illustrating an example of an installation position of the image capturing section 12031.

In FIG. 35, a vehicle 12100 includes image capturing sections 12101, 12102, 12103, 12104, and 12105 as the image capturing section 12031.

The image capturing sections 12101, 12102, 12103, 12104, and 12105 are provided at, for example, a front nose, side mirrors, a rear bumper, a back door, an upper portion of a windshield in a compartment, and the like of the vehicle 12100. The image capturing section 12101 provided at the front nose and the image capturing section 12105 provided at the upper portion of the windshield in the compartment mainly acquire an image of an area in front of the vehicle 12100. The image capturing sections 12102 and 12103 provided at side mirrors mainly acquire images of areas on sides of the vehicle 12100. The image capturing section 12104 provided at the rear bumper or the back door mainly acquires an image of an area behind the vehicle 12100. The image of the area in front of the vehicle 12100 acquired by the image capturing sections 12101 and 12105 is mainly used to detect a preceding vehicle, a pedestrian, an obstacle, a traffic light, a traffic sign, a lane, or the like.

Note that FIG. 35 illustrates an example of imaging ranges of the image capturing sections 12101 to 12104. An image capturing range 12111 indicates an image capturing range of the image capturing section 12101 provided at the front nose, image capturing ranges 12112 and 12113 indicate image capturing ranges of the image capturing sections 12102 and 12103 provided at the side mirrors, respectively, and an image capturing range 12114 indicates an image capturing range of the image capturing section 12104 provided at the rear bumper or the back door. For example, image data captured by the image capturing sections 12101 to 12104 are superimposed, thereby obtaining a bird's eye view image from above the vehicle 12100.

At least one of the image capturing sections 12101 to 12104 may have a function of acquiring distance information. For example, at least one of the image capturing sections 12101 to 12104 may be a stereo camera including a plurality of image capturing elements, or may be an image capturing element with pixels for phase difference detection.

For example, the microcomputer 12051 can extract a three-dimensional object traveling at a predetermined speed (for example, 0 km/h or higher) in substantially the same direction as that of the vehicle 12100, particularly, the closest three-dimensional object on a traveling path of the vehicle 12100, as a preceding vehicle, by calculating a distance to each three-dimensional object in the image capturing ranges 12111 to 12114, and a temporal change (relative speed with respect to the vehicle 12100) in the distance on the basis of the distance information acquired from the image capturing sections 12101 to 12104. Moreover, the microcomputer 12051 can set an inter-vehicle distance to be secured in advance for a preceding vehicle, and can perform an automatic brake control (including a following stop control), an automatic acceleration control (including a following start control), and the like. As described above, a cooperative control for the purpose of an automatic driving in which a vehicle autonomously travels without an operation by a driver, or the like, can be performed.

For example, the microcomputer 12051 can classify and extract three-dimensional object data related to a three-dimensional object as a two-wheeled vehicle, an ordinary vehicle, a large vehicle, a pedestrian, and another three-dimensional object such as a power pole, on the basis of the distance information obtained from the image capturing sections 12101 to 12104, and use a result of the classification and extraction for automatic avoidance of obstacles. For example, the microcomputer 12051 identifies an obstacle around the vehicle 12100 as an obstacle that is visible to the driver of the vehicle 12100 or an obstacle that is hardly visible. Then, the microcomputer 12051 determines a collision risk indicating a risk of collision with each obstacle, and in a case where the collision risk is equal to or higher than a set value and there is a possibility of collision, the microcomputer 12051 can output an alarm to the driver through the audio speaker 12061 or the display section 12062 or perform forced deceleration or avoidance steering through the driving system control unit 12010 to perform driving assistance for collision avoidance.

At least one of the image capturing sections 12101 to 12104 may be an infrared camera that detects infrared rays. For example, the microcomputer 12051 can recognize a pedestrian by determining whether or not a pedestrian is present in captured images of the image capturing sections 12101 to 12104. Such a recognition of a pedestrian is performed through a procedure for extracting feature points in the captured images of the image capturing sections 12101 to 12104 that are, for example, infrared cameras, and a procedure for discriminating whether or not an object is a pedestrian by performing pattern matching processing on a series of feature points indicating an outline of the object. In a case where the microcomputer 12051 determines that a pedestrian is present in the captured images of the image capturing sections 12101 to 12104 and recognizes the pedestrian, the voice and image output section 12052 controls the display section 12062 to superimpose a rectangular contour line for emphasis on the recognized pedestrian. Furthermore, the voice and image output section 12052 may control the display section 12062 to display an icon or the like indicating a pedestrian at a desired position.

Hereinabove, an example of the vehicle control system to which the technology according to the present disclosure can be applied has been described. The technology according to the present disclosure can be applied to, for example, the image capturing section 12031 and the like in the configuration described above. Then, by applying the technology according to the present disclosure to the image capturing section 12031 and the like, the dynamic range of the entire image capturing device can be expanded, and the power consumption of the image capturing device can be reduced, such that it is possible to contribute to reducing the power consumption of the vehicle control system.

<Configurations that Present Disclosure can Take>

Note that the present disclosure can also have the following configuration.

<<A. Image Capturing Device>>

(A-01) An image capturing device including:
a load current source;
a comparator that includes an input transistor connected between a signal line that transmits a signal read from a pixel and the load current source; and
a reference signal supply section that supplies a predetermined reference signal to a charge-voltage conversion section of the pixel.

(A-0:2) The image capturing device according to (A-01) described above, in which
the predetermined reference signal includes a voltage with a sloping waveform that linearly changes with a predetermined slope.

(A-03) The image capturing device according to (A-02) described above, in which
the comparator compares a signal voltage, which is supplied through the signal line and with which the voltage with the sloping waveform overlaps, with a predetermined reference voltage.

(A-04) The image capturing device according to (A-03) described above, in which
the voltage with the sloping waveform includes a slope portion and an offset portion,
the slope portion of the voltage with the sloping waveform is input to the charge-voltage conversion section via a capacitive element, and
the offset portion of the voltage with the sloping waveform is inverted in polarity relative to the slope portion and input to the comparator as the predetermined reference voltage.

(A-05) The image capturing device according to any one of (A-01) to (A-04) described above, in which
the reference signal supply section supplies the predetermined reference signal to the charge-voltage conversion section shared among a plurality of pixels.

(A-06) The image capturing device according to any one of (A-01) to (A-05) described above, in which
the reference signal supply section includes
a reference signal generation section that generates the predetermined reference signal, and
an input capacitive element that applies the reference signal generated by the reference signal generation section to the charge-voltage conversion section of the pixel.

(A-07) The image capturing device according to (A-06) described above, in which the reference signal supply section supplies the reference signal to the charge-voltage conversion section of the pixel along a column direction of a pixel array in which the pixels are two-dimensionally arranged in a matrix form.

(A-08) The image capturing device according to (A-07) described above, in which
the reference signal generation section is arranged common to all pixel columns of the pixel array in which the pixels are two-dimensionally arranged in a matrix form.

(A-09) The image capturing device according to (A-08) described above, in which
the reference signal generation section is arranged on each of opposite sides of the pixel array in which the pixels are two-dimensionally arranged in a matrix form in the column direction.

(A-10) The image capturing device according to (A-06) described above, in which
the reference signal supply section supplies the reference signal to the charge-voltage conversion section of the pixel along a row direction of a pixel array in which the pixels are two-dimensionally arranged in a matrix form.

(A-11) The image capturing device according to (A-10) described above, in which
the reference signal generation section is arranged common to all pixel rows of the pixel array in which the pixels are two-dimensionally arranged in a matrix form.

(A-12) The image capturing device according to (A-10) or (A-11) described above, in which
the reference signal generation section is arranged on each of opposite sides of the pixel array in which the pixels are two-dimensionally arranged in a matrix form in the row direction.

(A-13) The image capturing device according to (A-06) described above, in which
the reference signal generation section supplies the reference signal to the charge-voltage conversion section of the pixel in pixel units with respect to each pixel of a pixel array in which the pixels are two-dimensionally arranged in a matrix form.

(A-14) The image capturing device according to (A-06) described above, in which
the reference signal generation section supplies the reference signal to the charge-voltage conversion section of the pixel along a column direction from a central portion of a pixel array in which the pixels are two-dimensionally arranged in a matrix form.

(A-15) The image capturing device according to (A-06) described above, in which
in the pixel, a buffer is provided in front of the input capacitive element.

(A-16) The image capturing device according to (A-06) described above, in which
the reference signal generation section is provided in the pixel.

(A-17) The image capturing device according to any one of (A-06) to (A-16) described above, in which
the image capturing device has a stacked type semiconductor chip structure formed by stacking at least two semiconductor chips, and
the pixel and the comparator are formed in different semiconductor chips, respectively, (A-18) The image capturing device according to (A-17) described above, in which a semiconductor chip as a first layer and a semiconductor chip as a second layer are stacked,
the pixel is formed in the semiconductor chip as the first layer, and
the comparator and the reference signal generation section are formed in the semiconductor chip as the second layer, (A-19) The image capturing device according to (A-17) described above, in which
a semiconductor chip as a first layer, a semiconductor chip as a second layer, and a semiconductor chip as a third layer are stacked,
a photoelectric transformation element is formed in the semiconductor chip as the first layer,
a constituent element of the pixel other than the photoelectric transformation element is formed in the semiconductor chip as the second layer, and
the comparator and the reference signal generation section are formed in the semiconductor chip as the third layer.

<<B. Electronic Apparatus>>

(B-01) An electronic apparatus including an image capturing device that includes:
a load current source;
a comparator that includes an input transistor connected between a signal line that transmits a signal read from a pixel and the load current source; and
a reference signal supply section that supplies a predetermined reference signal to a charge-voltage conversion section of the pixel.

(B-02) The electronic apparatus according to (B-01) described above, in which
the predetermined reference signal includes a voltage with a sloping waveform that linearly changes with a predetermined slope.

(B-03) The electronic apparatus according to (B-02) described above, in which
the comparator compares a signal voltage, which is supplied through the signal line and with which the voltage with the sloping waveform overlaps, with a predetermined reference voltage.

(B-04) The electronic apparatus according to (3-03) described above, in which
the voltage with the sloping waveform includes a slope portion and an offset portion,
the slope portion of the voltage with the sloping waveform is input to the charge-voltage conversion section via a capacitive element, and
the offset portion of the voltage with the sloping waveform is inverted in polarity relative to the slope portion and input to the comparator as the predetermined reference voltage.

(B-05) The electronic apparatus according to any one of (B-01) to (B-04) described above, in which
the reference signal supply section supplies the predetermined reference signal to the charge-voltage conversion section shared among a plurality of pixels.

(B-06) The electronic apparatus according to any one of (B-01) to (B-05) described above, in which
the reference signal supply section includes
a reference signal generation section that generates the predetermined reference signal, and
an input capacitive element that applies the reference signal generated by the reference signal generation section to the charge-voltage conversion section of the pixel.

(B-07) The electronic apparatus according to (B-06) described above, in which the reference signal supply section supplies the reference signal to the charge-voltage conversion section of the pixel along a column direction of a pixel array in which the pixels are two-dimensionally arranged in a matrix form.

(B-08) The electronic apparatus according to (B-07) described above, in which
the reference signal generation section is arranged common to all pixel columns of the pixel array in which the pixels are two-dimensionally arranged in a matrix form.

(B-09) The electronic apparatus according to (B-08) described above, in which
the reference signal generation section is arranged on each of opposite sides of the pixel array in which the pixels are two-dimensionally arranged in a matrix form in the column direction.

(B-10) The electronic apparatus according to (B-06) described above, in which
the reference signal supply section supplies the reference signal to the charge-voltage conversion section of the pixel along a row direction of a pixel array in which the pixels are two-dimensionally arranged in a matrix form.

(B-11) The electronic apparatus according to (B-10) described above, in which
the reference signal generation section is arranged common to all pixel rows of the pixel array in which the pixels are two-dimensionally arranged in a matrix form.

(B-12) The electronic apparatus according to (B-10) or (B-11) described above, in which
the reference signal generation section is arranged on each of opposite sides of the pixel array in which the pixels are two-dimensionally arranged in a matrix form in the row direction.

(B-13) The electronic apparatus according to (B-06) described above, in which
the reference signal generation section supplies the reference signal to the charge-voltage conversion section of the pixel in pixel units with respect to each pixel of a pixel array in which the pixels are two-dimensionally arranged in a matrix form.

(B-14) The electronic apparatus according to (B-06) described above, in which
the reference signal generation section supplies the reference signal to the charge-voltage conversion section of the pixel along a column direction from a central portion of a pixel array in which the pixels are two-dimensionally arranged in a matrix form.

(B-15) The electronic apparatus according to (B-06) described above, in which
in the pixel, a buffer is provided in front of the input capacitive element.

(B-16) The electronic apparatus according to (B-06) described above, in which
the reference signal generation section is provided in the pixel.

(B-17) The electronic apparatus according to any one of (B-06) to (B-16) described above, in which
the image capturing device has a stacked type semiconductor chip structure formed by stacking at least two semiconductor chips, and
the pixel and the comparator are formed in different semiconductor chips, respectively, (B-18) The electronic apparatus according to (B-17) described above, in which a semiconductor chip as a first layer and a semiconductor chip as a second layer are stacked,
the pixel is formed in the semiconductor chip as the first layer, and
the comparator and the reference signal generation section are formed in the semiconductor chip as the second layer.

(B-19) The electronic apparatus according to (B-17) described above, in which
a semiconductor chip as a first layer, a semiconductor chip as a second layer, and a semiconductor chip as a third layer are stacked,
a photoelectric transformation element is formed in the semiconductor chip as layer,
a constituent element of the pixel other than the photoelectric transformation element is formed in the semiconductor chip as the second layer, and
the comparator and the reference signal generation section are formed in the semiconductor chip as the third layer.

(C-1) A light detecting device comprising:
a pixel including a floating diffusion;
a signal line configured to transmit a signal read from the pixel;
a comparator including an input transistor and a first load current source, the input transistor including a source and a drain, the source being connected to the signal line that transmits the signal read from the pixel and the drain being connected to the first load current source; and
reference signal supply circuitry configured to supply a first reference signal to the floating diffusion of the pixel.

(C-2) The light detecting device according to (C-1), wherein a gate of the input transistor is coupled to a ground line.

(C-3) The light detecting device according to (C-2), wherein the input transistor is coupled to the ground line through a coupling capacitor.

(C-4) The light detecting device according to (C-1), wherein the comparator further comprises an output transistor, a source of the output transistor being connected to the signal line, and a drain of the output transistor being connected to a second load current source.

(C-5) The light detecting device according to (C-1), wherein
the first reference signal includes a voltage with a sloping waveform that linearly changes with a predetermined slope.

(C-6) The light detecting device according to (C-5), wherein the predetermined slope is an upward slope.

(C-7) The light detecting device according to (C-5), wherein
the comparator compares a signal voltage, which is supplied through the signal line and with which the voltage with the sloping waveform overlaps, with a predetermined reference voltage, (C-8) The light detecting device according to (C-1), wherein the reference signal supply circuitry is configured to supply a second reference signal to a gate of the input transistor.

(C-9) The light detecting device according to (C-8), wherein
the first reference signal includes a voltage with a sloping waveform that linearly changes with a predetermined slope and the second reference signal includes an offset voltage.

(C-10) The light detecting device according to (C-1), wherein
the floating diffusion is shared among a plurality of pixels.
(C-11) The light detecting device according to (C-1), wherein
the reference signal supply circuitry includes
a reference signal generator that generates the first reference signal, and
an input capacitive element that couples the first reference signal generated by the reference signal generator to the floating diffusion of the pixel.
(C-12) The light detecting device according to (C-1), wherein
the pixel is in a pixel array in which a plurality of pixels are arranged two dimensionally in a matrix form,
the floating diffusion is one of a plurality of floating diffusions respectively corresponding to each of the plurality of pixels, and
the reference signal supply circuitry is one of a plurality of reference signal supply circuitries that respectively supply the first reference signal to respective columns of pixels in the pixel array,
(C-13) The light detecting device according to (C-12), wherein
input capacitive elements are respectively provided for each pixel in a pixel column, and couple the first reference signal supplied by a corresponding reference signal supply circuitry for the pixel column to respective floating diffusions of pixels in the pixel column.
(C-14) The light detecting device according to (C-1), wherein
the pixel is in a pixel array in which a plurality of pixels are arranged two dimensionally in a matrix form, and
the reference signal supply circuitry is arranged common to all pixel columns of the pixel array.
(C-15) The light detecting device according to (C-14), wherein
for each of the pixel columns, the reference signal supply circuitry supplies the first reference signal to floating diffusions corresponding to the pixels in the pixel column through a buffer circuitry.
(C-16) The light detecting device according to (C-14), wherein
for each of the pixel columns, the reference signal supply circuitry supplies the first reference signal to floating diffusions corresponding to the pixels in the pixel column directly.
(C-17) The light detecting device according to (C-1), wherein
the pixel is in a pixel array in which a plurality of pixels are arranged two dimensionally in a matrix form, and
the reference signal supply circuitry is one of two reference signal supply circuitries that are arranged on each of opposite sides of the pixel array.
(C-18) The light detecting device according to (C-17), wherein the two reference signal supply circuitries are respectively arranged at an upper side and a lower side of the pixel array in a pixel column direction.
(C-19) The light detecting device according to (C-17), wherein the two reference signal supply circuitries are respectively arranged at a left side and a right side of the pixel array in a pixel row direction.
(C-20) The light detecting device according to (C-1), wherein
the pixel is in a pixel array in which a plurality of pixels are arranged two dimensionally in a matrix form, and
the reference signal supply circuitry is one of a plurality of reference signal supply circuitries that respectively supply the first reference signal to respective rows of pixels in the pixel array,
(C-21) The light detecting device according to (C-14), wherein
the reference signal supply circuitry commonly supplies the first reference signal to the pixels in a mesh pattern in pixel units.
(C-22) The light detecting device according to (C-15), wherein
the reference signal supply circuitry commonly supplies the first reference signal to the pixels in a mesh pattern in pixel units through the respective buffer circuitry corresponding to each of the columns.
(C-23) The light detecting device according to (C-1), wherein
the pixel is in a pixel array in which a plurality of pixels are arranged two dimensionally in a matrix form, and
the reference signal supply circuitry is arranged at a central position of the pixel array along a column direction.
(C-24) The light detecting device according to (C-23), wherein
the reference signal supply circuitry supplies the first reference signal to the pixels in rows above the central position through a first wiring line, and supplies the first reference signal to the pixels in rows below the central position through a second wiring line.
(C-25) The light detecting device according to (C-1), further comprising:
an input capacitive element configured to couple the first reference signal generated by the reference signal supply circuitry to the floating diffusion of the pixel; and
buffer circuitry configured to receive the first reference signal from the reference signal supply circuitry and provide the first reference signal to the input capacitive element, the buffer circuitry having a source follower configuration.
(C-26) The light detecting device according to (C-25), wherein the buffer circuitry includes an input transistor connected between a node at a predetermined potential and an input terminal of the input capacitive element.
(C-27) The light detecting device according to (C-26), wherein the buffer circuitry includes a constant current source transistor connected between an anode electrode of a photodiode of the pixel and the input terminal of the input capacitive element.
(C-28) The light detecting device according to (C-1), wherein
the light detecting device has a stacked type semiconductor chip structure formed by stacking at least two semiconductor chips, and
the pixel and the comparator are formed in different semiconductor chips, respectively.
(C-29) The light detecting device according to (C-28), wherein
a semiconductor chip as a first layer and a semiconductor chip as a second layer are stacked,
the pixel is formed in the semiconductor chip as the first layer, and
the comparator is formed in the semiconductor chip as the second layer.
(C-30) The light detecting device according to (C-1), wherein
the reference signal supply circuitry includes a reference signal generator that generates the first reference signal, an input capacitive element couples the first reference signal generated by the reference signal generator to the floating diffusion of the pixel, the light detecting device has a stacked type semiconductor chip structure formed by stacking at least two semiconductor chips, the pixel is formed in a first semiconductor chip as a first layer, the reference signal generator is formed in a second semiconductor chip as a second layer, and the first reference signal from the reference signal generator is electrically connected to the input capacitive element through a bonding portion between the first and second layers.

(C-31) The light detecting device according to (C-30), wherein the bonding portion includes a Cu—Cu direct bonding.

(C-32) The light detecting device according to (C-1), wherein a first semiconductor chip as a first layer, a second semiconductor chip as a second layer, and a third semiconductor chip as a third layer are stacked, a photoelectric conversion element and a transfer transistor of the pixel are formed in the first semiconductor chip, a constituent element of the pixel other than the photoelectric conversion element and the transfer transistor is formed in the second semiconductor chip, and the comparator and the reference signal supply circuitry are formed in the third semiconductor chip.

(C-33) The light detecting device according to (C-1), wherein the reference signal supply circuitry includes a reference signal generator that generates the first reference signal, an input capacitive element in the second semiconductor chip receives the first reference signal through a wiring line and couples the first reference signal generated by the reference signal generator to the floating diffusion of the pixel, and the first reference signal from the reference signal generator is electrically connected to the wiring line through a bonding portion between the second and third layers.

(C-34) The light detecting device according to (C-33), wherein the bonding portion includes a Cu—Cu direct bonding.

(C-35) An electronic apparatus comprising the light detecting device according to (C-1).

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 CMOS image sensor
11 Pixel array section
12 Row selection section
13 Analog-to-digital conversion section
14 Logic circuit section (signal processing section)
15 Timing control section
16 Reference signal generation section
20 Pixel
21 Photodiode
22 Transfer transistor
23 Reset transistor
24 Amplification transistor
25 Selection transistor
31 ($31_1$ to $31_m$) Pixel control line
32 ($32_1$ to $32_n$) Signal line
50 Reference signal supply section
51 Reference signal generation section
52 input capacitive element
130 Analog-to-digital converter
131 Comparator
132 Counter
$C_{11}$, $C_{12}$, $C_{13}$ Capacitive element
$I_{11}$ Input-side load current source
$I_{12}$ Output-side load current source
$PT_{11}$ Input transistor
$PT_{12}$ Output transistor

The invention claimed is:

1. A light detecting device comprising:
a pixel including a floating diffusion;
a signal line configured to transmit a signal read from the pixel;
a comparator including an input transistor and a first load current source, the input transistor including a source and a drain, the source being connected to the signal line that transmits the signal read from the pixel and the drain being connected to the first load current source; and
reference signal supply circuitry configured to supply a first reference signal to the floating diffusion of the pixel.

2. The light detecting device according to claim 1, wherein a gate of the input transistor is coupled to a ground line.

3. The light detecting device according to claim 2, wherein the input transistor is coupled to the ground line through a coupling capacitor.

4. The light detecting device according to claim 1, wherein the comparator further comprises an output transistor, a source of the output transistor being connected to the signal line, and a drain of the output transistor being connected to a second load current source.

5. The light detecting device according to claim 1, wherein
the first reference signal includes a voltage with a sloping waveform that linearly changes with a predetermined slope.

6. The light detecting device according to claim 5, wherein the predetermined slope is an upward slope.

7. The light detecting device according to claim 5, wherein
the comparator compares a signal voltage, which is supplied through the signal line and with which the voltage with the sloping waveform overlaps, with a predetermined reference voltage.

8. The light detecting device according to claim 1, wherein the reference signal supply circuitry is configured to supply a second reference signal to a gate of the input transistor.

9. The light detecting device according to claim 8, wherein
the first reference signal includes a voltage with a sloping waveform that linearly changes with a predetermined slope and the second reference signal includes an offset voltage.

10. The light detecting device according to claim 1, wherein
the floating diffusion is shared among a plurality of pixels.

11. The light detecting device according to claim 1, wherein
the reference signal supply circuitry includes
a reference signal generator that generates the first reference signal, and
an input capacitive element that couples the first reference signal generated by the reference signal generator to the floating diffusion of the pixel.

12. The light detecting device according to claim 1, wherein
the pixel is in a pixel array in which a plurality of pixels are arranged two dimensionally in a matrix form,
the floating diffusion is one of a plurality of floating diffusions respectively corresponding to each of the plurality of pixels, and
the reference signal supply circuitry is one of a plurality of reference signal supply circuitries that respectively supply the first reference signal to respective columns of pixels in the pixel array.

13. The light detecting device according to claim 12, wherein
input capacitive elements are respectively provided for each pixel in a pixel column, and couple the first reference signal supplied by a corresponding reference signal supply circuitry for the pixel column to respective floating diffusions of pixels in the pixel column.

14. The light detecting device according to claim 1, wherein
the pixel is in a pixel array in which a plurality of pixels are arranged two dimensionally in a matrix form, and
the reference signal supply circuitry is arranged common to all pixel columns of the pixel array.

15. The light detecting device according to claim 14, wherein
for each of the pixel columns, the reference signal supply circuitry supplies the first reference signal to floating diffusions corresponding to respective pixels in respective pixel columns through a buffer circuitry.

16. The light detecting device according to claim 14, wherein
for each of the pixel columns, the reference signal supply circuitry supplies the first reference signal to floating diffusions corresponding to respective pixels in respective pixel columns directly.

17. The light detecting device according to claim 1, wherein
the pixel is in a pixel array in which a plurality of pixels are arranged two dimensionally in a matrix form, and
the reference signal supply circuitry is one of two reference signal supply circuitries that are arranged on each of opposite sides of the pixel array.

18. The light detecting device according to claim 17, wherein the two reference signal supply circuitries are respectively arranged at an upper side and a lower side of the pixel array in a pixel column direction.

19. The light detecting device according to claim 17, wherein the two reference signal supply circuitries are respectively arranged at a left side and a right side of the pixel array in a pixel row direction.

20. The light detecting device according to claim 1, wherein
the pixel is in a pixel array in which a plurality of pixels are arranged two dimensionally in a matrix form, and
the reference signal supply circuitry is one of a plurality of reference signal supply circuitries that respectively supply the first reference signal to respective rows of pixels in the pixel array.

21. The light detecting device according to claim 14, wherein
the reference signal supply circuitry commonly supplies the first reference signal to respective pixels in a mesh pattern in pixel units.

22. The light detecting device according to claim 15, wherein
the reference signal supply circuitry commonly supplies the first reference signal to respective pixels in a mesh pattern in pixel units through the respective buffer circuitry corresponding to each of the columns.

23. The light detecting device according to claim 1, wherein
the pixel is in a pixel array in which a plurality of pixels are arranged two dimensionally in a matrix form, and
the reference signal supply circuitry is arranged at a central position of the pixel array along a column direction.

24. The light detecting device according to claim 23, wherein
the reference signal supply circuitry supplies the first reference signal to the pixels in rows above the central position through a first wiring line, and supplies the first reference signal to the pixels in rows below the central position through a second wiring line.

25. The light detecting device according to claim 1, further comprising:
an input capacitive element configured to couple the first reference signal generated by the reference signal supply circuitry to the floating diffusion of the pixel; and
buffer circuitry configured to receive the first reference signal from the reference signal supply circuitry and provide the first reference signal to the input capacitive element, the buffer circuitry having a source follower configuration.

26. The light detecting device according to claim 25, wherein the buffer circuitry includes an input transistor connected between a node at a predetermined potential and an input terminal of the input capacitive element.

27. The light detecting device according to claim 26, wherein the buffer circuitry includes a constant current source transistor connected between an anode electrode of a photodiode of the pixel and the input terminal of the input capacitive element.

28. The light detecting device according to claim 1, wherein
the light detecting device has a stacked type semiconductor chip structure formed by stacking at least two semiconductor chips, and
the pixel and the comparator are formed in different semiconductor chips, respectively.

29. The light detecting device according to claim 28, wherein
a semiconductor chip as a first layer and a semiconductor chip as a second layer are stacked,
the pixel is formed in the semiconductor chip as the first layer, and
the comparator is formed in the semiconductor chip as the second layer.

30. The light detecting device according to claim 1, wherein
the reference signal supply circuitry includes a reference signal generator that generates the first reference signal,
an input capacitive element couples the first reference signal generated by the reference signal generator to the floating diffusion of the pixel, the light detecting device has a stacked type semiconductor chip structure formed by stacking at least two semiconductor chips, the pixel is formed in a first semiconductor chip as a first layer, the reference signal generator is formed in a second semiconductor chip as a second layer, and the first reference signal from the reference signal generator is electrically connected to the input capacitive element through a bonding portion between the first and second layers.

31. The light detecting device according to claim 30, wherein the bonding portion includes a Cu—Cu direct bonding.

32. The light detecting device according to claim 1, wherein a first semiconductor chip as a first layer, a second semiconductor chip as a second layer, and a third semiconductor chip as a third layer are stacked, a photoelectric conversion element and a transfer transistor of the pixel are formed in the first semiconductor chip, a constituent element of the pixel other than the photoelectric conversion element and the transfer transistor is formed in the second semiconductor chip, and the comparator and the reference signal supply circuitry are formed in the third semiconductor chip.

33. The light detecting device according to claim 32, wherein the reference signal supply circuitry includes a reference signal generator that generates the first reference signal, an input capacitive element in the second semiconductor chip receives the first reference signal through a wiring line and couples the first reference signal generated by the reference signal generator to the floating diffusion of the pixel, and the first reference signal from the reference signal generator is electrically connected to the wiring line through a bonding portion between the second and third layers.

34. The light detecting device according to claim 33, wherein the bonding portion includes a Cu—Cu direct bonding.

35. An electronic apparatus comprising the light detecting device according to claim 1.

* * * * *